US008914546B2

(12) United States Patent
Kawamoto et al.

(10) Patent No.: US 8,914,546 B2
(45) Date of Patent: Dec. 16, 2014

(54) CONTROL METHOD FOR VIRTUAL MACHINE AND MANAGEMENT COMPUTER

(75) Inventors: Shinichi Kawamoto, Tokyo (JP); Tsuyoshi Tanaka, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 245 days.

(21) Appl. No.: 13/437,963

(22) Filed: Apr. 3, 2012

(65) Prior Publication Data
US 2012/0254445 A1   Oct. 4, 2012

(30) Foreign Application Priority Data
Apr. 4, 2011   (JP) ................. 2011-082570

(51) Int. Cl.
*G06F 15/16* (2006.01)
*G06F 9/50* (2006.01)

(52) U.S. Cl.
CPC ............ *G06F 9/5077* (2013.01); *G06F 9/5088* (2013.01)
USPC ...................................................... 709/250

(58) Field of Classification Search
CPC . G06F 9/5077; G06F 12/13; G06F 17/30067; G06F 2009/45591; G06F 2201/81; G06F 2201/815; G06F 2009/45595; H04L 63/0227; H04L 49/354; H04L 12/4641
USPC ........................................................ 709/226
See application file for complete search history.

(56) References Cited

U.S. PATENT DOCUMENTS

| 6,779,016 B1 * | 8/2004 | Aziz et al. ..................... 709/201 |
| 7,143,153 B1 * | 11/2006 | Black et al. .................... 709/223 |
| 7,263,597 B2 * | 8/2007 | Everdell et al. ................. 712/11 |
| 7,565,487 B2 * | 7/2009 | Taguchi et al. ............... 711/114 |
| 7,849,168 B2 * | 12/2010 | Utsunomiya et al. ......... 709/221 |
| 7,992,149 B2 * | 8/2011 | Carollo et al. ................ 718/102 |
| 8,078,690 B2 * | 12/2011 | Shimozono et al. .......... 709/218 |
| 8,078,764 B2 * | 12/2011 | Okitsu et al. ...................... 710/5 |
| 8,151,323 B2 * | 4/2012 | Harris et al. ...................... 726/4 |
| 8,296,434 B1 * | 10/2012 | Miller et al. .................. 709/226 |
| 8,386,610 B2 * | 2/2013 | Yahalom et al. .............. 709/226 |
| 8,560,671 B1 * | 10/2013 | Yahalom et al. .............. 709/224 |
| 8,578,076 B2 * | 11/2013 | van der Linden et al. ...... 710/72 |
| 2002/0065919 A1 * | 5/2002 | Taylor et al. .................. 709/226 |
| 2006/0129667 A1 * | 6/2006 | Anderson ..................... 709/223 |
| 2007/0244987 A1 * | 10/2007 | Pedersen et al. .............. 709/217 |

(Continued)

FOREIGN PATENT DOCUMENTS

JP   2010-26699   2/2010

*Primary Examiner* — Kevin Bates
*Assistant Examiner* — Clarence D McCray
(74) *Attorney, Agent, or Firm* — Antonelli, Terry, Stout & Kraus, LLP.

(57) ABSTRACT

A method of controlling a virtual computer system, the method comprising: obtaining, by a management computer, a load value for each of the plurality of groups, and comparing the load value against a preset threshold; identifying, a group whose load value exceeds the preset threshold as a first group; selecting, a second group from the plurality of groups minus the first group; identifying, as a migration target computer, a given physical computer out of physical computers that run virtual computers allocated to the second group; migrating, virtual computers that are provided by the migration target computer to other physical computers within the second group; changing, settings of the network switch in a manner that enables the migration target computer to operate in the first group; adding, the migration target computer to the first group; and controlling, the migration target computer to run virtual computers of the first group.

16 Claims, 50 Drawing Sheets

(56) References Cited

U.S. PATENT DOCUMENTS

| | | | |
|---|---|---|---|
| 2009/0106571 A1* | 4/2009 | Low et al. | 713/310 |
| 2010/0017517 A1 | 1/2010 | Arai et al. | |
| 2011/0072293 A1* | 3/2011 | Mazzaferri et al. | 713/340 |
| 2011/0099268 A1* | 4/2011 | Ozaki et al. | 709/224 |
| 2012/0060010 A1* | 3/2012 | Shimozono et al. | 711/165 |
| 2012/0096459 A1* | 4/2012 | Miyazaki | 718/1 |
| 2012/0221611 A1* | 8/2012 | Watanabe et al. | 707/827 |
| 2013/0159513 A1* | 6/2013 | Hayashi et al. | 709/224 |
| 2013/0212345 A1* | 8/2013 | Nakajima | 711/161 |
| 2013/0254766 A1* | 9/2013 | Zuo et al. | 718/1 |
| 2014/0010109 A1* | 1/2014 | Himura et al. | 370/254 |
| 2014/0019972 A1* | 1/2014 | Yahalom et al. | 718/1 |
| 2014/0029617 A1* | 1/2014 | Wang et al. | 370/392 |

* cited by examiner

TENANT DB/RESOURCE GROUP TABLE

| TENANT ID | RESOURCE GROUP ID |
|---|---|
| A | RGA |
| B | RGB |

Fig.7

TENANT DB/ VM TABLE

| TENANT ID | VMID |
|---|---|
| A | VM00 |
| A | VM01 |
| A | VM02 |
| B | VM05 |
| B | VM06 |

Fig.8

TENANT DB/ VIRTUAL NETWORK TABLE

| TENANT ID | VIRTUAL NETWORK NAME | NIC_ID | VLAN_ID |
|---|---|---|---|
| A | VNet1 | 0 | 1 |
| A | VNet2 | 0 | 2 |
| B | VNet5 | 0 | 3 |
| B | VNet6 | 1 | 4 |
| B | Vnet7 | 1 | 5 |

Fig.9

TENANT DB/ LU TABLE

| TENANT ID | StorageID | PORT | LUN | Zone |
|---|---|---|---|---|
| A | 0 | S1 | 1 | Z0 |
| A | 0 | S1 | 2 | Z0 |
| B | 0 | S2 | 3 | Z1 |
| B | 0 | S2 | 4 | Z1 |
| B | 0 | S2 | 5 | Z1 |

Fig.10

RUNNING STATE DB/ HOST STATUS INFORMATION TABLE

| Time Stamp | InstanceID | Type | Value |
|---|---|---|---|
| 2010/12/12 8:25:31 | Host00 | CPU_Busy | 0.23 |
| 2010/12/12 8:25:31 | Host00 | Mem_Busy | 0.6 |
| 2010/12/12 8:25:31 | Host00 | Disk_Busy | 0.1 |
| 2010/12/12 8:25:31 | Host00 | NW_Busy | 0.2 |
| 2010/12/12 8:25:31 | Host01 | CPU_Busy | 0.12 |
| ... | | | |
| 2010/12/12 8:28:56 | Host00 | CPU_Busy | 0.52 |
| ... | | | |

Fig.11

SYSTEM STRUCTURE MANAGEMENT DB/HOST TABLE
[OBTAINMENT OF HOST LOAD INFORMATION,
CALCULATION OF MEMORY, NW, AND DISK UTILIZATION RATIO]

| RACK ID | Host ID | AMOUNT OF MEMORY | NW BANDWIDTH | DISK I/O BANDWIDTH | HYPERVISOR TYPE |
|---|---|---|---|---|---|
| 0 | Host01 | 32GB | 400MB/sec | 200MB/sec | Hyper-V |
| 0 | Host02 | 32GB | 400MB/sec | 200MB/sec | Hyper-V |
| 0 | Host03 | 24GB | 400MB/sec | 200MB/sec | Hyper-V |
| 0 | Host04 | 32GB | 400MB/sec | 200MB/sec | Hyper-V |
| 0 | Host05 | 32GB | 400MB/sec | 200MB/sec | Hyper-V |
| 0 | Host06 | 24GB | 400MB/sec | 200MB/sec | Hyper-V |

Fig.12

SYSTEM STRUCTURE MANAGEMENT DB/ LOAD ITEM TABLE

| MEASUREMENT ITEM | EVALUATION THRESHOLD |
|---|---|
| HOST_CPU_Busy | 0.7 |
| HOST_Free_Memory_GB | 0.7 |
| HOST_Disk_Throughput_MB | 0.8 |
| HOST_NW_Throughtput_MB | 0.9 |

Fig.13

SYSTEM STRUCTURE MANAGEMENT DB/ TENANT-HOST TABLE

| TENANT ID | Host ID |
|---|---|
| A | Host01 |
| A | Host02 |
| A | Host03 |
| B | Host04 |
| B | Host05 |
| B | Host06 |

Fig.14

SYSTEM STRUCTURE MANAGEMENT DB/ HOST-VM TABLE

| Host ID | VM ID |
|---|---|
| Host01 | VM00 |
| Host01 | VM01 |
| Host01 | VM02 |
| Host02 | VM03 |
| Host02 | VM04 |
| ... | ... |

Fig.15

SYSTEM STRUCTURE MANAGEMENT DB/ HOST-NIC TABLE

| Host ID | NIC_ID | MAC ADDRESS |
|---------|--------|-------------|
| Host01 | 0 | 10:00:00:00:c8:26 |
| Host01 | 1 | 00:00:00:00:9c:20 |
| Host02 | 1 | 00:01:10:e5:78:12 |
| Host02 | 0 | 00:00:01:15:68:77 |
| Host03 | 0 | 00:00:01:15:68:32 |
| Host03 | 1 | 00:00:01:15:68:01 |
|  |  |  |

*Fig.16*

SYSTEM STRUCTURE MANAGEMENT DB/ HOST-HBA TABLE

| Host ID | HBA_ID | HBA_WWN |
|---------|--------|---------|
| Host01 | 0 | 10:00:00:00:c8:26:40:35 |
| Host02 | 0 | 00:01:10:e5:78:12:02:03 |
| Host03 | 0 | 00:00:01:15:68:77:1b:10 |
|  |  |  |

*Fig.17*

LAN SWITCH MANAGEMENT INFORMATION

| LAN SWITCH ID | PORT NUMBER | CONNECTED EQUIPMENT MAC ADDRESS | VLAN ID |
|---|---|---|---|
| 0 | 0 | 10:00:00:00:c8:26 | 1,2 |
| 0 | 1 | 00:00:00:00:9c:20 | 1,2 |
| 0 | 2 | 00:01:10:e5:78:12 | 1,2 |
| 0 | 5 | 00:00:01:15:68:77 | 3,4,5 |
| 0 | 6 | 00:00:01:15:68:32 | 3,4,5 |
| 0 | 7 | 00:00:01:15:68:01 | 3,4,5 |
| 0 | 10 | 21:35:81:00:00:c8 | 1,3 |

*Fig.18*

SAN SWITCH MANAGEMENT INFORMATION

| SAN SWITCH ID | DOMAIN ID | PORT NUMBER | CONNECTED EQUIPMENT WWN (WORLD WIDE NAME) |
|---|---|---|---|
| 0 | 1 | 0 | 10:00:00:00:c8:26:40:35 |
| 0 | 1 | 1 | 00:00:00:00:9c:20:56:81 |
| 0 | 1 | 2 | 00:01:10:e5:78:12:02:03 |
| 0 | 1 | 5 | 00:00:01:15:68:77:1c:98 |
| 0 | 1 | 6 | 00:00:01:15:68:77:1b:10 |
| 0 | 1 | 7 | 00:00:01:15:68:00:15:98 |
| 0 | 1 | 9 | 00:35:81:00:00:c8:90:1f |
| 0 | 1 | 10 | 21:35:81:00:00:c8:95:42 |

*Fig.19*

SAN ZONE TABLE

| ZONE ID | DOMAIN ID | Port |
|---|---|---|
| Z0 | 1 | 0 |
| Z0 | 1 | 1 |
| Z0 | 1 | 2 |
| Z0 | 1 | 9 |
| Z1 | 1 | 5 |
| Z1 | 1 | 6 |
| Z1 | 1 | 7 |
| Z1 | 1 | 10 |

*Fig.20*

SAN ZONE TABLE (VARIATION OF FIG. 20)

| ZONE ID | DOMAIN, PORT | DOMAIN, PORT |
|---|---|---|
| Z0 | 1,0 | 1,9 |
| Z1 | 1,1 | 1,9 |
| Z2 | 1,2 | 1,9 |
| Z5 | 1,5 | 1,10 |
| Z6 | 1,6 | 1,10 |
| Z7 | 1,7 | 1,10 |

*Fig.21*

SYSTEM STRUCTURE MANAGEMENT DB/ STORAGE TABLE

| STORAGE ID | PORT | WWN (WORLD WIDE NAME) |
|---|---|---|
| 0 | 1 | 00:35:81:00:00:c8:90:1f |
| 0 | 2 | 21:35:81:00:00:c8:95:42 |
| | | |

*Fig.22*

SYSTEM STRUCTURE MANAGEMENT DB/ STORAGE-HOST MANAGEMENT TABLE

| Host Group ID | LUN | CONNECTED EQUIPMENT WWN (WORLD WIDE NAME) |
|---|---|---|
| HG00 | 1,2 | 10:00:00:00:c8:26:40:35 |
| HG00 | 1,2 | 00:00:00:00:9c:20:56:81 |
| HG00 | 1,2 | 00:01:10:e5:78:12:02:03 |
| HG01 | 3,4,5 | 00:00:01:15:68:77:1c:98 |
| HG01 | 3,4,5 | 00:00:01:15:68:77:1b:10 |
| HG01 | 3,4,5 | 00:00:01:15:68:00:15:98 |

CONFIGURATION CHANGE DETAIL INDICATION INTERFACE

| MACHINE/ EQUIPMENT | BEFORE | AFTER |
|---|---|---|
| Host01/ RESOURCE GROUP TO BELONG TO | RGA | RGB |
| Host5/ VIRTUAL SWITCH | {(VNet1,NIC0, VLAN1) (VNet2,NIC1, VLAN2)} | {(VNet5,NIC0,VLAN3) (VNet6,NIC1,VLAN4) (VNet7,NIC1,VLAN5)} |
| LAN SWITCH0/ PORT4 | VLAN: 1,2 | VLAN 3,4,5 |
| SAN SWITCH1/ PORT1,5 | ZONE: Z1 | ZONE: Z2 |
| STORAGE0/ HOST GROUP | LU: 3,4,5 | LU: 1,2 |

| # | PROCESSING | STATUS |
|---|---|---|
| 1 | VM MIGRATION FROM MIGRATION TARGET HOST | COMPLETE |
| 2 | REMOVAL OF MIGRATION TARGET HOST FROM PRE-MIGRATION RESOURCE GROUP | COMPLETE |
| 3 | SAN SWITCH SETTINGS CHANGE | COMPLETE |
| 4 | STORAGE SETTINGS CHANGE | COMPLETE |
| 5 | LAN SWITCH SETTINGS CHANGE | IN PROGRESS |
| 6 | CHANGE OF VIRTUAL SWITCH OF MIGRATION TARGET HOST | |
| 7 | REGISTRATION OF MIGRATION TARGET HOST TO MIGRATION DESTINATION RESOURCE GROUP | |
| 8 | VM MIGRATION (LEVELING) IN MIGRATION DESTINATION RESOURCE GROUP | |

*Fig.37*

CONTROL METHOD FOR VIRTUAL MACHINE AND MANAGEMENT COMPUTER

CLAIM OF PRIORITY

The present application claims priority from Japanese patent application JP 2011-082570 filed on Apr. 4, 2011, the content of which is hereby incorporated by reference into this application.

BACKGROUND

This invention relates to computing resource allocation in a virtual computer system and more particularly to a technology for smoothly changing the allocation of a virtual computer, a network, and a storage apparatus when computing resources are managed on a computing resource tenant-by-computing resource tenant basis (or on a utilization group-by-utilization group basis).

The increase in processor core count and the improvement in virtualization technology have improved the degree of freedom in allocating physical computing resources of a physical computer to a large number of virtual computers as well, thereby making it possible to run a large number of virtual computers with fewer physical computing resources.

It is a common practice for data centers in which many physical computers are kept to rent a plurality of virtual computers to a plurality of clients. For each client (hereinafter referred to as tenant), a data center sets a mode of utilizing a network and a storage apparatus, and sets resources used by the virtual computer in accordance with service level agreement (SLA). An environment where a plurality of tenants uses physical computers within a data center as this is called a multi-tenant environment.

In this type of multi-tenant environment, the data center needs to be run by dynamically allocating a few physical computing resources depending on the loads of the respective tenants in order to improve the profitability of the data center through the enhancement of virtual computer consolidation ratio to physical computing resources.

Known technologies for dynamically changing the allocation of physical computing resources to virtual computers include Distributed Resource Scheduler (DRS) by VMware and Performance and Resource Optimization (PRO) by Microsoft. These technologies are applied to such cases where the load is unbalanced among a plurality of hypervisors (physical servers) constituting a resource group, and a DRS or similar system presents a virtual computer migration plan, or virtual computers are automatically migrated, in a manner that levels the load, to thereby reduce the cost of running by an administrator.

In order to level the load of virtual computers by utilizing the above-mentioned DRS, all physical computers need to share the same LAN switch/SAN switch settings and the same virtual switch settings and storage settings within hypervisors.

However, LAN switch/SAN switch settings include a VLAN or zoning which is set separately for each tenant that uses the data center, and it is therefore difficult to distribute resources among different tenants. There is a known method in which the settings of a physical router or a physical LAN switch are changed to accomplish the migration of physical computing resources between different network segments (for example, Japanese Patent Application Laid-open No. 2010-26699).

SUMMARY

Hypervisors or other virtualization modules which allocate physical computing resources to virtual computers build virtual switches (or virtual networks) inside, so that virtual computers of the same virtualization module communicate with each other via the internal virtual switch without using a physical I/O device.

Applying Japanese Patent Application Laid-open No. 2010-26699 to a virtual computer system of the multi-tenant environment described above therefore does not allow the system to change the settings of a virtual switch inside a virtualization module. The resultant problem is that sharing one physical computer with other tenants requires an administrator or other personnel to change virtual switch settings or the like manually, which increases the running cost of the data center.

In most data centers, the same LAN switch and SAN switch settings are used for the same tenant, and each tenant or a part of a tenant can be treated as a resource group. The load can be leveled across each resource group at a low cost by DRS or other technologies described above.

When the load becomes unbalanced among groups such as resource groups or tenants, however, it still requires an IT systems manager to manually deal with as described above, which gives rise to problems in that the allocation of physical computing resources is not changed quickly and that the running cost is raised because of the personnel cost.

This invention has been made in view of problems described above, and it is therefore an object of this invention to enable a virtual computer system where a plurality of tenants use a plurality of physical computing resources to quickly pass around the physical computing resources among the plurality of tenants.

According to this invention, a method of controlling a virtual computer system for providing a plurality of virtual computers on a plurality of physical computers, the virtual computer system comprising: the plurality of physical computers each comprising a processor and a memory; a virtualization module for partitioning resources of the plurality of physical computers to provide the plurality of virtual computers; a network switch for coupling the plurality of physical computers; and a management computer coupled to the network switch, the method comprising: a first step of allocating, by the management computer, the plurality of virtual computers to a plurality of groups; a second step of obtaining, by the management computer, a load value for each of the plurality of groups, and comparing the load value against a preset threshold; a third step of identifying, by the management computer, a group whose load value exceeds the preset threshold as a first group; a fourth step of selecting, by the management computer, a second group from the plurality of groups minus the first group; a fifth step of identifying, by the management computer, as a migration target computer, a given physical computer out of physical computers that run virtual computers allocated to the second group; a sixth step of migrating, by the management computer, virtual computers that are provided by the migration target computer to other physical computers within the second group; a seventh step of removing, by the management computer, the migration target computer from the second group; an eighth step of instructing, by the management computer, the virtualization module of the migration target computer to change virtual network settings of this virtualization module in a manner that suits the first group; a ninth step of changing, by the management computer, settings of the network switch in a manner that enables the migration target computer to operate in the first group; a tenth step of adding, by the management computer, the migration target computer to the first group; and an eleventh step of controlling, by the management computer, the migration target computer to run virtual computers of the first group.

When the load becomes unbalanced among groups, this invention can thus lessen the load imbalance among groups by removing a suitable physical computer from a group that has a light load (the migration source) and reallocating the physical computer to a group that has a heavy load.

BRIEF DESCRIPTION OF THE DRAWINGS

FIG. 7 is a diagram illustrating an example of the resource group table according to the first embodiment of this invention.

FIG. 8 is a diagram illustrating an example of the VM table according to the first embodiment of this invention.

FIG. 9 is a diagram illustrating an example of the virtual network table according to the first embodiment of this invention.

FIG. 10 is a diagram illustrating an example of the LU table according to the first embodiment of this invention.

FIG. 11 is a diagram illustrating an example of the host status information table of the status database according to the first embodiment of this invention.

FIG. 12 is a diagram illustrating an example of the host table of the system structure management database according to the first embodiment of this invention.

FIG. 13 is a diagram illustrating an example of the load table of the system structure management database according to the first embodiment of this invention.

FIG. 14 is a diagram illustrating an example of the tenant-host table of the system structure management database according to the first embodiment of this invention.

FIG. 15 is a diagram illustrating an example of the host-VM table of the system structure management database according to the first embodiment of this invention.

FIG. 16 is a diagram illustrating an example of the host-NIC table of the system structure management database according to the first embodiment of this invention.

FIG. 17 is a diagram illustrating an example of the host-HBA table of the system structure management database according to the first embodiment of this invention.

FIG. 18 is a diagram illustrating an example of the LAN switch management information of the system structure management database according to the first embodiment of this invention.

FIG. 19 is a diagram illustrating an example of the SAN switch management information of the system structure management database according to the first embodiment of this invention.

FIG. 20 is a diagram illustrating an example of the SAN zone table of the system structure management database according to the first embodiment of this invention.

FIG. 21 is a diagram illustrating a modification example of the SAN zone table of the system structure management database according to the first embodiment of this invention.

FIG. 22 is a diagram illustrating an example of the storage table of the system structure management database according to the first embodiment of this invention.

FIG. 23 is a diagram illustrating an example of the storage-host management table of the system structure management database according to the first embodiment of this invention.

FIG. 36 is a screen image of the detailed plan display screen 430 for displaying a detailed plan created by the configuration plan creation module according to the first embodiment of this invention.

FIG. 37 illustrates a progress display screen 440 which is generated by the configuration change module according to the first embodiment of this invention.

DETAILED DESCRIPTION OF THE PREFERRED EMBODIMENTS

Embodiments of this invention are described below with reference to the accompanying drawings.

<First Embodiment>

Figure 1:
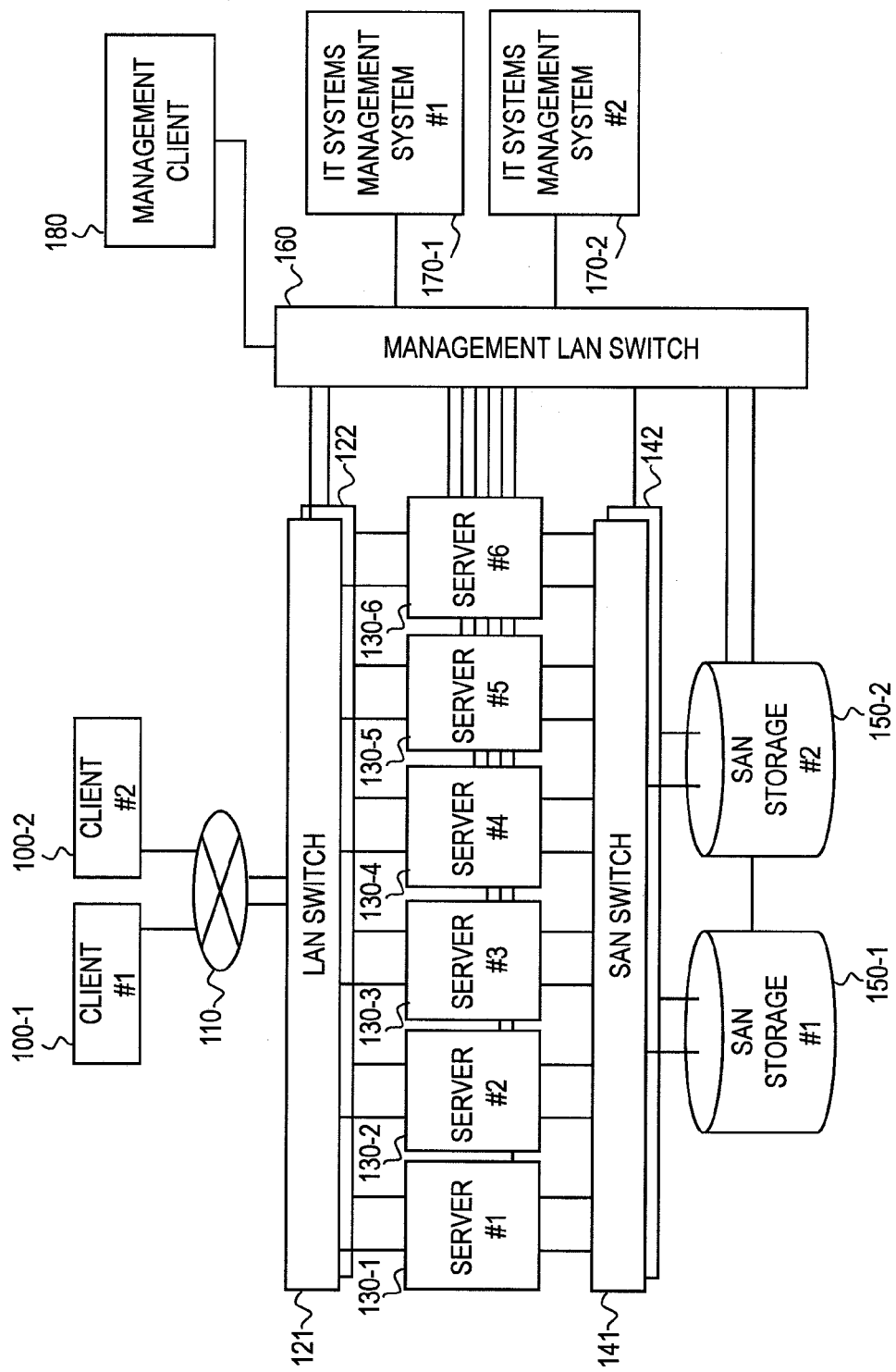
FIG. 1 is a block diagram illustrating an example of the configuration of a computer system that provides virtual computers according to a first embodiment of this invention.

FIG. 1 is a block diagram illustrating an example of the configuration of a computer system that provides virtual computers according to a first embodiment of this invention.

In each of servers 130-1 to 130-6 which are physical computers, a hypervisor described later runs a plurality of virtual computers. The servers 130-1 to 130-6 are coupled to one another via LAN switches 121 and 122, which are coupled to clients 100-1 and 100-2 via a network 110.

The servers 130-1 to 130-6 are coupled to storage 150-1 and storage 150-2 via SAN switches 141 and 142. The virtual computers run on the servers 130-1 to 130-6 respectively provide given services to the clients 100-1 and 100-2.

The servers 130-1 to 130-6 are also coupled via a management LAN switch 160 to IT systems management systems 170-1 and 170-2 and to a management client 180. The IT systems management systems 170-1 and 170-2 are physical computers that manage the system structure and status of the servers 130-1 to 130-6. One of the IT systems management systems 170-1 and 170-2 is the active system and the other is the standby system in order to keep the redundancy of the virtual computer system. In the following description, the IT systems management system 170-1 is the active system. The management client 180 gives the IT systems management system information on a client that uses the virtual computer system (hereinafter referred to as tenant), an instruction on which physical computing resources are allocated to a virtual computer, and the like.

The clients 100-1 and 100-2 are collectively referred to as clients 100 minus a number following a hyphen. Similarly, the servers 130-1 to 130-6 are collectively referred to as servers 130, the storage 150-1 and the storage 150-2 are collectively referred to as storages 150, and the IT systems management system 170-1 which is the active-system is denoted by 170.

In the virtual computer system of this invention, a plurality of tenants use virtual computers run on the servers 130 and, when the load on the servers 130 of one tenant, a tenant A, rises, one of the servers 130 of another tenant, a tenant B, that is suitable is provided to the tenant A to pass physical computing resources on to the tenant A.

Figure 2:
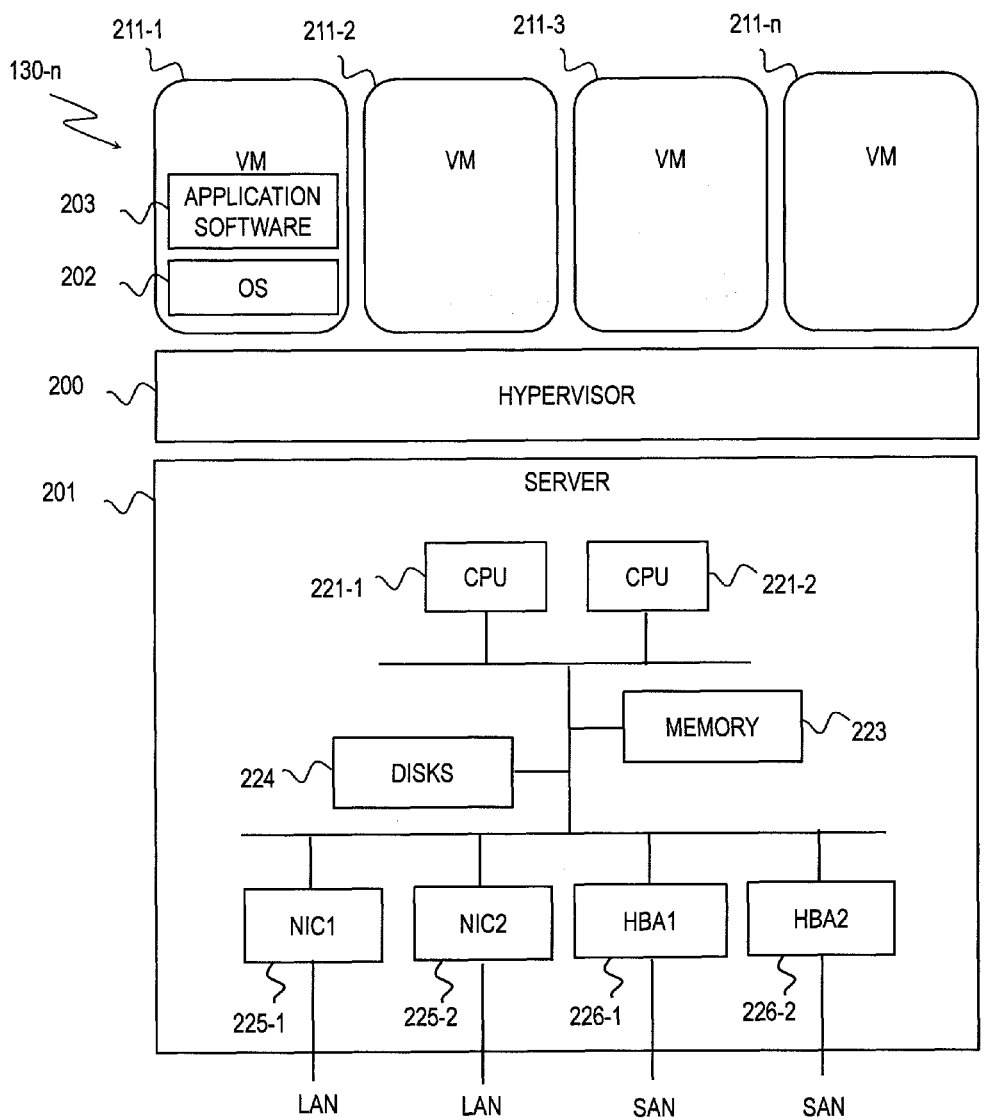
FIG. 2 is a block diagram illustrating an example of a server which provides virtual computers according to the first embodiment of this invention.

FIG. 2 is a block diagram illustrating an example of a server 130-n which provides virtual computers. The servers 130-1 to 130-6 have the same system structure and only differ from one another in the count of virtual computers 211-1 to 211-n to run and which resources are allocated. The virtual computers 211-1 to 211-n are collectively referred to as virtual computers 211 in the following description.

The server 130 is a physical computer that includes a plurality of processors (CPUs in the drawing) 221-1 and 221-2, which performs computing, a memory 223, which holds data and programs, a disk drive 224, which stores programs and data, network interfaces (NICs in the drawing) 225-1 and 225-2, which are coupled to the LAN switch 121 (or 122) and the management LAN switch 160, and host bus adapters (HBAs in the drawing) 226-1 and 226-2, which are coupled to the SAN switches 141 and 142.

The processors 221-1 and 221-2, when activated, read a hypervisor 200 out of the disk drive 224 and load the hypervisor 200 in the memory 223 to execute. The hypervisor 200 allocates physical computing resources of the server 130 to a plurality of virtual computers 211 to run the virtual computers 211. Each virtual computer 211 executes an OS 202 on which given application software 203 is executed.

Figure 3:
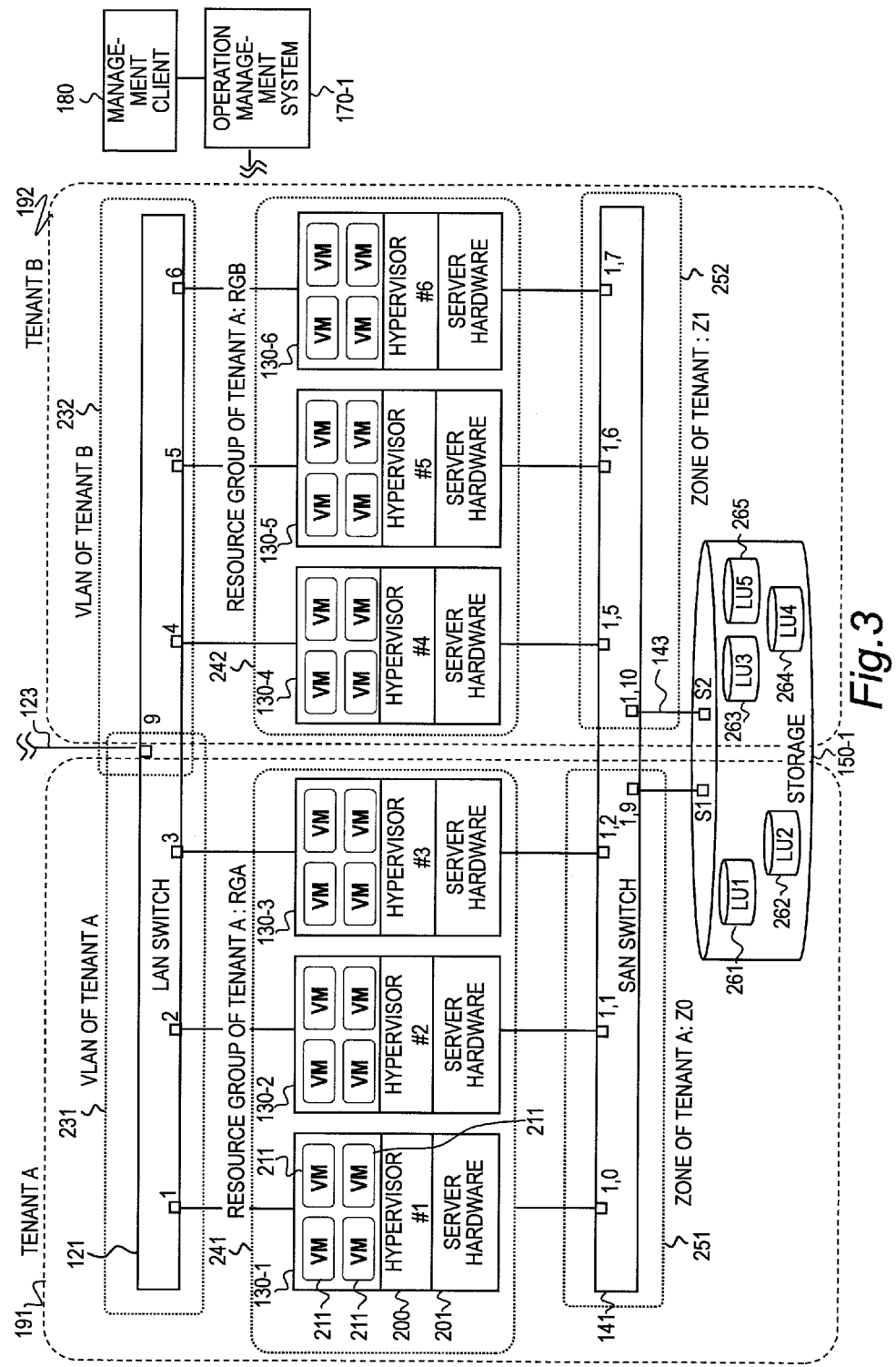
FIG. 3 is a block diagram illustrating an example of computing resources in which the servers are allocated to the tenants A and B according to the first embodiment of this invention.

FIG. 3 is a block diagram illustrating an example of computing resources in which the servers 130 are allocated to the tenants A and B.

In the example of FIG. 3, the servers 130-1 to 130-3 are allocated to the tenant A and the servers 130-4 to 130-6 are allocated to the tenant B.

Computing resources of the servers 130-1 to 130-3 used by the tenant A include pieces of server hardware 201, which are physical computing resources, hypervisors 200, which are virtualization modules for providing the virtual computers 211, and the plurality of virtual computers 211, and constitute a resource group RGA.

Similarly, computing resources of the servers 130-4 to 130-6 used by the tenant B include pieces of server hardware 201, which are physical computing resources, hypervisors 200, which are virtualization modules for providing the virtual computers 211, and the plurality of virtual computers 211, and constitute a resource group RGB.

The servers 130-1 to 130-3 used by the tenant A are coupled to ports 1 to 3 of the LAN switch 121. These ports 1 to 3 and a port 9 are coupled by a VLAN 231, which is set in the LAN switch 121. The port 9 is coupled to the network 110 via a communication path 123, and enables the servers 130-1 to 130-3 coupled to the ports 1 to 3 to communicate with the client 100.

The servers 130-3 to 130-6 used by the tenant B are coupled to ports 4 to 6 of the LAN switch 121. These ports 4 to 6 and a port 9 are coupled by a VLAN 232, which is set in the LAN switch 121. The port 9 is coupled to the network 110 via a communication path 123, and enables the servers 130-4 to 130-6 coupled to the ports 4 to 6 to communicate with the client 100.

The servers 130-1 to 130-3 used by the tenant A are coupled to ports 1.0 to 1.3 of the SAN switch 141. These ports 1.0 to 1.3 and a port 1.9 are coupled by a zone Z0, which is set in the SAN switch 141. The port 1.9 is coupled to a port S1 of the storage 150-1 and can access a logical unit (hereinafter abbreviated as LU) 1 (261) and an LU 2 (262). The servers 130-1 to 130-3 can thus access the LU 1 and LU 2.

The servers 130-1 to 130-3 used by the tenant B are coupled to ports 1.5 to 1.7 of the SAN switch 141. These ports 1.5 to 1.7 and a port 1.10 are coupled by a zone Z1, which is set in the SAN switch 141. The port 1.10 is coupled to a port S2 of the storage 150-1 and can access a logical unit LU 3 (263), an LU 4 (264), and an LU 5 (265). The servers 130-4 to 130-6 can thus access the LU 3 and LU 5. The settings of the LAN switch 121, the SAN switch 141, and the resource groups are set by the IT systems management system 170 as will be described later.

A Distributed Resource Scheduler (DRS) or PRO described in the related examples is installed in the IT systems management system 170 to level the load among the servers 130 by migrating virtual computers within the resource groups RGA and RGB.

Figure 4:
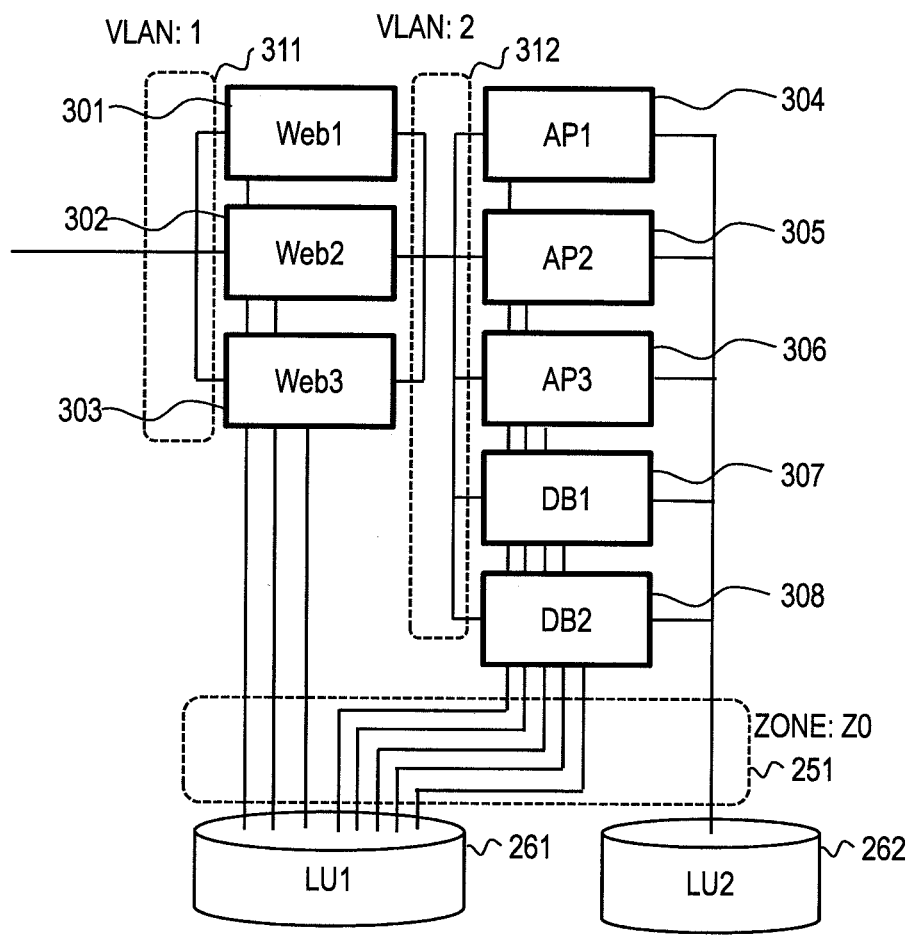
FIG. 4 is a block diagram illustrating an example of services that are executed by the tenant A and the VLAN and zone of the tenant A according to the first embodiment of this invention.

FIG. 4 is a block diagram illustrating an example of services that are executed by the tenant A and the VLAN and zone of the tenant A. Illustrated in FIG. 4 is an example of Web three-tier application software in which three of the twelve virtual computers 211 of FIG. 3 (VMs 211 in FIG. 3) are run as Web servers 301 to 303, three are run as AP (application software) servers 304 to 306, and two are run as DB servers 307 and 308.

The VLAN 231 (illustrated in FIG. 3) of the LAN switch 121 used by the servers 130 of the tenant A is constituted of two VLANs of FIG. 4, a VLAN 1 (311) and a VLAN 2 (312).

The zone Z0 has paths used respectively by the servers 301 to 308, which are all the servers allocated to the tenant A, to access the logical unit LU 1 and a path used by the application servers 304 to 306 and the DB servers 307 and 308 to access LU 2. The logical unit LU 1 is an area for saving the virtual computer images (in the VMDK format in the case of WMware and in the VHD format in the case of MS) of the virtual computers 211, and a storage place shared in order to migrate the virtual computers 211. The logical unit LU2 is a data area accessed by the AP servers and the DB servers. The Web servers, which store data in local disks in this example, may instead store data in an external storage such as LU 2. Alternatively, there may be provided an LU for the Web servers, an LU for the AP servers, and an LU for the DB servers.

Figure 5A:
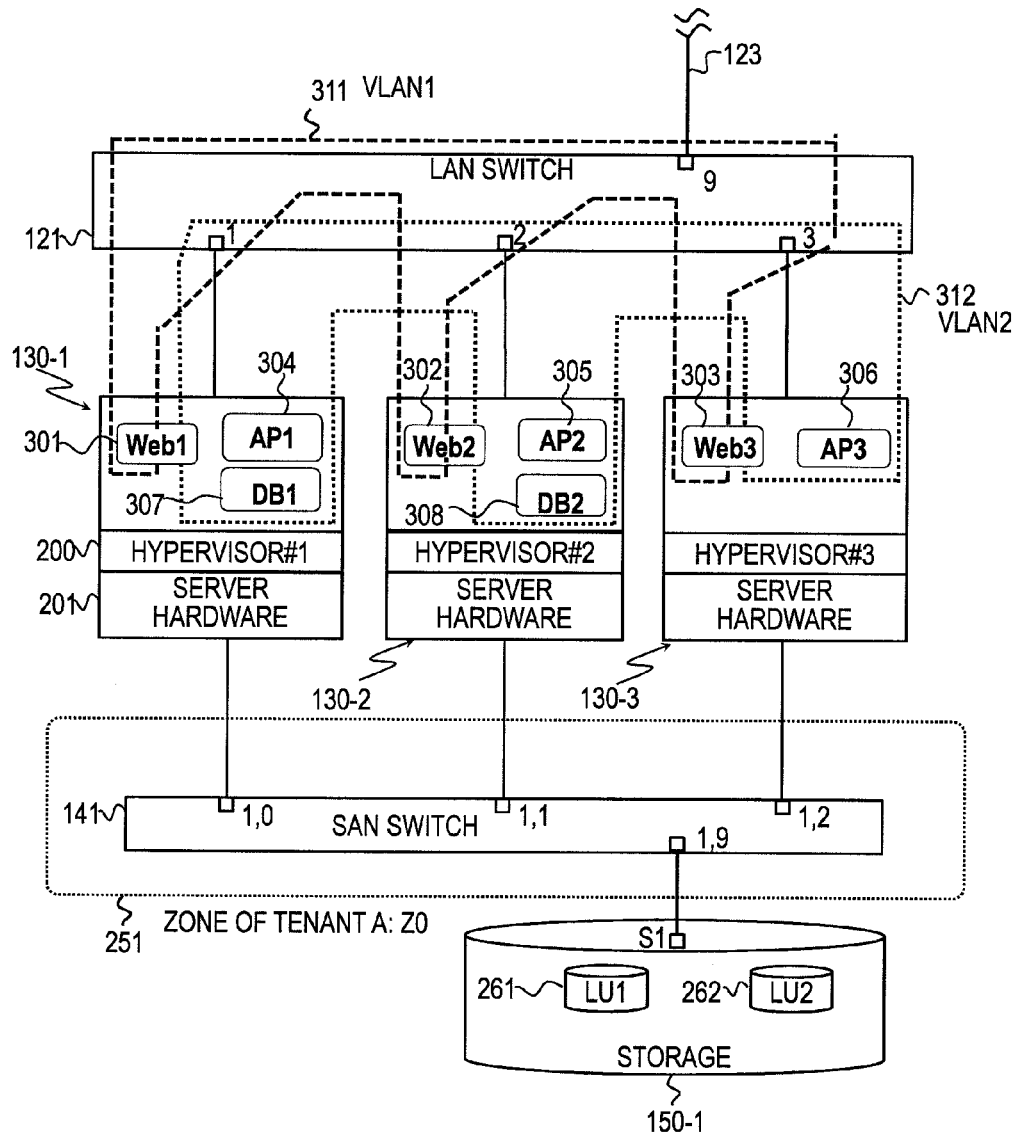
FIG. 5A is a block diagram illustrating the relation of services executed by the tenant A and the VLAN and zone of the tenant A to the LAN switch and SAN switch of the tenant A according to the first embodiment of this invention.

FIG. 5A is a block diagram illustrating the relation of services executed by the tenant A and the VLAN and zone of the tenant A to the LAN switch and SAN switch of the tenant A. In the example of FIG. 5A, three of the twelve virtual computers (VMs in the drawings) 211 operate as the Web servers 301 to 303, three operate as the AP (application software) servers 304 to 306, and two operate as the DB servers 307 and 308. The Web servers 301 to 303 each have two network interfaces (NICs) one of which belongs to the VLAN 1 of the LAN switch 121 and is set in a manner that allows communication with the client 100 via the communication path 123 of the port 9 and the network 110. The other network interface (NIC) of each of the Web servers 301 to 303, the AP servers 304 to 306, and the DB servers 307 and 308 belong to the VLAN 2, and can thus communicate with one another.

Figure 5B:
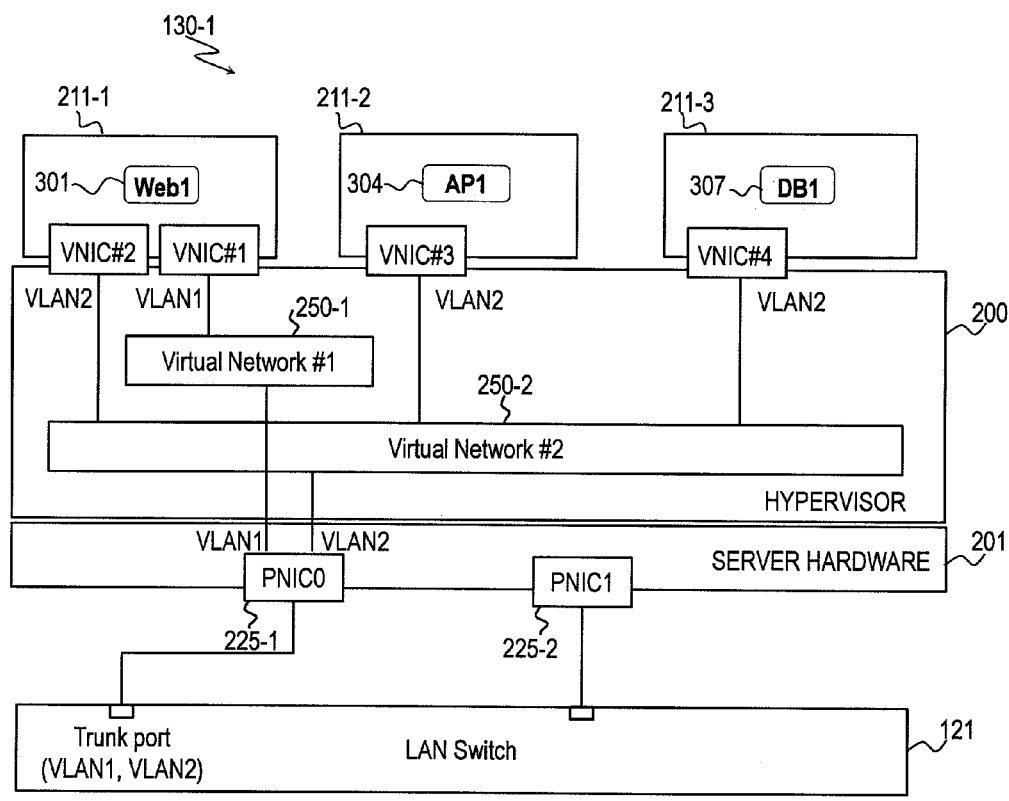
FIG. 5B is a block diagram illustrating an example of virtual switch settings that are set in the hypervisor of the server of the tenant A according to the first embodiment of this invention.

FIG. 5B is a block diagram illustrating an example of virtual switch settings that are set in the hypervisor 200 of the server 130-1 of the tenant A.

The network interface NIC 1 (225-1) of FIG. 2 corresponds to a physical NIC (PNIC 0) of FIG. 5B, and the hypervisor 200 provides virtual network interfaces VNIC #1 to VNIC #4 which are obtained by virtualization the physical PNIC 0 to the virtual computers 211-1 to 211-3. Two virtual network interfaces VNIC #1 and VNIC #2 are incorporated in the virtual computer 211-1.

A virtual switch of the hypervisor 200 couples a virtual network 250-1, which couples the virtual network interface VNIC #1 and the physical PNIC 0, and the virtual network interfaces VNIC #2 to VNIC #4, which are respectively provided to the virtual computers 211-1 to 211-3, to a virtual network 250-2. The hypervisor 200 sets the virtual networks 250-1 and 250-2 so that the virtual network 250-1 belongs to the VLAN 1 whereas the virtual network 250-2 belongs to the VLAN 2.

Setting the virtual networks in this manner allows the Web server 301 (the virtual computer 211-1) to communicate with the client 100 via the external network 110 via the VLAN 1 of the virtual network 250-1. The virtual network interfaces VNIC #3 and VNIC #4 of the virtual computer 211-2 which provides the AP server 304 and the virtual computer 211-3 which provides the DB server 307 can communicate with the virtual network interface VNIC #2 of the Web server 301 via the virtual network 250-2, but cannot access the VLAN 1. The AP server 304 provided by the virtual computer 211-2 and the DB server 307 provided by the virtual computer 211-3 are thus cut off from the external network 110 to ensure security.

In the example given here, the hypervisor 200 is installed in a manner that allows the virtualization module to define a virtual switch inside, which makes it possible to define association relations among the virtual network interfaces VNIC #1 to VNIC #4, virtual networks to which the virtual network interfaces belong, and physical network interfaces through which the virtual networks communicate with an external server.

VLAN settings are set in the virtual networks within the hypervisor 200, and hence virtual switch settings need to be changed in the case where the tenant to which one physical server 130 belongs is to be switched to another tenant when the system is run in a manner that requires a plurality of virtual computers 211 running on the physical server 130 to belong to different VLANs.

In the example of FIG. 5B, the virtual switch of the hypervisor 200 sets two virtual networks VN #1 and VN #2, the virtual network VN #1 is allocated the VLAN 1, and VN #2 is allocated the VLAN 2. The virtual networks VN #1 and VN #2 share one physical network interface (PNIC 0). The port 1 of the physical LAN switch 121 is therefore a trunk port that allows a plurality of VLAN tags, a tag 1 and a tag 2, to pass. All hypervisors 200 in the same tenant have the same virtual network settings to make the migration of the virtual computers 211 within the tenant possible. On the other hand, migration between different tenants which have different virtual network settings requires a settings change as will be described later.

Figure 6A:
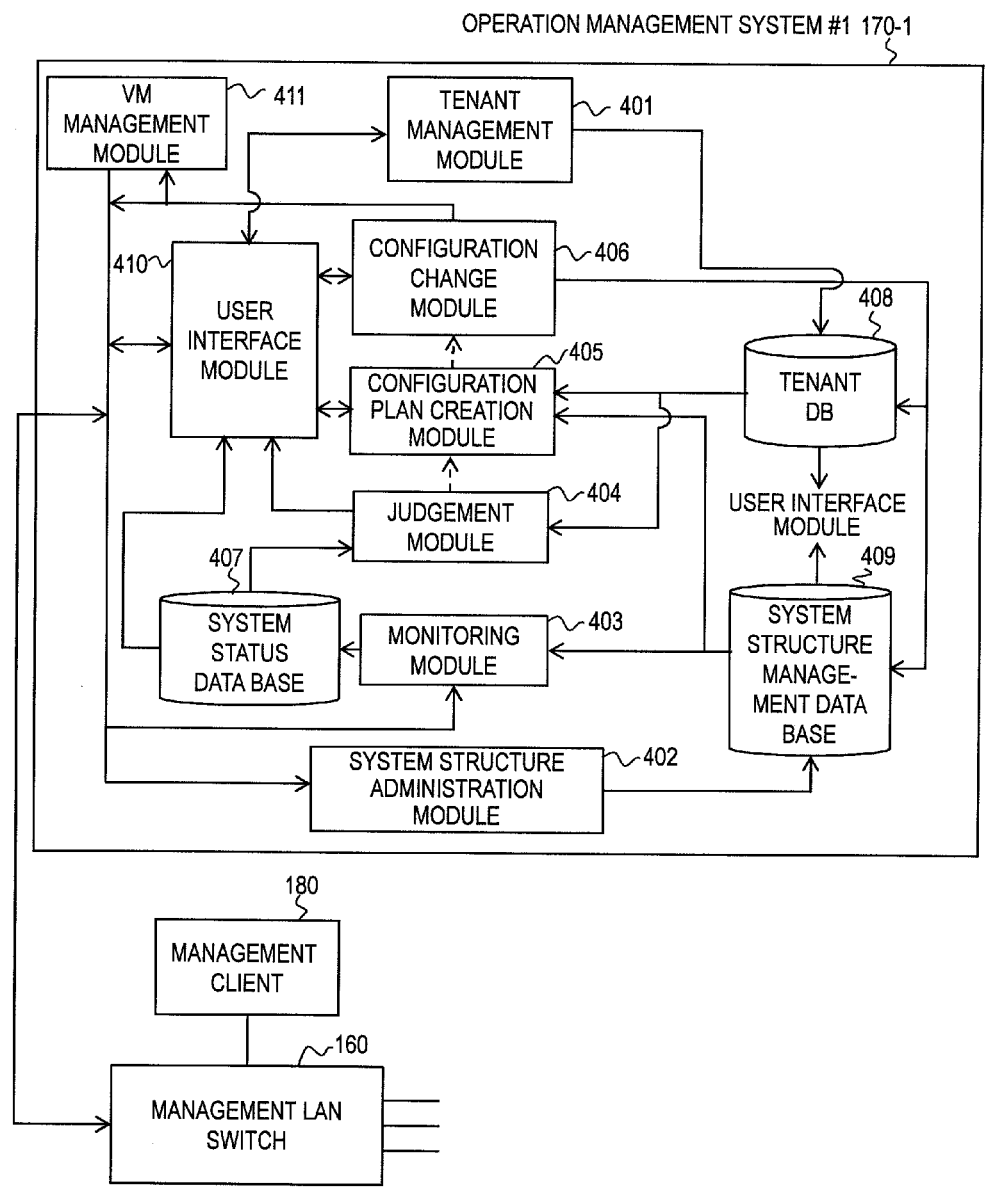
FIG. 6A is a block diagram illustrating an example of function elements of the IT systems management system according to the first embodiment of this invention.

FIG. 6A is a block diagram illustrating an example of function elements of the IT systems management system (a management server) 170-1, which manages resources in the computer system. The IT systems management system 170-1 is the active system and the IT systems management system 170-2, which is the standby system, has the same system structure as that of the active system.

The IT systems management system 170-1 determines which computing resources are to be allocated for each tenant based on an input from the management client 180, generates a resource group, and instructs the hypervisor 200 of each server 130 to generate the virtual computers 211.

When the load becomes unbalanced among the servers 130 of the same resource group, the IT systems management system 170-1 attempts to level the load by migrating the virtual computers 211 between the servers 130. In the case where the load is unbalanced among the servers 130 of different tenants, the IT systems management system 170-1 attempts to level the load among different tenants by passing computing resources on from one tenant to another tenant.

The IT systems management system 170-1 includes a user interface module 410, which provides a graphical user interface (GUI) to the management client 180, a tenant management module (a group management module) 401, which stores information of each tenant input from the management client 180 and manages computing resources and the like for each tenant, a system structure administration module 402, which administrate the system structure of computing resources such as the servers 130 and the virtual computers 211, a monitoring module 403, which manages the status of each server 130, a judgment module 404, which judges whether to change the allocation of computing resources when a load imbalance among the servers 130 is detected, a configuration plan creation module 405, which creates an allocation configuration plan for each tenant and for each resource group in response to an instruction from the judgment module 404, a configuration change module 406, which issues a computing resource allocation changing instruction when the management client 180 or the like approves a configuration plan, a VM management module 411, which manages the generation, migration, and deletion of the virtual computers 211, a system structure management database 409, which stores system structure information of the computer system, a tenant database 408, which stores information of tenants, and a status database 407, which accumulates the statuses of the servers 130.

The IT systems management systems 170 have the same hardware 201 as that of the server 130 illustrated in FIG. 2. A duplicate description on the hardware 201 is therefore omitted. The function modules described above are stored as programs in the disk 224, which is a storage medium, and loaded to the memory 233 to be executed by the processors 221-1 and 221-2.

Figure 6B:
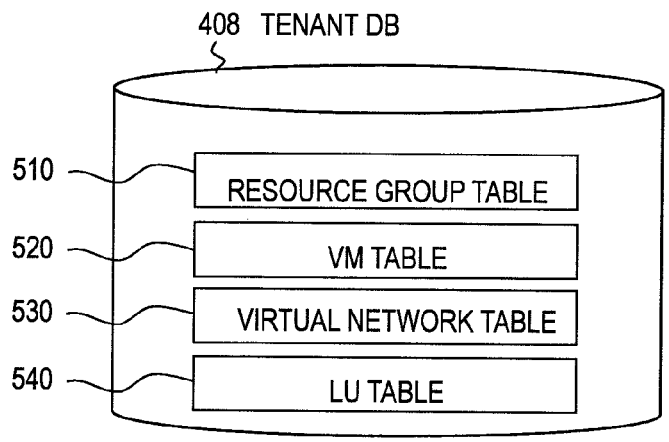
FIG. 6B is a block diagram illustrating an example of the tenant database according to the first embodiment of this invention.

FIG. 6B is a block diagram illustrating an example of the tenant database 408. The tenant database 408 includes a resource group table 510, which is described later, a VM table 520, which is for managing the virtual computers 211, a virtual network table 530, which is for managing for each tenant information of virtual networks (virtual switches) used, and an LU table 540, which is for managing for each tenant information of LUs.

Figure 6C:
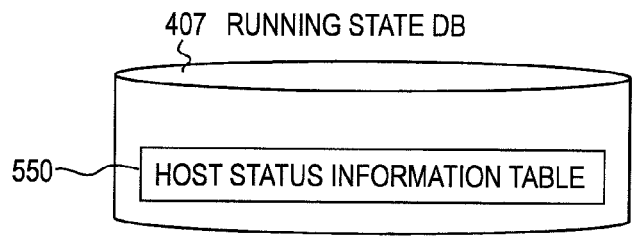
FIG. 6C is a block diagram illustrating an example of the status database according to the first embodiment of this invention.

FIG. 6C is a block diagram illustrating an example of the status database 407. The status database 407 includes a host status information table 550, which is described later.

Figure 6D:
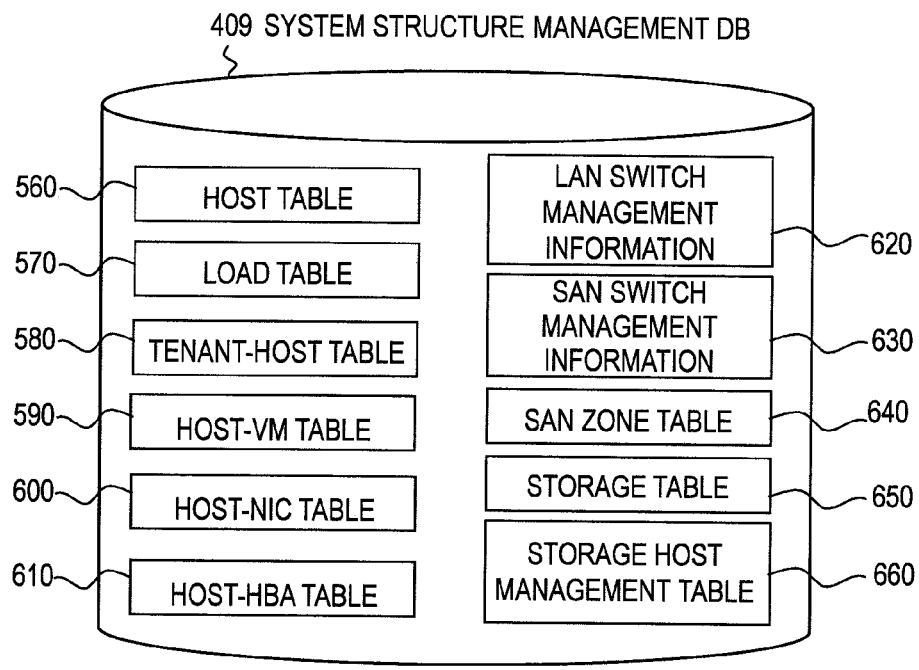
FIG. 6D is a block diagram illustrating an example of the system structure management database according to the first embodiment of this invention.

FIG. 6D is a block diagram illustrating an example of the system structure management database 409. The system structure management database 409 includes a host table 560, a load table 570, a tenant-host table 580, a host-VM table 590, a host-NIC table 600, a host-HBA table 610, LAN switch management information 620, SAN switch management information 630, a SAN zone table 640, a storage table 650, and a storage-host management table 660, which are described later.

FIG. 7 is a diagram illustrating an example of the resource group table 510. Each entry of the resource group table 510 is constituted of a tenant ID field for storing the identifier of a tenant and a resource group ID field for storing the identifier of a resource group that is allocated to the tenant. The resource group table 510 is set with the use of an input from the management client 180, which is operated by an administrator.

FIG. 8 is a diagram illustrating an example of the VM table 520. Each entry of the VM table 520 is constituted of a tenant ID field for storing the identifier of a tenant and a VM ID field for storing the identifier of the virtual computer 211 that is allocated to the tenant. The VM table 510 is set by the tenant management module 401, the configuration change module 406, and the like.

FIG. 9 is a diagram illustrating an example of the virtual network table 530. Each entry of the virtual network table 530 is constituted of a tenant ID field for storing the identifier of a tenant, a virtual network NAME field for storing the name of a virtual network that is set in the hypervisor 200 of the tenant, an NIC_ID field for storing the identifier of a network interface, and a VLAN_ID field for storing the identifier of a VLAN. The virtual network table 530 is set by the tenant management module 401, the configuration change module 406, and the like.

FIG. 10 is a diagram illustrating an example of the LU table 540. Each entry of the LU table 540 is constituted of a tenant ID field for storing the identifier of a tenant, a Storage ID field for storing the identifier of the relevant storage 150, a PORT field for storing the identifier of a port of the storage 150, an LUN field for storing the identifier of a logical unit, and a Zone field for storing the identifier of a zone of a SAN switch. The LU table 540 is set by the tenant management module 401, the configuration change module 406, the system structure administration module 402, with the use of an input from the management client 180, and the like.

FIG. 11 is a diagram illustrating an example of the host status information table 550 of the status database 407. Each entry of the host status information table 550 is constituted of a time stamp field for storing a date/time, an instance ID field for storing the identifier of one hypervisor 200, a Type field for storing the type of a load, and a Value field for storing the value of the load.

The identifier of the hypervisor 200 stored in the instance ID field is an instance ID "Host 01" in the case of the hypervisor #1 of FIG. 5A and an instance ID "Host 02" in the case of the hypervisor #2 of FIG. 5A. Other hypervisors #n are given similar identifiers by the IT systems management system 170.

Types stored in the "Type field" to indicate a load type include "CPU_Busy" which represents the utilization ratio of the processors 221-1 and 221-2 of the server 130, "Mem_Busy" which represents the utilization ratio of the memory 233 of the server 130, "Disk_Busy" which represents the utilization ratio of the HBAs 226-1 and 226-2 of the server 130, and "Nw_Busy" which represents the utilization ratio of the network interfaces 225-1 and 225-2 of the server 130. A value stored in the "Value" field indicates a load value and, for example, "0.23" represents 23%.

Values stored in the host status information table 550 can be obtained from the hypervisor 200 of each server 130 by the monitoring module 403. Alternatively, each hypervisor 200 may measure the load types listed above in given cycles as status information and transmit results of the measurement to the IT systems management system 170.

FIG. 12 is a diagram illustrating an example of the host table 560 of the system structure management database 409. Each entry of the host table 560 is constituted of a field for the rack ID of one server 130 which indicates the location where the server 130 is stored, a Host ID field for storing the identifier of the relevant hypervisor 200, an amount of memory field for storing the capacity of the memory 233 of the server 130, a NW bandwidth field for storing the transfer speed of the relevant network interfaces 225-1 and 225-2, a disk I/O bandwidth field for storing the transfer speed of the relevant HBAs 226-1 and 226-2, and a hypervisor type field for storing the type of the virtualization module. The name of the virtualization module or the like can be stored in the hypervisor type field.

Values set by an administrator or the like through the management client 180 are stored in the host table 560.

FIG. 13 is a diagram illustrating an example of the load table 570 of the system structure management database 409. A load type obtained by each hypervisor 200 from the hardware 201 is set in the load table 570. Each entry of the load table 570 is constituted of a measurement item field for storing the name of a load measured by the hypervisor 200 and a field for an evaluation threshold which is used to judge when to migrate the virtual computers 211 and when to reallocate physical computing resources.

For example, an entry that has "HOST_CPU_Busy" as the measurement item indicates that the hypervisor 200 measures the load on the processors 221-1 and 221-2 and that the migration of the virtual computers 221 or the like is started when the measured load exceeds an evaluation threshold "0.7." An entry that has "HOST_Free_Memory_GB" as the measurement item indicates that the hypervisor 200 measures the free capacity of the memory 233 in units of gigabytes. An entry that has "HOST_Disk_Throughput_MB" as the measurement item indicates that the hypervisor 200 measures the transfer speed of the HBAs 226-1 and 226-2 in units of megabytes/second. An entry that has "HOST_NW_Throughput_MB" as the measurement item indicates that the hypervisor 200 measures the transfer speed of the network interfaces 225-1 and 225-2 in units of megabytes/second.

FIG. 14 is a diagram illustrating an example of the tenant-host table 580 of the system structure management database 409. The tenant-host table 580 is a table for managing the hypervisors 200 and the servers 130 (hosts) that are allocated to the respective tenants, and is managed by the tenant management module 401. Each entry of the tenant-host table 560 is constituted of a tenant ID field for storing the ID of a tenant and a Host ID field for storing the identifier of the allocated hypervisor 200. Values set by an administrator through the management client 180 can be set as the identifiers of the hypervisors 200. The following description is about an example in which a combination of one hypervisor 200 and one server 130 is treated as a host and a host is identified by the identifier of the hypervisor 200.

FIG. 15 is a diagram illustrating an example of the host-VM table 590 of the system structure management database 409. The host-VM table 590 is a table for managing the virtual computers 211 that are generated by the respective hypervisors 200, and is administrated by the system structure administration module 402. Each entry of the host-VM table 590 is constituted of a Host ID field for storing the identifier of one hypervisor 200 and a VM ID field for storing the identifier of the generated virtual computer 211. The identifiers of the virtual computers 211 may be identifiers given by their respective hypervisors 200, or the system structure administration module 402 may give identifiers to the respective virtual computers 211.

FIG. 16 is a diagram illustrating an example of the host-NIC table 600 of the system structure management database 409. The host-NIC table 600 is a table for managing the physical network interfaces 225 of the respective servers 130, and values obtained from the hypervisors 200 by the system structure administration module 402 are set in the host-NIC table 600.

Each entry of the host-NIC table 600 is constituted of a Host ID field for storing the identifier of one hypervisor 200, an NIC_ID field for storing the identifier of the relevant network interface 225, and an MAC address field.

FIG. 17 is a diagram illustrating an example of the host-HBA table 610 of the system structure management database 409. The host-HBA table 610 is a table for managing the physical HBAs 226 of the respective hosts (the servers 130 and the hypervisors 200), and values obtained from the hypervisors 200 by the system structure administration module 402 are set in the host-HBA table 610.

Each entry of the host-HBA table 610 is constituted of a Host ID field for storing the identifier of one hypervisor 200, an HBA_ID field for storing the identifier of the relevant HBA 226, and an HBA_WWN field for storing a world wide name (WWN).

FIG. 18 is a diagram illustrating an example of the LAN switch management information 620 of the system structure management database 409. The LAN switch management information 620 is a table for managing relations among ports, VLANs, and coupled equipment of the LAN switches 121 and 122, and values obtained respectively from the LAN switches 121 and 122 by the system structure administration module 402 are set in the LAN switch management information 620.

Each entry of the LAN switch management information 620 is constituted of a LAN switch ID field for storing the identifier of the LAN switch 121 or 122, a port number field for storing a port number of the LAN switch 121 or 122, a coupled equipment MAC address field for storing the MAC address of an apparatus that is coupled to the port number, and a VLAN_ID field for storing the identifier of a VLAN of the port number.

FIG. 19 is a diagram illustrating an example of the SAN switch management information 630 of the system structure management database 409. The SAN switch management information 630 is a table for managing relations among ports, domains, and coupled equipment of the SAN switches 141 and 142, and values obtained respectively from the SAN switches 141 and 142 by the system structure administration module 402 are set in the SAN switch management information 620.

Each entry of the SAN switch management information 630 is constituted of a SAN switch ID field for storing the identifier of the SAN switch 141 or 142, a domain ID field for storing domain set for a port number of the SAN switch 141 or 142, a port number field for storing the port number of the SAN switch 141 or 142, and a coupled equipment WWN field for storing the WWN of an apparatus that is coupled to the port number.

FIG. 20 is a diagram illustrating an example of the SAN zone table 640 of the system structure management database 409. The SAN zone table 640 is a table for managing relations among ports and zones of the SAN switches 141 and 142, and values obtained respectively from the SAN switches 141 and 142 by the system structure administration module 402 are set in the SAN zone table 640.

Each entry of the SAN zone table 640 is constituted of a zone ID field for storing the zone identifier of a SAN, a domain ID field for storing the ID of a domain, and a Port field for storing a port number of the SAN switch 141 or 142.

The SAN switches 141 and 142 in some cases set a host and the relevant storage 150 to different zones on a port-by-port basis, and the SAN zone table 640 may therefore be as illustrated in FIG. 21.

FIG. 21 is a diagram illustrating a modification example of the SAN zone table 640 of the system structure management database 409. Each entry of the SAN zone table 640 may be constituted of a zone ID, a combination of a host-side domain ID and a host-side port number, and a combination of a storage-side domain ID and a storage-side port number of the storage 150.

In another modification example of FIG. 20, WWN zoning may be employed instead of the port zoning described above, and the Port field of FIG. 20 is replaced with a WWN field in this case.

FIG. 22 is a diagram illustrating an example of the storage table 650 of the system structure management database 409. Each entry of the storage table 650 is constituted of a storage ID field for storing the identifier of the storage 150, a PORT field for storing a port number of the storage 150, and a coupled equipment WWN field for storing the WWN of the storage 150.

Values set in these fields are obtained from each storage 150 by the system structure administration module 402.

FIG. 23 is a diagram illustrating an example of the storage-host management table 660 of the system structure management database 409. The storage-host management table 660 is a table for managing the relations of LUs allocated to a host. Each entry of the storage-host management table 660 is constituted of a host group ID field for storing the identifier of a host group, an LUN field for storing the identifiers of LUs that are allocated to the host group, and a coupled equipment WWN field for storing the WWN of equipment (HBA) that accesses the LU. The identifiers of the hypervisors 200 or the identifiers of the servers 130 may be used instead of host group IDs.

Figure 24:
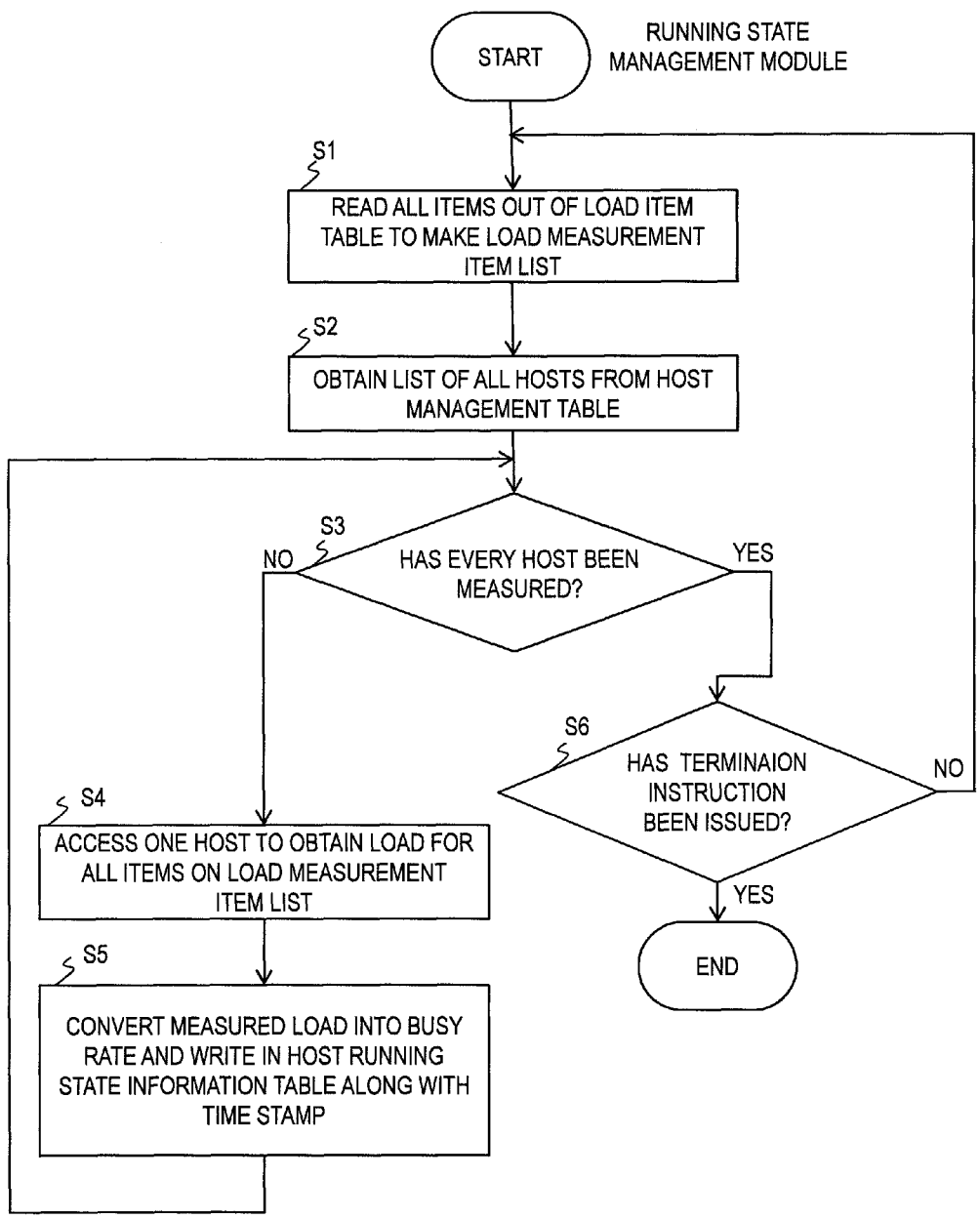
FIG. 24 is a flow chart illustrating an example of processing that is executed in the monitoring module according to the first embodiment of this invention.

FIG. 24 is a flow chart illustrating an example of processing that is executed in the monitoring module 403. This processing is started based on an instruction from the management client 180.

In Step S1, the monitoring module 403 reads the load table 570 of the system structure management database 409 to make a load measurement item list, which lists loads to be measured. In Step S2, the monitoring module 403 reads the host table 560 of the system structure management database 409 to obtain the identifiers of all hosts (hypervisors 200).

In Step S3, the monitoring module 403 judges whether or not the loads have been measured for every host (the hypervisors 200 and the servers 130), and moves to Step S4 when the measurement has not been finished and to Step S6 when the measurement is completed.

In Step S4, the monitoring module 403 accesses one of the hosts (one of the hypervisors 200) to obtain every load on the load measurement item list made in Step S1. In Step S5, the monitoring module 403 converts the obtained load value into a utilization ratio and writes the utilization ratio in the host status information table 550 of the status database 407.

By repeating Steps S1 to S5 described above, the monitoring module 403 obtains loads set in the load table 570 from every host and accumulates status information for each host in the host status information table 550.

After finishing collecting status information for every host in Step S5, the monitoring module 403 proceeds to Step S6 to repeat Steps S1 to S5 until a termination instruction is issued from the management client 180. New values indicating loads are accumulated in the host status information table 550 in this manner.

Figure 25:
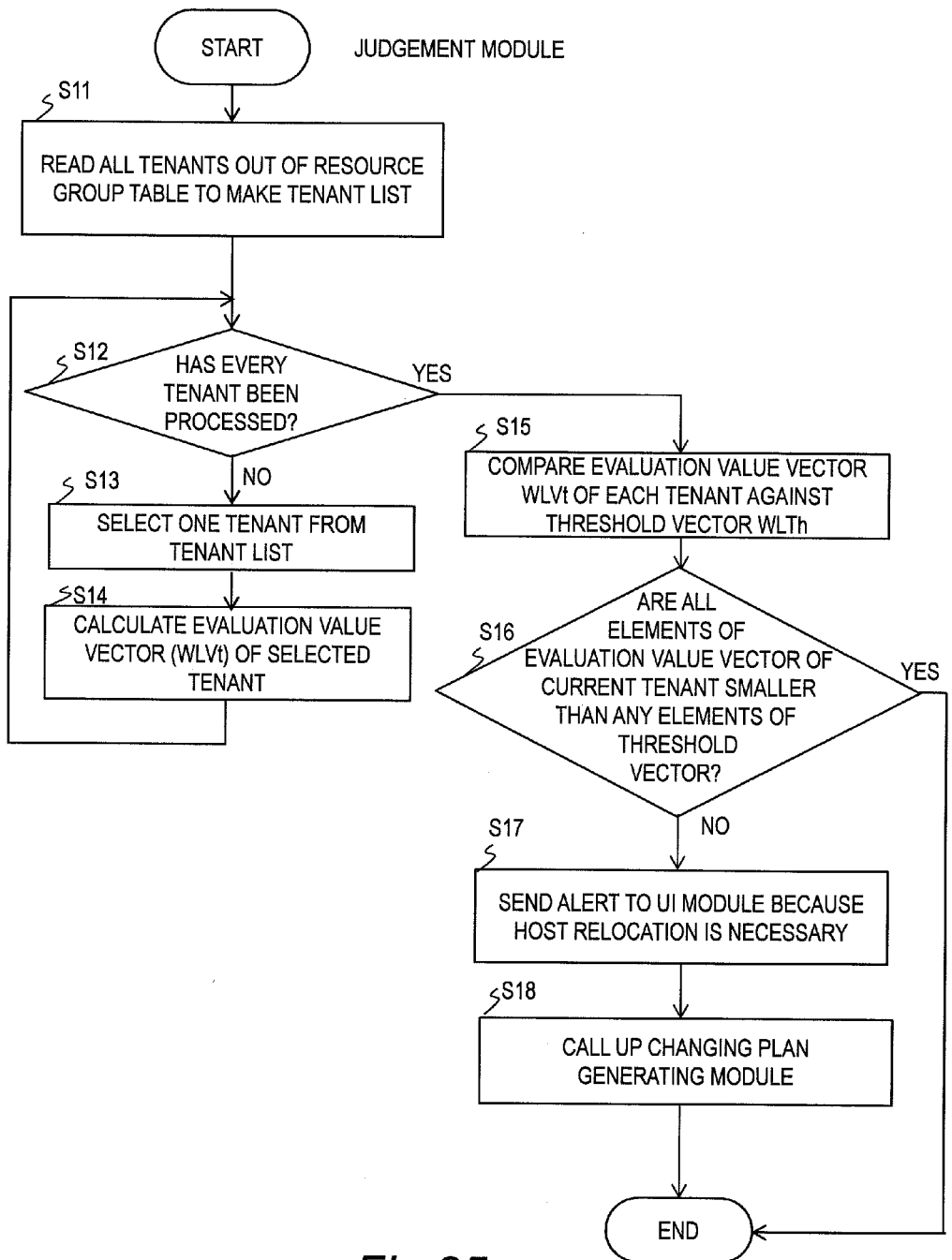
FIG. 25 is a flow chart illustrating an example of processing that is executed in the judgment module according to the first embodiment of this invention.

FIG. 25 is a flow chart illustrating an example of processing that is executed in the judgment module 404. This processing is started based on an instruction from the management client 180. Alternatively, the processing is activated in given cycles (for example, for every ten minutes).

In Step S11, the judgment module 404 first reads the resource group table 510 to obtain all tenants and make a tenant list.

In Step S12, the judgment module 404 judges whether or not Steps S13 and S14 have been completed for every tenant on the tenant list. The judgment module 404 proceeds to Step S15 when every tenant has been processed and moves to Step S13 when not all of the tenants have been processed.

In Step S13, the judgment module 404 selects one tenant from the tenant list made in Step S11. In Step S14, the judgment module 404 calculates an evaluation value vector WLVt of the selected tenant. Details of the evaluation value vector of a tenant are described later with reference to FIG. 26.

After calculating an evaluation value vector for every tenant in Steps S13 and S14, the judgment module 404 proceeds to Step S15. In Step S15, the judgment module 404 compares for each tenant the calculated evaluation value vector WLVt against a preset threshold vector WLTh.

In Step S16, the judgment module 404 ends the processing in the case where all elements in the evaluation value vector of the current tenant are smaller than any elements of the threshold vector. In the case where at least one of elements of the evaluation value vector of the current tenant is equal to or larger than any elements of the threshold vector, on the other hand, the judgment module 404 moves to Step S17.

In Step S17, relocation of the hosts (the hypervisors 200 and the servers 130) (reallocation of computing resources) is necessary and the judgment module 404 therefore sends an alert to the user interface module 410. Receiving the alert, the user interface module 410 sends to the management client 180 a notification to the effect that host relocation is necessary.

The judgment module 404 next proceeds to Step S18 to activate the configuration plan creation module 405. Processing of the configuration plan creation module 405 is described later in detail with reference to FIG. 27.

Through the processing described above, the judgment module 404 calculates an evaluation value vector for every tenant and, in the case where any one of the evaluation value vectors is equal to or larger than a threshold vector, judges that reallocation of computing resources is necessary and sends a notification to the management client 180 to start the generation of a configuration plan.

Figure 26:
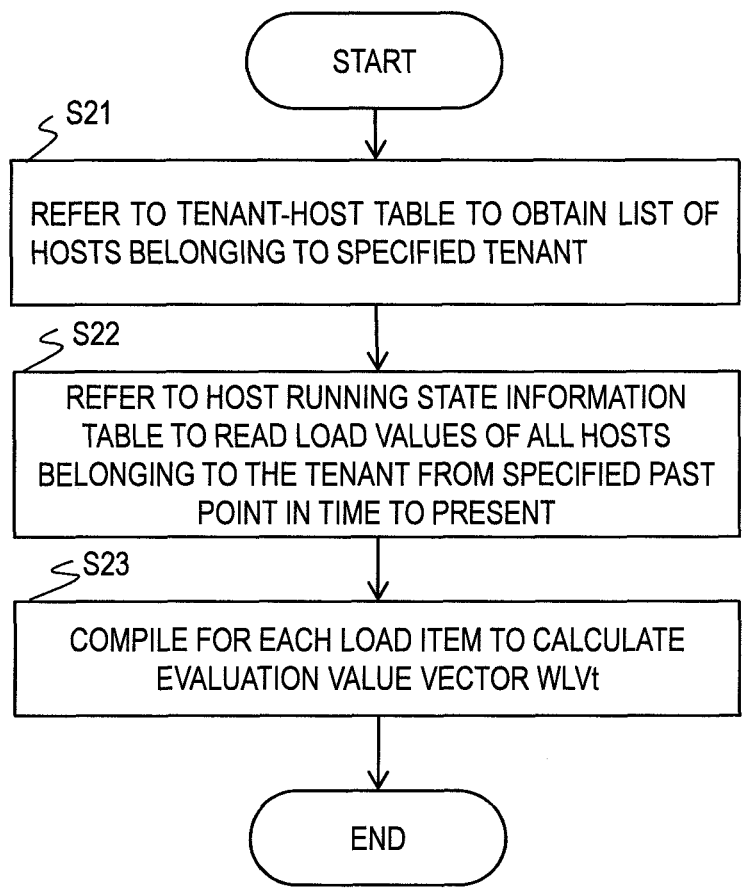
FIG. 26 is a flow chart illustrating an example of the processing executed in Step S14 of FIG. 25 to calculate an evaluation value vector for each tenant according to the first embodiment of this invention.

FIG. 26 is a flow chart illustrating an example of the processing executed in Step S14 of FIG. 25 to calculate an evaluation value vector for each tenant.

In Step S21, the judgment module 404 first refers to the tenant-host table 580 to obtain a list of hosts (the hypervisors 200) that are allocated to the tenant selected in Step S13.

In Step S22, the judgment module 404 refers to the host status information table 550 to read the load values of all the hypervisors 200 that belong to the selected tenant from a preset past point in time to present. The preset past point in time is, for example, five minutes ago and, in the case where the monitoring module 403 measures a type of load in 10-second cycles, thirty load measurements are counted in.

In Step S23, the judgment module 404 compiles, for each load item, the load values read in Step S22 for each of the hosts (the hypervisors 200 and the servers 130), and calculates the evaluation value vector WLVt. The judgment module 404 checks time stamps in the host status information table 550 of FIG. 11 to obtain status information of hosts (the hypervisors 200 and the servers 130) that have relevant instance IDs, and calculates, for each load type "Type", a load value "Value" expressed in busy rate as the evaluation value vector WLVt. The evaluation value vector WLVt of one host is calculated by, for example, the busy rate ("Value") is averaged over five minutes for the CPU category, the memory category, the disk category, and the network category each to obtain average values Lcpu, Lmem, Ldisk, and Lnw, respectively, and using a vector of these average values (Lcpu, Lmem, Ldisk, Lnw) as the evaluation value vector.

Through the processing described above, loads are compiled for each host that constitutes one tenant, and whether the load has exceeded a threshold vector or not can be judged on a tenant-by-tenant basis. The evaluation value vector WLVt of the example described above may be replaced by other values that can be used to judge whether or not the load has exceeded a threshold on a tenant-by-tenant basis.

Figure 27:
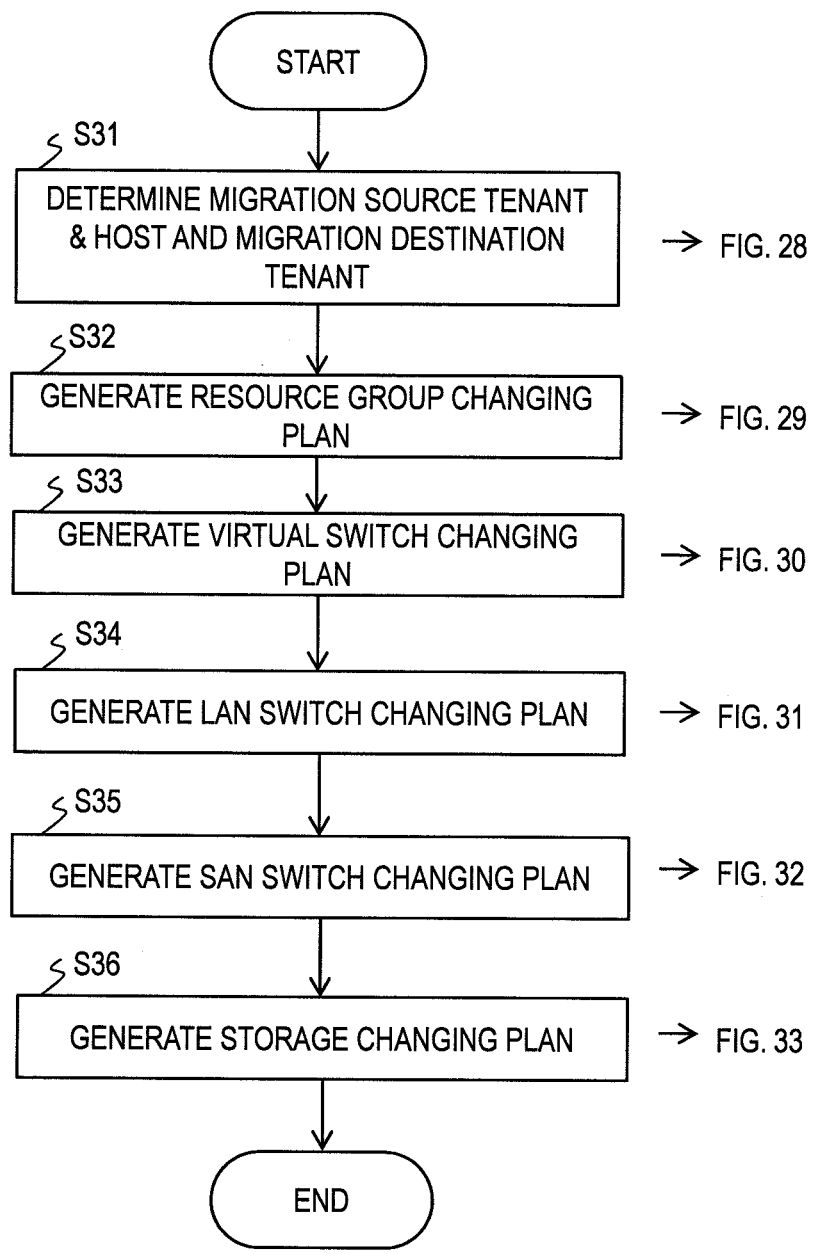
FIG. 27 is a flow chart illustrating an example of processing that is executed by the configuration plan creation module 405 in Step S18 of FIG. 25 according to the first embodiment of this invention.

FIG. 27 is a flow chart illustrating an example of processing that is executed by the configuration plan creation module 405 in Step S18 of FIG. 25.

In Step S31, the configuration plan creation module 405 first determines a migration destination tenant which has the hypervisor 200 whose load element is equal to or larger than a threshold, and a migration source tenant from which one of the hypervisors 200 is to be migrated. The migration source tenant is a tenant of which allocated computing resources are to be reduced, and the migration destination tenant is a tenant of which allocated computing resources are to be increased. This processing is described later in detail with reference to FIG. 28.

The configuration plan creation module 405 next creates in Step S32 a plan to change hosts that constitute a resource group. This processing is described later in detail with reference to FIG. 29.

In Step S33, the configuration plan creation module 405 creates a plan to change virtual networks within the hypervisors 200. This is because different tenants have, in addition to different VLAN settings, different configurations of virtual networks within the hypervisors 200 as illustrated in FIG. 5B, and the virtual networks need to be changed in order to use, for example, the hypervisor 200 of the tenant B as the hypervisor 200 of the tenant A. This processing is described later in detail with reference to FIG. 30.

In Step S34, the configuration plan creation module 405 creates a plan to change the settings of the LAN switches 121 and 122. This is because the VLAN configuration varies from one tenant to another as described above, and the configuration plan creation module 405 creates a plan to change the VLAN settings of the LAN switches 121 and 122 to suit the hypervisor 200 that is to be migrated to a different tenant. This processing is described later in detail with reference to FIG. 31.

In Step S35, the configuration plan creation module 405 creates a plan to change the settings of the SAN switches 141 and 142. This is because the zone configuration varies from one tenant to another as described above, and the configuration plan creation module 405 creates a plan to change the zoning settings of the SAN switches 141 and 142 to suit the hypervisor 200 that is to be migrated to a different tenant. This processing is described later in detail with reference to FIG. 32.

In Step S36, the configuration plan creation module 405 creates a plan to change the settings of the storage 150 in a manner that suits the settings of the SAN switches 141 and 142 as described above. This processing is described later with reference to FIG. 33.

Figure 28:
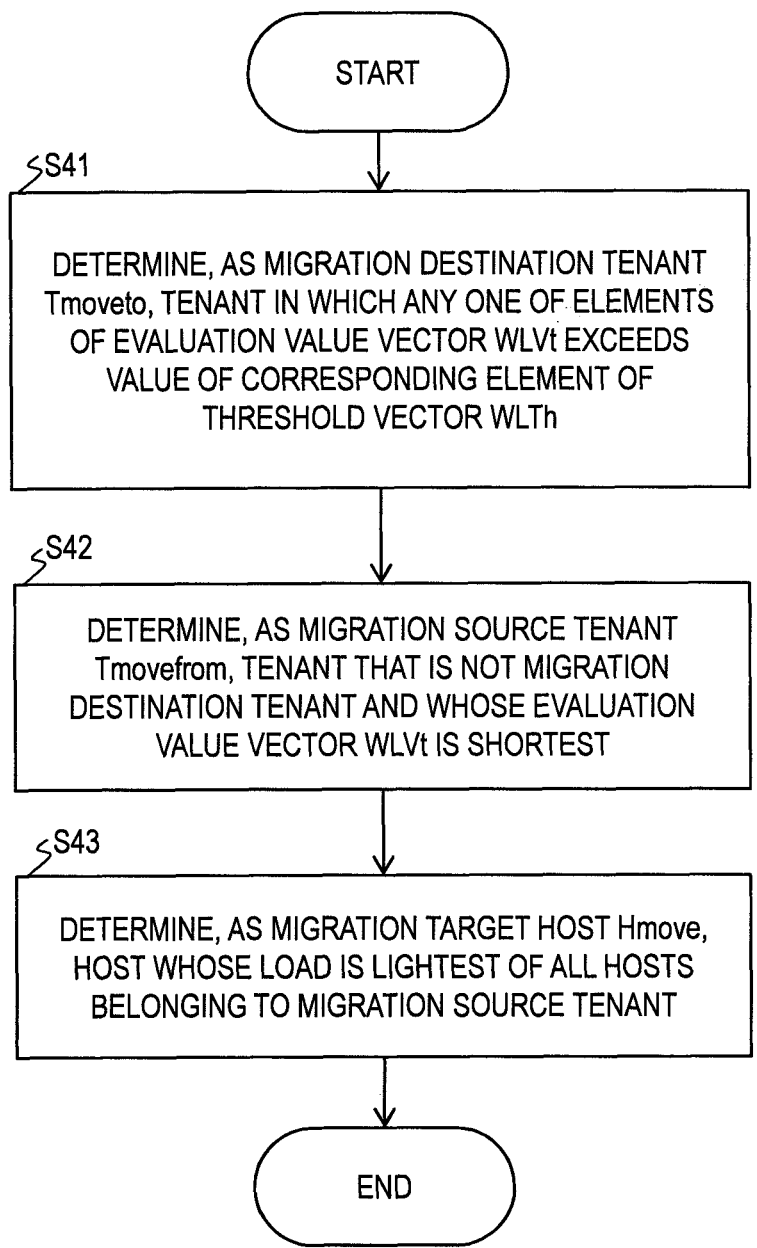
FIG. 28 is a flow chart illustrating an example of the processing that is executed in Step S31 of FIG. 27 to determine a migration source tenant and a migration destination tenant according to the first embodiment of this invention.

FIG. 28 is a flow chart illustrating an example of the processing that is executed in Step S31 of FIG. 27 to determine a migration source tenant and a migration destination tenant.

In Step S41, the configuration plan creation module 405 determines, as a host migration destination tenant Tmoveto, a tenant in which any one of elements of the evaluation value vector WLVt calculated by the judgment module 404 exceeds a corresponding element of the threshold vector WLTh.

In Step S42, the configuration plan creation module 405 determines, as a migration source tenant Tmovefrom from which a host is migrated, a tenant that is not the migration destination tenant and whose evaluation value vector WLVt is shorter than any other evaluation value vectors WLVt calculated by the judgment module 404. In other words, a tenant that has the lightest load of the plurality of tenants is determined as the migration source tenant Tmovefrom.

In Step S43, the configuration plan creation module 405 determines, as a migration target host Hmove, a host that has the lightest load (the smallest evaluation value vector WLVt) of all the hosts belonging to the migration source tenant.

Through the processing described above, the configuration plan creation module 405 identifies a host to be migrated from one tenant to another.

Figure 29:
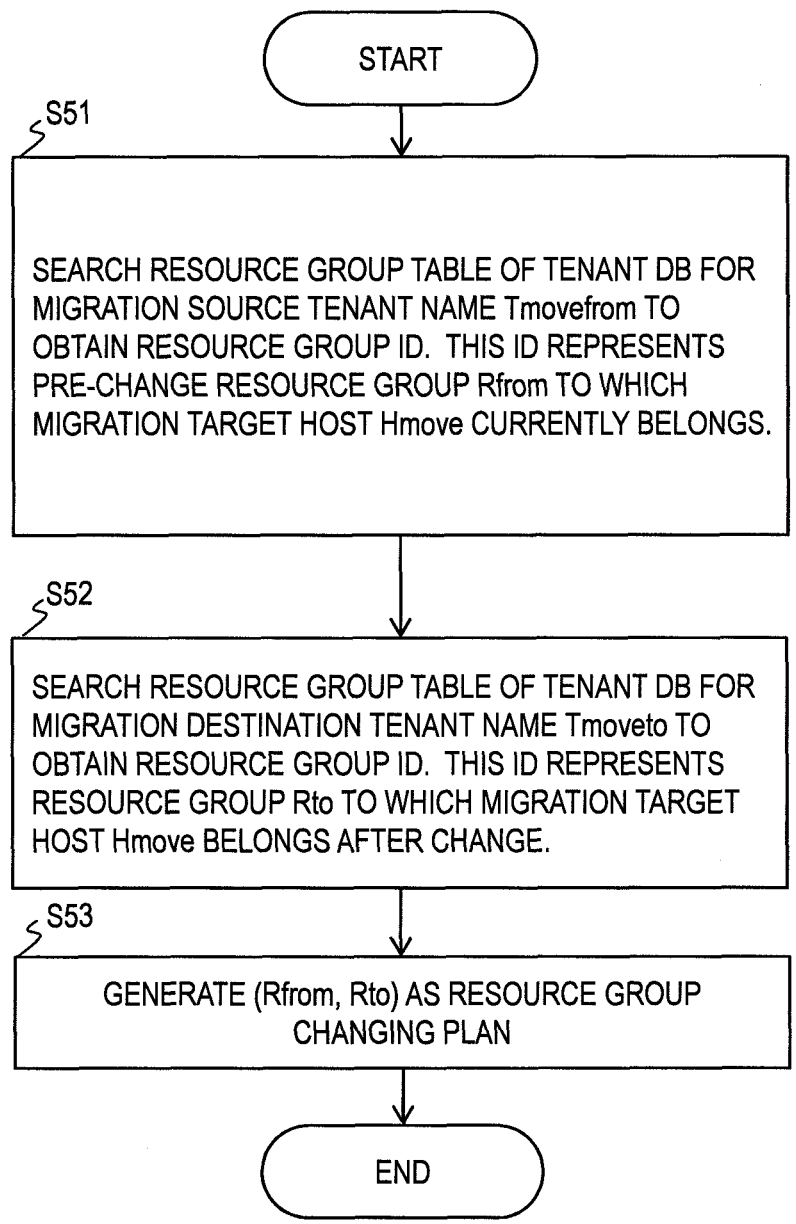
FIG. 29 is a flow chart illustrating an example of the processing executed in Step S32 of FIG. 27 to create a resource group configuration plan according to the first embodiment of this invention.

FIG. 29 is a flow chart illustrating an example of the processing executed in Step S32 of FIG. 27 to create a resource group configuration plan.

In Step S51, the configuration plan creation module 405 searches the resource group table 510 of the tenant database 408 for the migration source tenant name Tmovefrom to obtain a resource group ID. The obtained resource group ID represents a pre-change resource group Rfrom to which the migration target host Hmove currently belongs.

In Step S52, the configuration plan creation module 405 searches the resource group table 510 of the tenant database 408 for the migration destination tenant name Tmoveto to obtain a resource group ID. The obtained resource group ID represents a post-change resource group Rto to which the migration target host Hmove currently belongs.

In Step S53, the configuration plan creation module 405 creates a resource group ID set (Rfrom, Rto) as a resource group configuration plan.

Through the processing described above, the configuration plan creation module 405 creates a resource group configuration plan for migrating a host.

Figure 30:
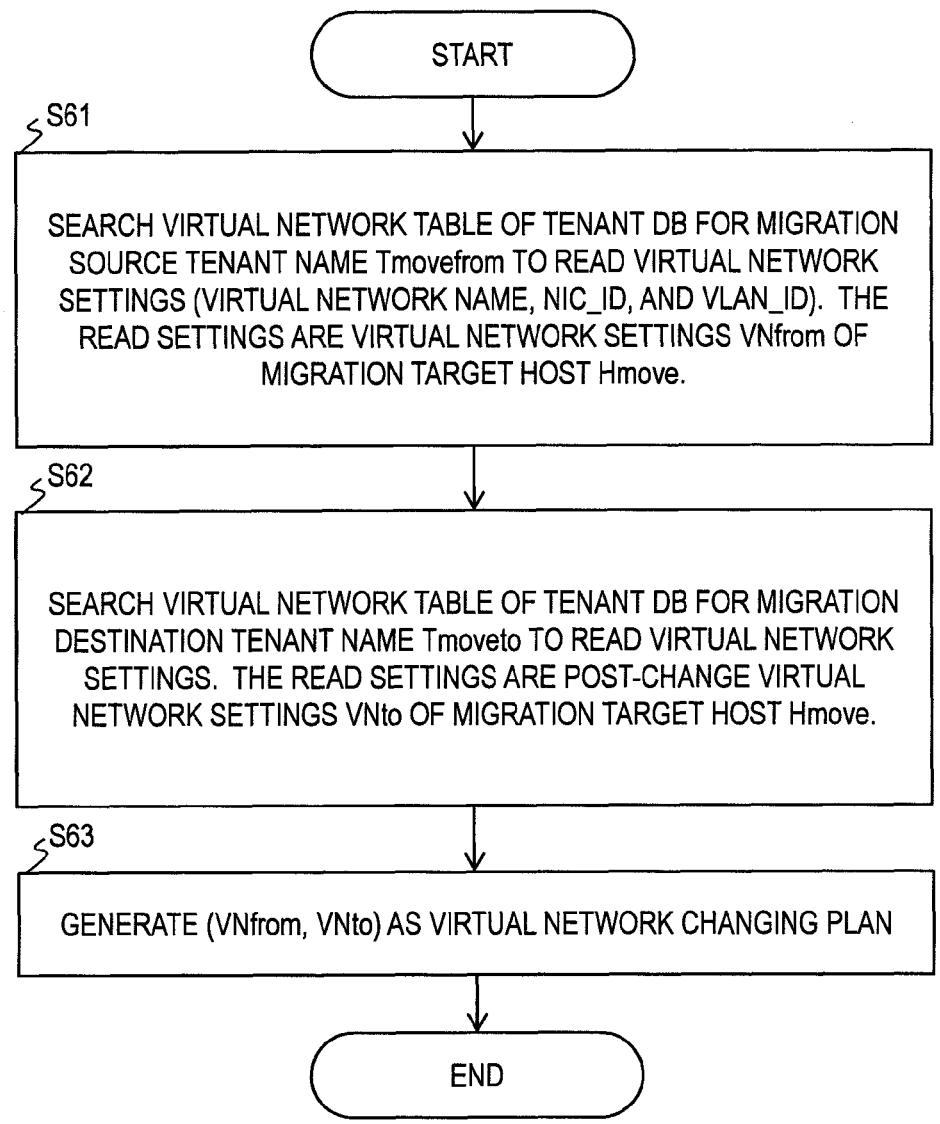
FIG. 30 is a flow chart illustrating an example of the processing executed in Step S33 of FIG. 27 to create a virtual network configuration plan according to the first embodiment of this invention.

FIG. 30 is a flow chart illustrating an example of the processing executed in Step S33 of FIG. 27 to create a virtual network configuration plan.

In Step S61, the configuration plan creation module 405 first searches the virtual network table 530 (illustrated in FIG. 9) of the tenant database 408 for the migration source tenant name Tmovefrom to obtain virtual network settings (a virtual network name, NIC_ID, and VLAN_ID). The virtual network settings obtained by the configuration plan creation module 405 constitute virtual network settings VNfrom of the migration target host Hmove.

In Step S62, the configuration plan creation module 405 then searches the virtual network table 530 of the tenant database 408 for the migration destination tenant name Tmoveto to obtain virtual network settings (a virtual network name, NIC_ID, and VLAN_ID). The virtual network settings obtained by the configuration plan creation module 405 constitute post-change virtual network settings VNto of the migration target host Hmove.

In Step S63, the configuration plan creation module 405 creates, as a virtual network configuration plan, a set that consists of the virtual network settings VNfrom obtained in Step S61 and the virtual network settings VNto obtained in Step S62.

Through the processing described above, the configuration plan creation module 405 creates a virtual network configuration plan that shows virtual networks before and after the host is migrated.

Figure 31:
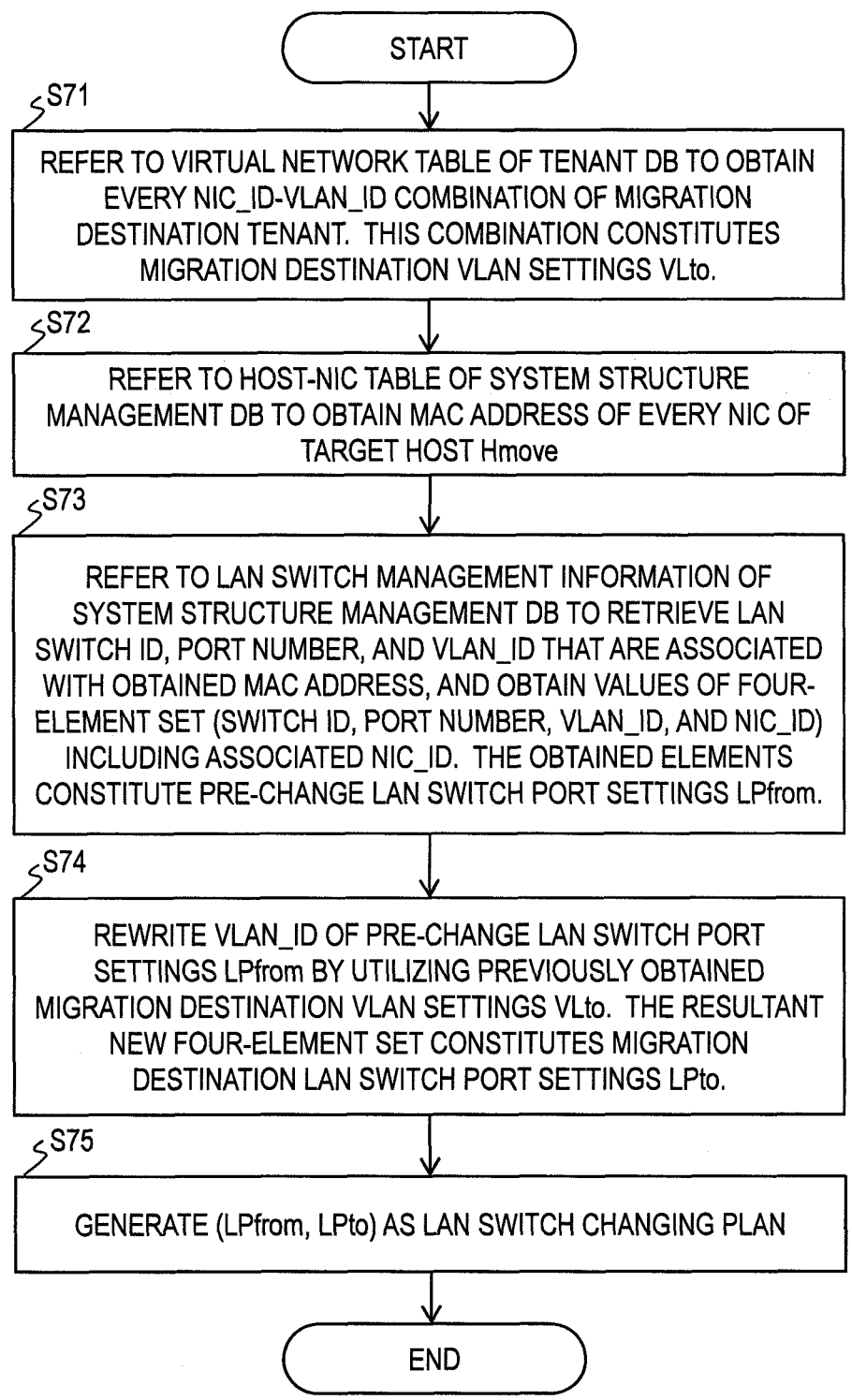
FIG. 31 is a flow chart illustrating an example of the processing executed in Step S34 of FIG. 27 to create a LAN switch configuration plan according to the first embodiment of this invention.

FIG. 31 is a flow chart illustrating an example of the processing executed in Step S34 of FIG. 27 to create a LAN switch configuration plan.

In Step S71, the configuration plan creation module 405 first refers to the virtual network table 530 of the tenant database 408 to obtain every NIC_ID-VLAN_ID combination of the migration destination tenant. The configuration plan creation module 405 sets the obtained combinations as migration destination VLAN settings VLto.

In Step S72, the configuration plan creation module 405 refers to the host-NIC table 600 of the system structure management database 409 to obtain the MAC address of every NIC of the migration target host Hmove.

In Step S73, the configuration plan creation module 405 refers to the LAN switch management information 620 of the system structure management database 409 to retrieve a LAN switch ID, a port number, and VLAN_ID that are associated with the MAC address obtained in Step S72. The configuration plan creation module 405 then obtains values of a four-element set (switch ID, port number, VLAN_ID, and NIC_ID) that are associated with NIC_ID obtained in Step S71. The configuration plan creation module 405 sets the values of the four-element set that are associated with the obtained NIC_ID as pre-change LAN switch port settings LPfrom.

In Step S74, the configuration plan creation module 405 uses the previously obtained migration destination VLAN settings VLto to rewrite VLAN_ID of the pre-change LAN switch port settings LPfrom. The resultant new four-element set constitutes migration destination LAN switch port settings LPto.

In Step S75, the configuration plan creation module 405 sets, as a LAN switch configuration plan, a set that consists of the obtained pre-change LAN switch port settings LPfrom and migration destination LAN switch port settings LPto.

Through the processing described above, the configuration plan creation module 405 creates a LAN switch configuration plan that shows a LAN switch before and after the host is migrated.

For example, in the case where a migration target host Host 01 is reallocated from the tenant A to the tenant B, the LAN switch port settings are as follows:

LPfrom: {(0, 0, (1, 2), 0), (0, 1, -, 1)}
LPto: {(0, 0, (3), 0), (0, 1, (4, 5), 1)1}

Figure 32:
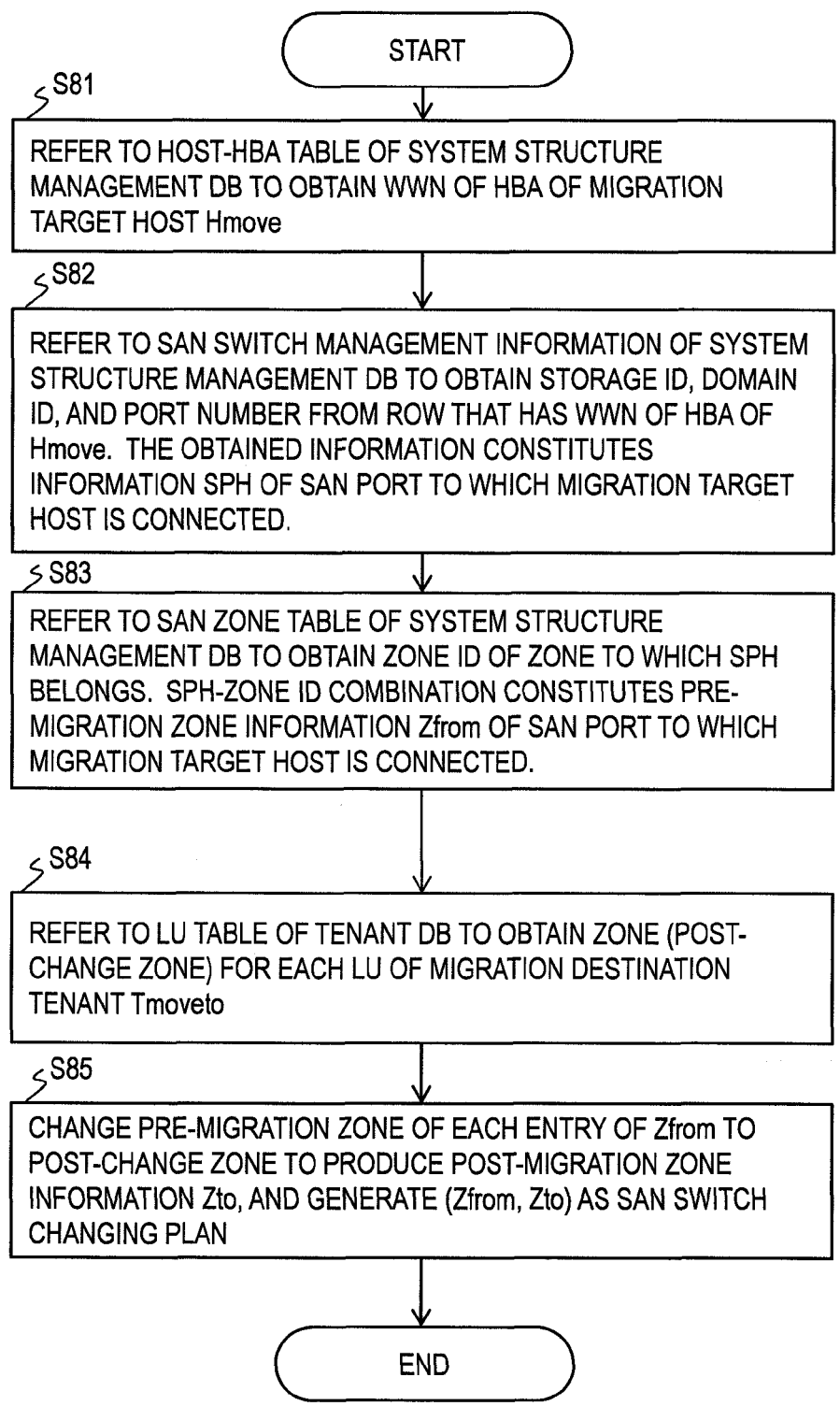
FIG. 32 is a flow chart illustrating an example of the processing executed in Step S35 of FIG. 27 to create a SAN switch configuration plan according to the first embodiment of this invention.

FIG. 32 is a flow chart illustrating an example of the processing executed in Step S35 of FIG. 27 to create a SAN switch configuration plan.

In Step S81, the configuration plan creation module 405 refers to the host-HBA table 610 of the system structure management database 409 to obtain the WWN of an HBA of the migration target host Hmove.

In Step S82, the configuration plan creation module 405 refers to the SAN switch management information 630 of the system structure management database 409 to obtain a SAN switch ID, a domain ID, and a port number from a row that has the WWN of the HBA of the migration target host Hmove. The obtained information constitutes SAN port information SPH of a SAN port to which the migration target host Hmove is coupled.

In Step S83, the configuration plan creation module 405 refers to the SAN zone table 640 of the system structure management database 409 to obtain a zone ID to which the SAN port information SPH belongs. The SPH-zone ID combination constitutes pre-migration information zone information Zfrom of the SAN port to which the migration target host Hmove is coupled.

In Step S84, the configuration plan creation module 405 refers to the LU table 540 of the tenant database 408 to obtain a zone (post-change zone) for each LU of the migration destination tenant Tmoveto.

In Step S85, the configuration plan creation module 405 changes the pre-migration zone to the post-change zone in each entry of the SAN port pre-migration zone information Zfrom to produce post-migration zone information Zto, and sets (Zfrom, Zto) as a SAN switch configuration plan.

Through the processing described above, the configuration plan creation module 405 creates a SAN switch configuration plan that shows a SAN switch before and after the host is migrated.

Figure 33:
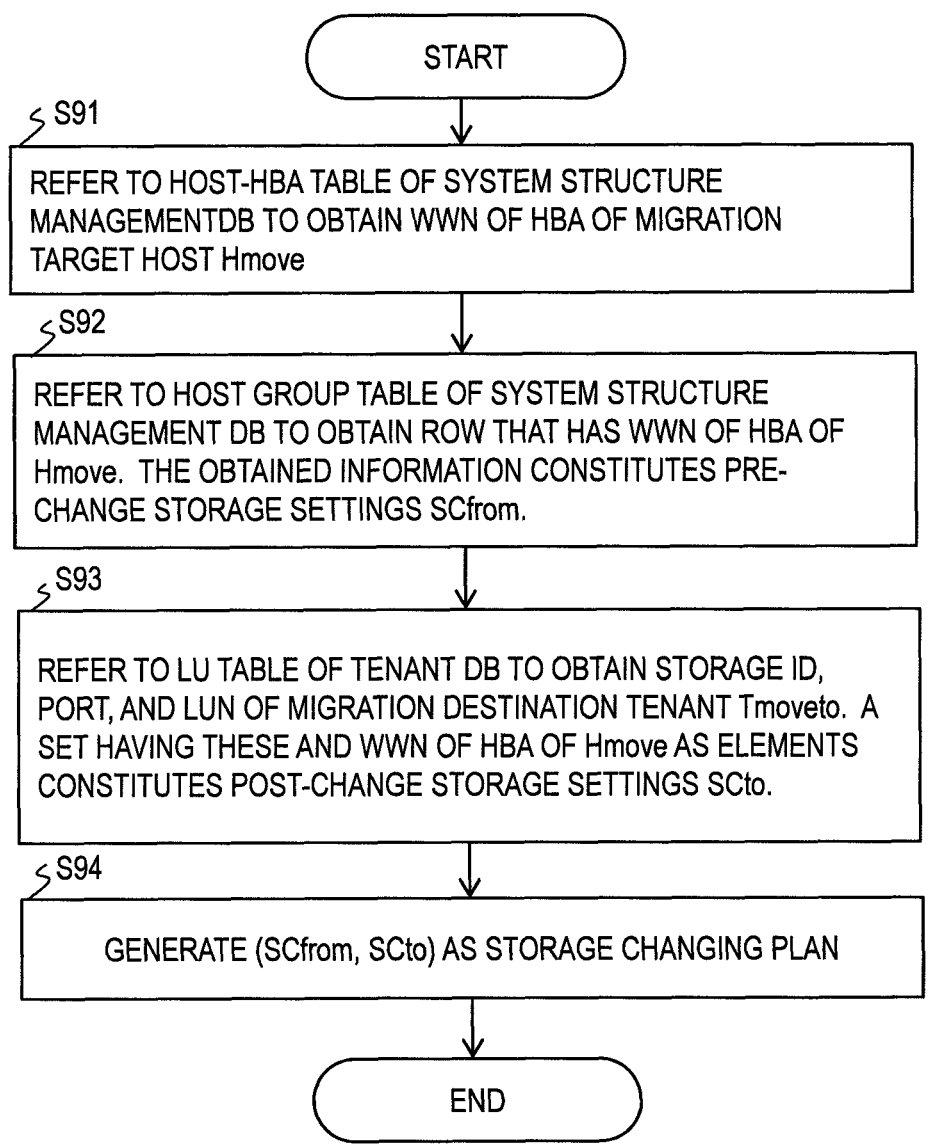
FIG. 33 is a flow chart illustrating an example of the processing executed in Step S36 of FIG. 27 to create a configuration plan of the storage according to the first embodiment of this invention.

FIG. 33 is a flow chart illustrating an example of the processing executed in Step S36 of FIG. 27 to create a configuration plan of the storage 150.

In Step S91, the configuration plan creation module 405 refers to the host-HBA table 610 of the system structure management database 409 to obtain the WWN of an HBA of the migration target host Hmove.

In Step S92, the configuration plan creation module 405 refers to the storage-host management table 660 of the system structure management database 409 to obtain a row that has the WWN of the HBA of the migration target host Hmove. Logical unit numbers LUN in the obtained row constitute pre-change storage settings SCfrom.

In Step S93, the configuration plan creation module 405 refers to the LU table 540 of the tenant database 408 to obtain Storage ID, PORT, and LUN of the migration destination tenant Tmoveto. The configuration plan creation module 405 sets, as post-change storage settings SCto, a set that consists of the obtained Storage ID, PORT and LUN and the WWN of the HBA of the migration target host Hmove.

In Step S94, the configuration plan creation module 405 sets, as a storage configuration plan, a set that consists of the pre-change storage settings SCfrom and the post-change storage settings SCto, i.e., (SCfrom, SCto).

The configuration plan creation module 405 outputs the configuration plans respectively created by the processing of FIGS. 28 to 33 to the user interface module 410. The user interface module 410 transmits to the management client 180 the plans created by the configuration plan creation module 405 which show the system before and after the migration of the migration target host Hmove. Receiving the plans which show the system before and after the migration of the migration target host Hmove, the management client 180 outputs a notification screen illustrated in FIG. 35 to a display device (omitted from the drawings).

Figure 35:
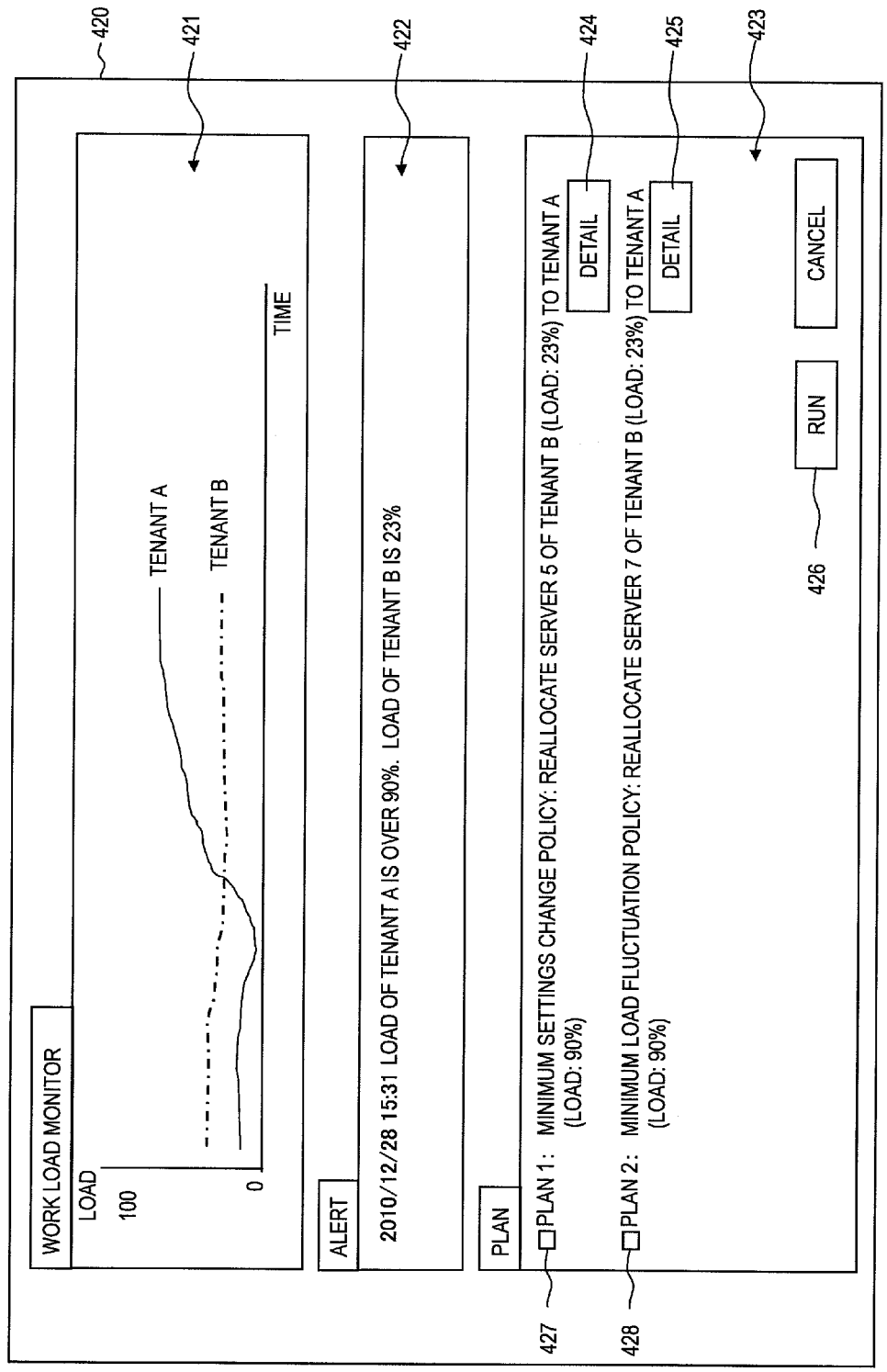
FIG. 35 is a screen image illustrating an example of a notification screen, which is generated by the configuration plan creation module according to the first embodiment of this invention.

FIG. 35 is a screen image illustrating an example of a notification screen 420, which is generated by the configuration plan creation module 405. The notification screen 420 is constituted of an area of a workload monitor 421 where the transition of a load (for example, the CPU load) is displayed on a tenant-by-tenant basis in the form of a graph, an area of an alert 422 where a text message or the like that alerts the administrator is displayed, and an area of a configuration plan 423 where plans for dealing with the alert are presented.

The area of the configuration plan 423 displays the gist of configuration plans created by the configuration plan creation module 405, and also displays "detail" buttons 424 and 425 for further displaying the details of the plans. When an input device (not shown) is used to click on the "detail" button 424, the notification screen 420 switches to a detailed plan display screen 430 as the one illustrated in FIG. 36.

The area of the configuration plan 423 also displays check boxes 427 and 428 for selecting a configuration plan and a "run" button 426 for executing the selected plan. When the input device (not shown) of the management client 180 is used to click on the "run" button 426, the management client 180 sends a "start change" instruction to the IT systems management system 170. In the case where the configuration plan creation module 405 has presented a plurality of configuration plans, the management client 180 transmits the identifier of a configuration plan selected by the administrator or the like with the use of the check boxes 427 and 428, along with the instruction, to the IT systems management system 170. The configuration change module 406 of the IT systems management system 170 executes a configuration plan that is identified by the received identifier.

The user interface module 410 can provide the notification screen 420 in response to a request from the management client 180 and, in the case where there is no information to display in the area of the alert 422, displays the loads on the respective tenants which are obtained from the host status information table 550 in the area of the workload monitor 421.

The configuration plan creation module 405 can create and output a plurality of plans having different change policies as indicated by Plan 1 and Plan 2 in the area of the configuration plan 423 of FIG. 35.

FIG. 36 is a screen image of the detailed plan display screen 430 for displaying a detailed plan created by the configuration plan creation module 405 which shows the system before and after the migration of the migration target host Hmove. The detailed plan display screen 430 displays, for each of the change target resource group, virtual network (virtual switch in FIG. 36), LAN switch, SAN switch, and storage, detailed pre-change settings and detailed post-change settings. The example of FIG. 36 shows the specifics of a settings change to be made when Host 01 (the hypervisor #1 of FIG. 3) is migrated from the tenant A (RGA) to the tenant B.

Figure 34:
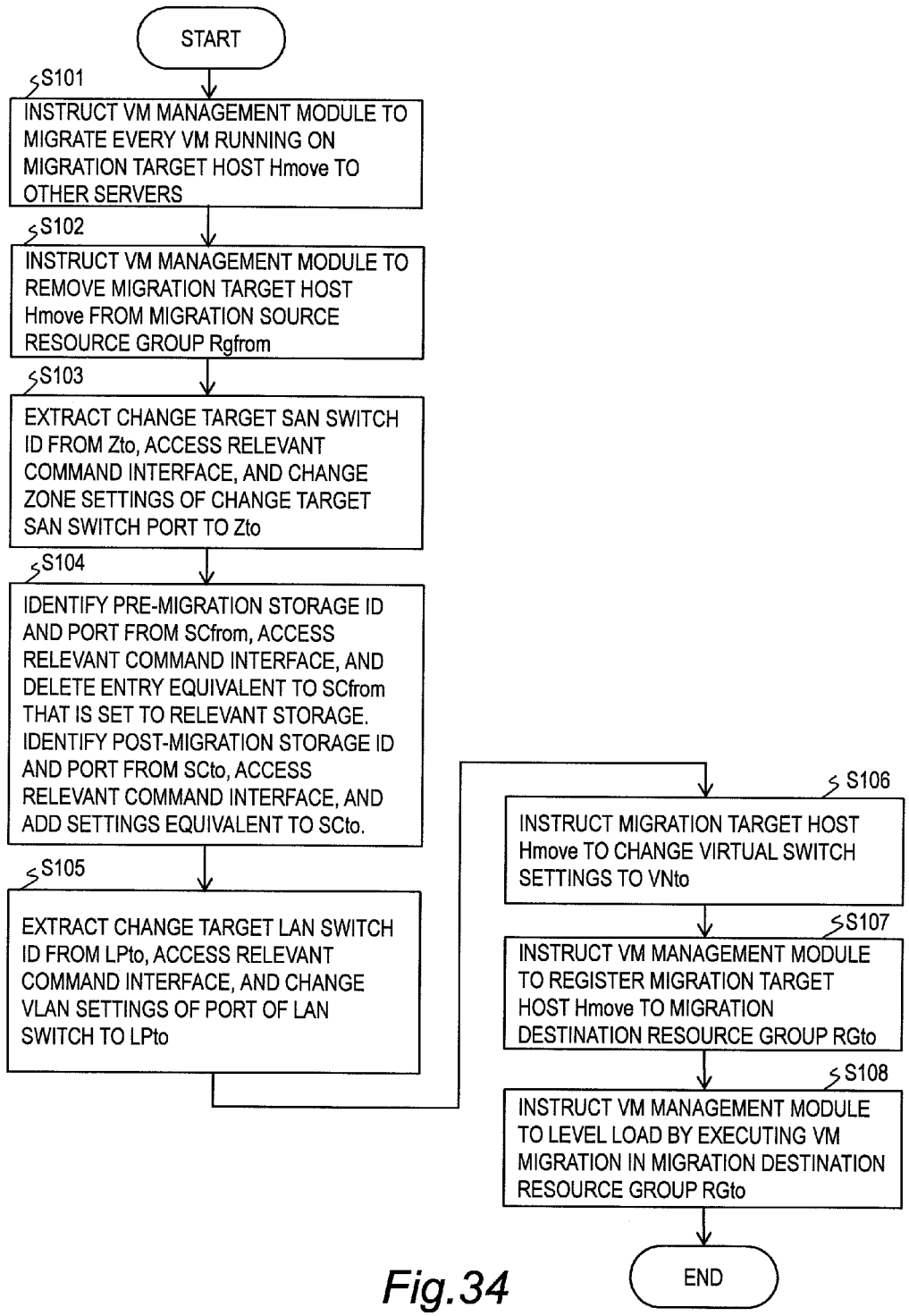
FIG. 34 is a flow chart illustrating an example of processing that is executed in the configuration change module according to the first embodiment of this invention.

FIG. 34 is a flow chart illustrating an example of processing that is executed in the configuration change module 406. This processing is executed when the "run" button 426 is clicked on the notification screen 420 of FIG. 35 and the IT systems management system 170 consequently receives a notification of the application software of a configuration plan from the management client 180.

In Step S101, the configuration change module 406 instructs the VM management module 411 to migrate all the virtual computers 211 that run on the migration target host Hmove to other servers 130. The VM management module 411 migrates all the virtual computers 211 that run on the migration target host Hmove to other servers 130 by applying a known technology such as DRS or Hyper-V PRO described above.

In Step S102, the configuration change module 406 instructs the VM management module 411 to remove from a migration source resource group RGfrom the migration target host Hmove whose virtual computers 211 have completed migration. The migration source resource group RGfrom is a resource group ID in the resource group table 510 that is associated with the migration source tenant name Tmovefrom determined in Step S42. In other words, the VM management module 411 deletes the entry of the migration target host Hmove from the tenant-host table 580 of FIG. 14.

In Step S103, the configuration change module 406 obtains the change target SAN switch ID from the post-migration zone information Zto set in Step S85, accesses a command interface of one of the SAN switch 141 and the SAN switch 142 that has the obtained SAN switch ID, and changes the zone settings of ports of the change target SAN switch to the post-migration zone information Zto.

In Step S104, the configuration change module 406 identifies the pre-migration storage ID and the pre-migration PORT from the pre-change storage settings SCfrom set in Step S92, accesses a command interface of the storage 150 that is identified by the pre-migration storage ID, and deletes an entry equivalent to the pre-change storage settings SCfrom set to this storage 150.

The configuration change module 406 also identifies the post-migration storage ID and the post-migration PORT from the post-change storage settings SCto set in Step S93. The configuration change module 406 accesses a command interface of the storage 150 that has the identified storage ID, and adds settings equivalent to the post-change storage settings SCto to this storage 150.

If necessary, the migration target host Hmove may be rebooted at the time setting the storage 150 and the SAN switch 141 or 142 is completed in Steps S103 and S104.

In Step S105, the configuration change module 406 obtains the change target LAN switch ID from the migration destination LAN switch port settings LPto set in Step S74. The configuration change module 406 accesses a command interface of one of the LAN switch 121 and the LAN switch 122 that has the obtained LAN switch ID, and changes the VLAN settings of ports of the accessed LAN switch 121 or 122 to the migration destination LAN switch port settings LPto.

In Step S106, the configuration change module 406 instructs the migration target host Hmove to change virtual switch (virtual network) settings to the post-change virtual network settings VNto set in Step S62. Following the instruction, the hypervisor 200 of the migration target host Hmove changes the settings of internal virtual networks to the post-change virtual network settings VNto.

In Step S107, the configuration change module 406 instructs the VM management module 411 to register the migration target host Hmove to a migration destination resource group RGto. The migration destination resource group RGto is a resource group ID in the resource group table 510 that is associated with the migration destination tenant name Tmoveto determined in Step S41. In other words, the VM management module 411 adds a new entry holding the ID of the migration target host Hmove to the tenant-host table 580 of FIG. 14 in association with the tenant ID of the migration destination tenant name Tmoveto.

In Step S108, the configuration change module 406 instructs the VM management module 411 to level the load by migrating the virtual computers 211 within the migration destination resource group RGto. The VM management module 411 levels the load of the virtual computers 211 within the resource group to which the migration target host Hmove has been added by applying a known technology such as DRS or Hyper-V PRO described above.

Through the processing described above, when the load evaluation value of one tenant becomes larger than a threshold in a virtual computer system where the virtual computers 211 are run by allocating computing resources to a plurality of tenants, the IT systems management system 170 migrates a host from a tenant that is low in load evaluation value to the tenant whose load evaluation value has exceeded the threshold.

FIG. 37 illustrates a progress display screen 440 which is generated by the configuration change module 406. After receiving a "start change" instruction from the management client 180, the configuration change module 406 generates the progress display screen 440 and outputs the generated screen via the user interface module 410 to the display device (omitted from the drawings) of the management client 180 in order to notify the progress of the processing illustrated in FIG. 34.

The progress display screen 440 is constituted of one-row display areas each of which has an "*" field for showing a place in processing order, a "processing" field for showing processing specifics, and a "Status" field for showing the status of the processing. The administrator operating the management client 180 can thus keep track of the migration of one server 130 and its hypervisor 200 between tenants by following the order of the processing steps.

In the case where a failure or a trouble happens during the processing of migrating the migration target host Hmove, the configuration change module 406 may use the "Status" field for the relevant "processing" on the progress display screen 440 to notify the failure or the trouble.

FIGS. 38 to 43 are diagrams illustrating an example of the processing of FIG. 34. In the example of FIGS. 38 to 43, the migration target host Hmove is the host HOST 01 of the tenant A whose resource group ID is RGA, and is migrated to the tenant B whose resource group ID is RGB. In this example, the IT systems management system 170 has judged that the evaluation value vector WLVt of the tenant B whose resource group ID is RGB exceeds a threshold vector, and has determined the host HOST 01 which has the smallest evaluation value vector WLVt as the migration target host Hmove.

Figure 38:
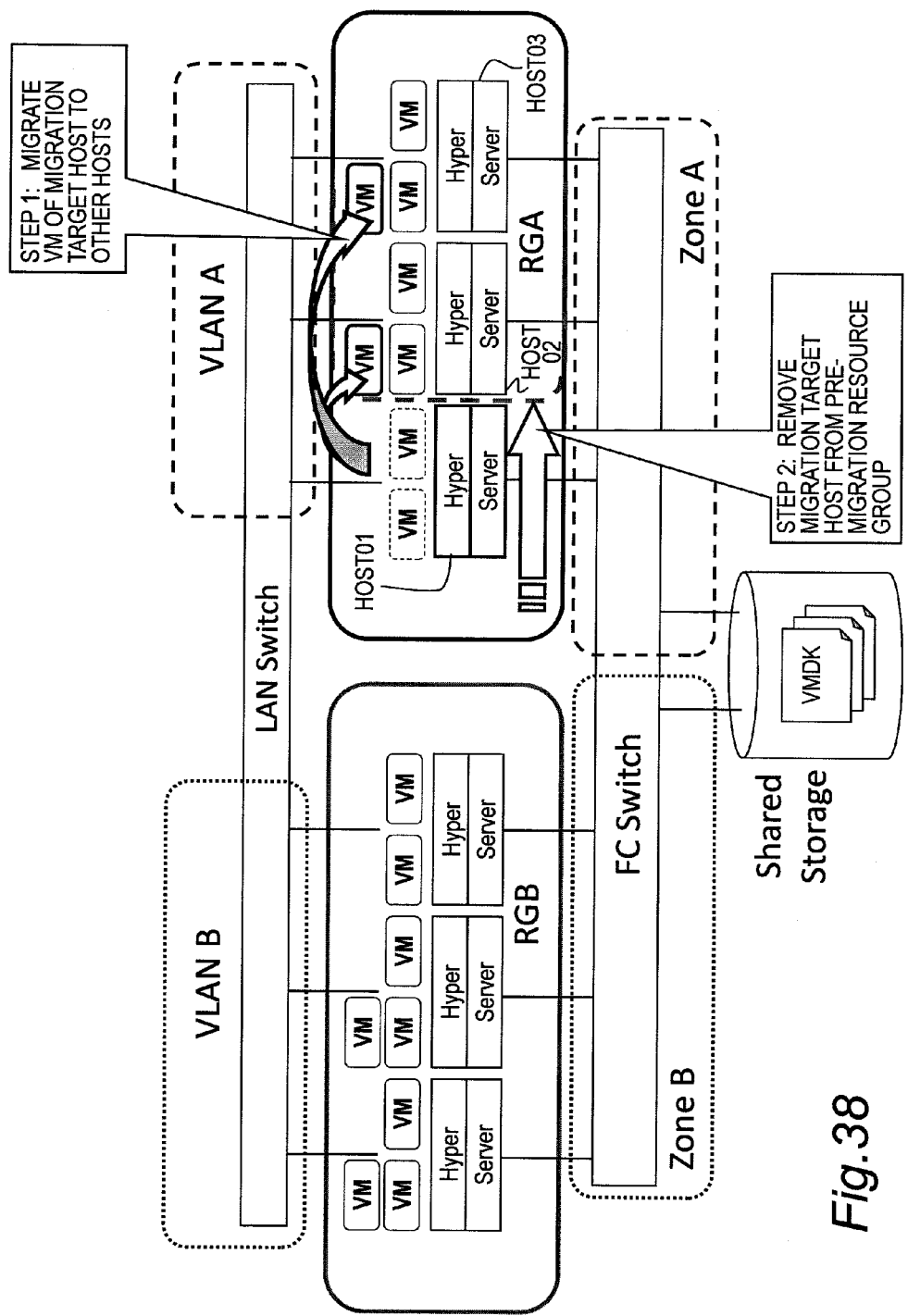
FIG. 38 is a block diagram illustrating processing of migrating virtual computers from the migration target host Hmove which corresponds to Steps S101 and S102 of FIG. 34 according to the first embodiment of this invention.

FIG. 38 is a block diagram illustrating processing of migrating virtual computers from the migration target host Hmove which corresponds to Steps S101 and S102 of FIG. 34. The configuration change module 406 first instructs the VM management module 411 to migrate the virtual computers 211 (VMs in FIG. 38) on the migration target host Hmove (HOST 01) to other hosts within the same tenant A (the resource group A), specifically, HOST 02 and HOST 03. When migrating the virtual computers 211, the VM management module 411 applies DRS or other technologies described above to evenly distribute the virtual computers 211 to be migrated between the hosts HOST 02 and HOST 03 within the same resource group A and to thereby level the load across the tenant A.

The configuration change module 406 next instructs the VM management module 411 to remove the migration target host Hmove (HOST 01) from the tenant A (the resource group A, i.e., the pre-migration resource group).

Figure 39:
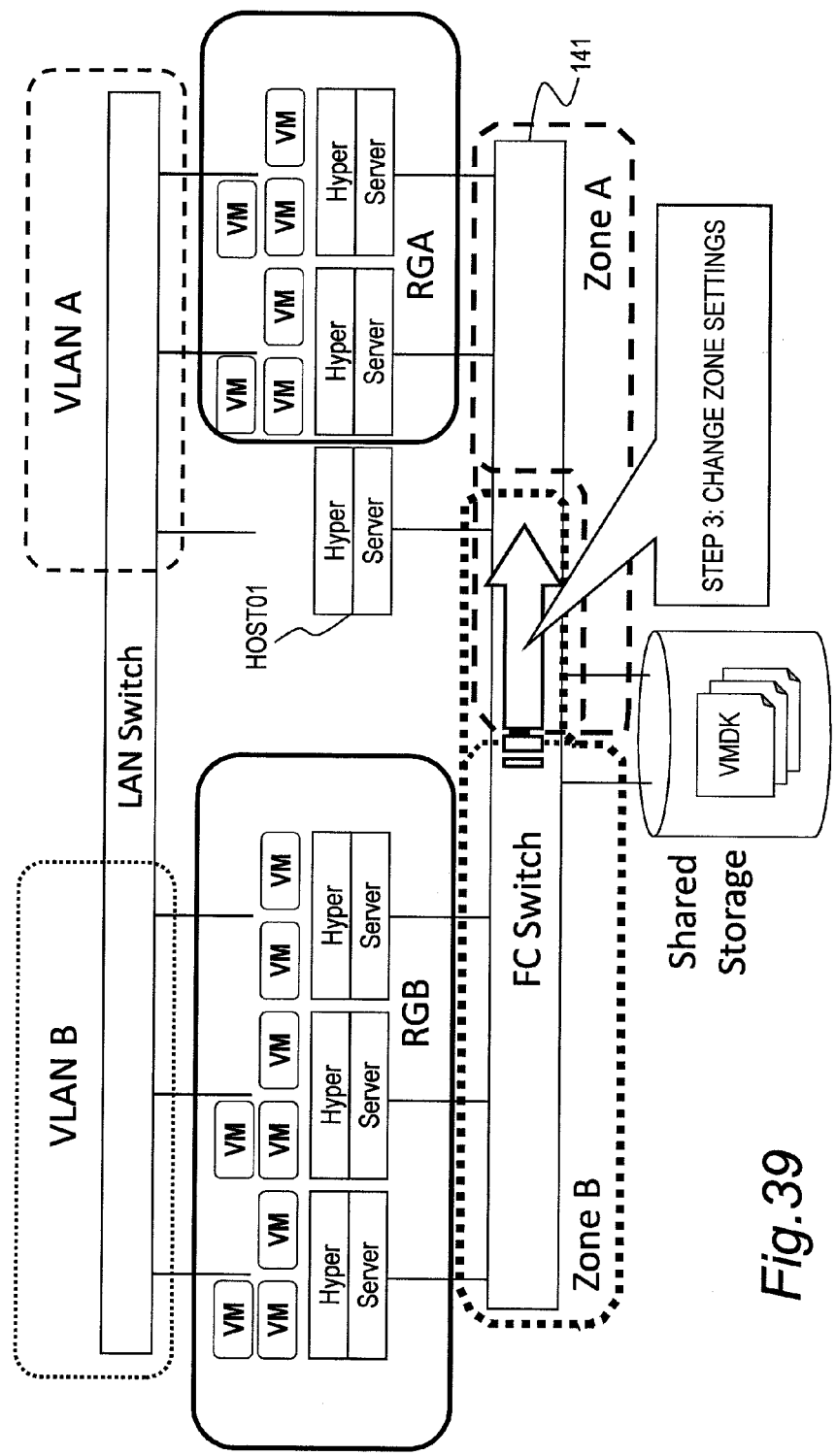
FIG. 39 is a block diagram corresponding to Step S103 of FIG. 34 according to the first embodiment of this invention.

FIG. 39 is a block diagram corresponding to Step S103 of FIG. 34. The configuration change module 406 changes the settings of the SAN switch 141, which is coupled to an HBA of the migration target host Hmove (HOST 01), to the post-migration zone information Zto.

Figure 40:
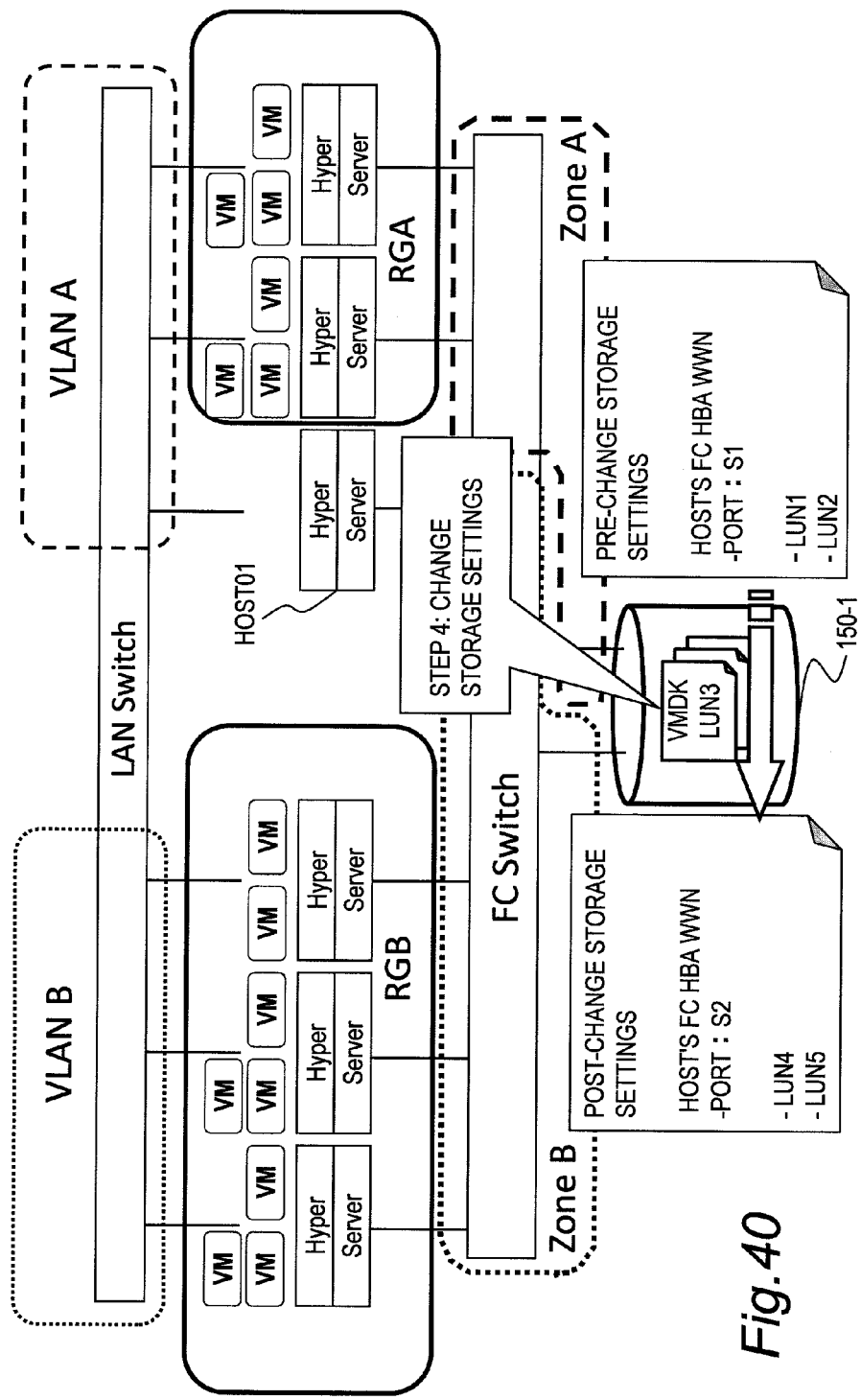
FIG. 40 is a block diagram corresponding to Step S104 of FIG. 34 according to the first embodiment of this invention.

FIG. 40 corresponds to Step S104 of FIG. 34. The configuration change module 406 changes the settings of the storage 150-1, which is accessed by the HBA of the migration target host Hmove (HOST 01), so that the changed settings are equivalent to the post-change storage settings SCto. In this example, the WWN of the HBA of the migration target host Hmove (HOST 01) is associated with a post-change port S2.

Figure 41:
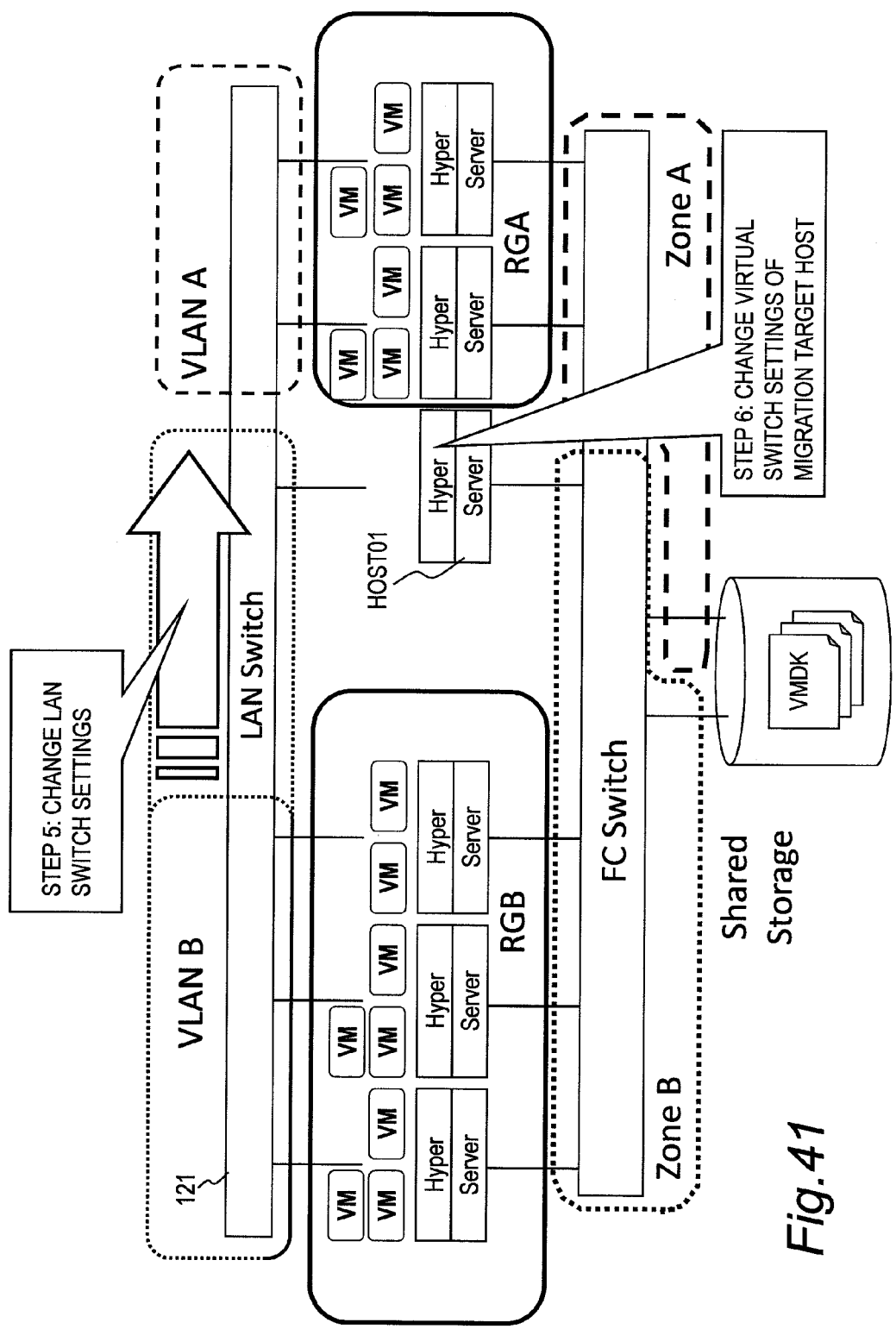
FIG. 41 is a block diagram corresponding to Steps S105 and S106 of FIG. 34 according to the first embodiment of this invention.

FIG. 41 corresponds to Steps S105 and S106 of FIG. 34. The configuration change module 406 changes the VLAN settings of ports of the LAN switch 121, which is coupled to a network interface of the migration target host Hmove (HOST 01), to the migration destination LAN switch port settings LPto.

Thereafter, the configuration change module 406 instructs the hypervisor 200 of the migration target host Hmove to change the virtual switch (virtual network) settings to the post-change virtual network settings VNto set in Step S62, and the hypervisor 200 (#1) of the host HOST 01 changes the settings of the internal virtual networks to the post-change virtual network settings VNto.

Figure 42:
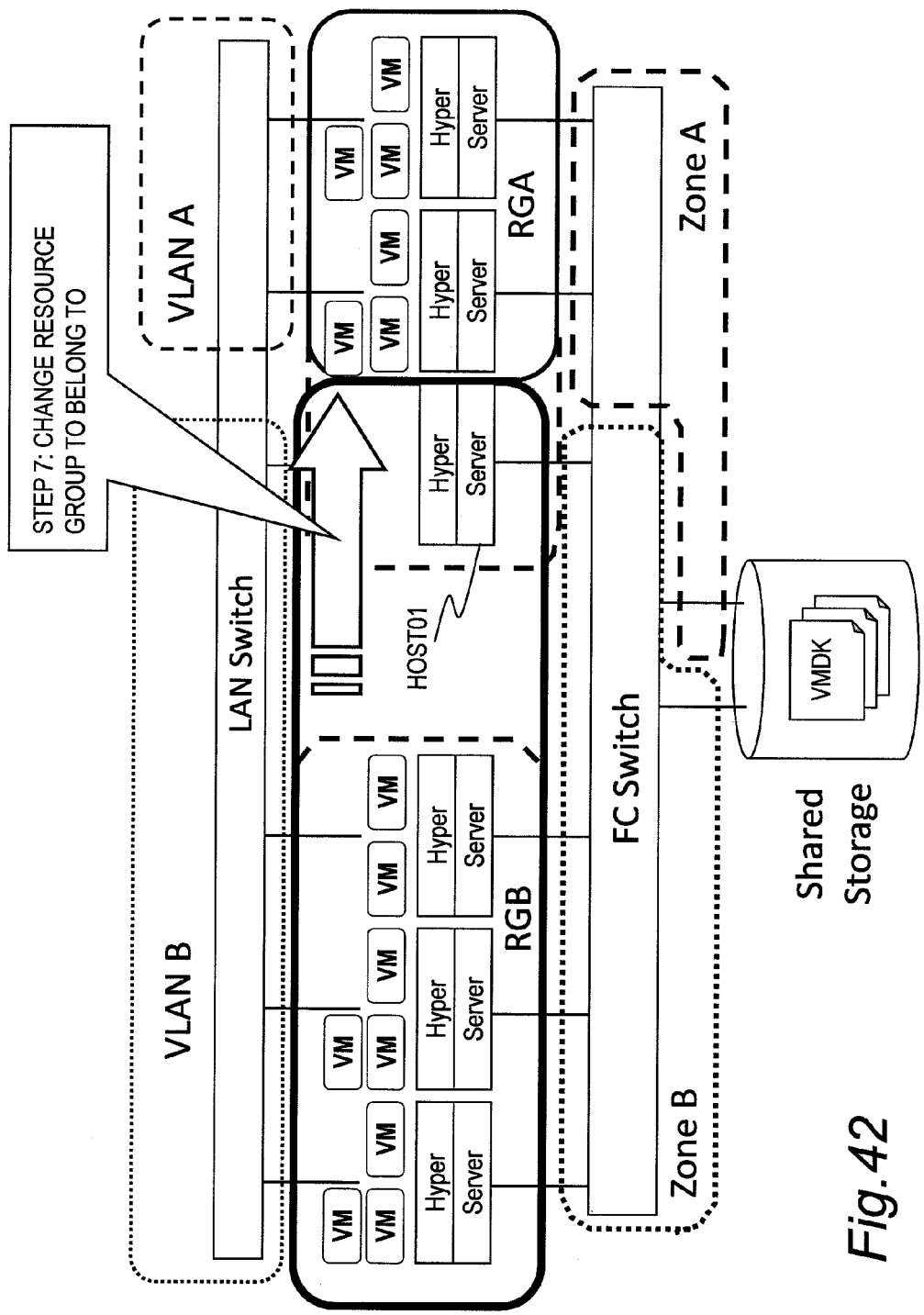
FIG. 42 is a block diagram corresponding to Step S107 of FIG. 34 according to the first embodiment of this invention.

FIG. 42 corresponds to Step S107 of FIG. 34. The configuration change module 406 instructs the VM management module 411 to register the migration target host Hmove to the migration destination resource group RGto. The VM management module 411 updates the tenant-host table 580 via the system structure administration module 402 by adding an entry that holds "B" as the tenant ID and "HOST 01" as the host ID to the tenant-host table 580. The host HOST 01 is thus added to the tenant B as the migration target host Hmove.

Figure 43:
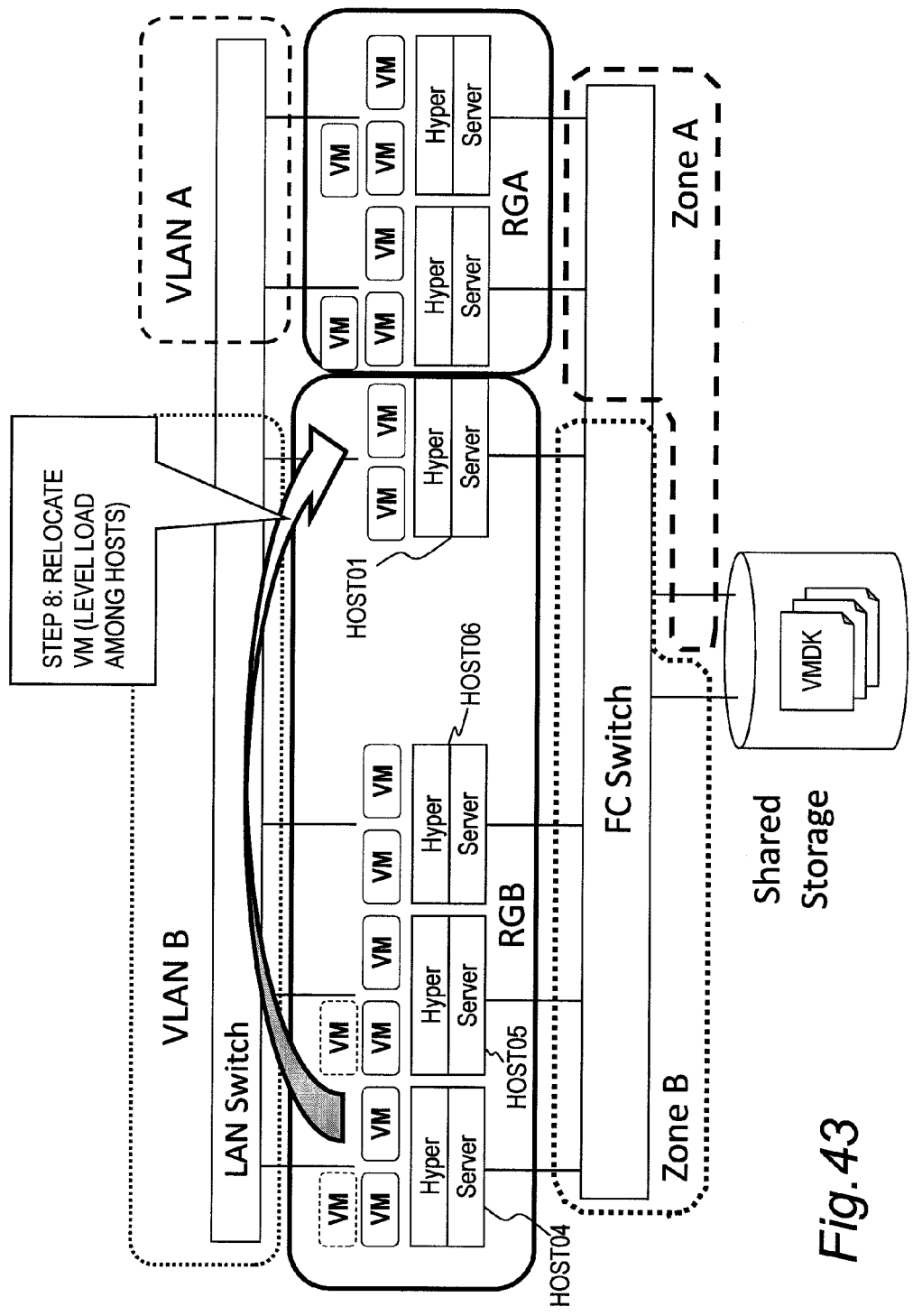
FIG. 43 is a block diagram corresponding to Step S108 of FIG. 34 according to the first embodiment of this invention.

FIG. 43 corresponds to Step S108 of FIG. 34. The configuration change module 406 instructs the VM management module 411 to level the load by migrating the virtual computers 211 within the migration destination resource group RGto. In the example of FIG. 43, the VM management module 411 migrates one virtual computer 211 from each of a host HOST 04 and a host HOST 05 within the tenant B to the newly added host HOST 01.

As has been described, according to the first embodiment of this invention, a load imbalance among tenants can be remedied by removing a suitable amount of hosts from a light-load tenant (the migration source) and reallocating the hosts to a heavy-load tenant (the migration destination). Host reallocation is accompanied by a settings change of the LAN switch 121 or 122, the SAN switch 141 or 142, virtual switches (virtual networks) of the hypervisors 200, and LUs of the storage 150 that are relevant to the tenant to which the host has belonged prior to reallocation and the tenant to which the host belongs after reallocation. Settings unique to the respective tenants are thus carried over, ensuring that the migration target host works properly.

The embodiment described above discusses an example in which the hypervisor 200 is employed as a virtualization module that provides the virtual computers 211, but a virtual computer monitor (VMM) may be employed instead.

Second Embodiment

Figure 44:
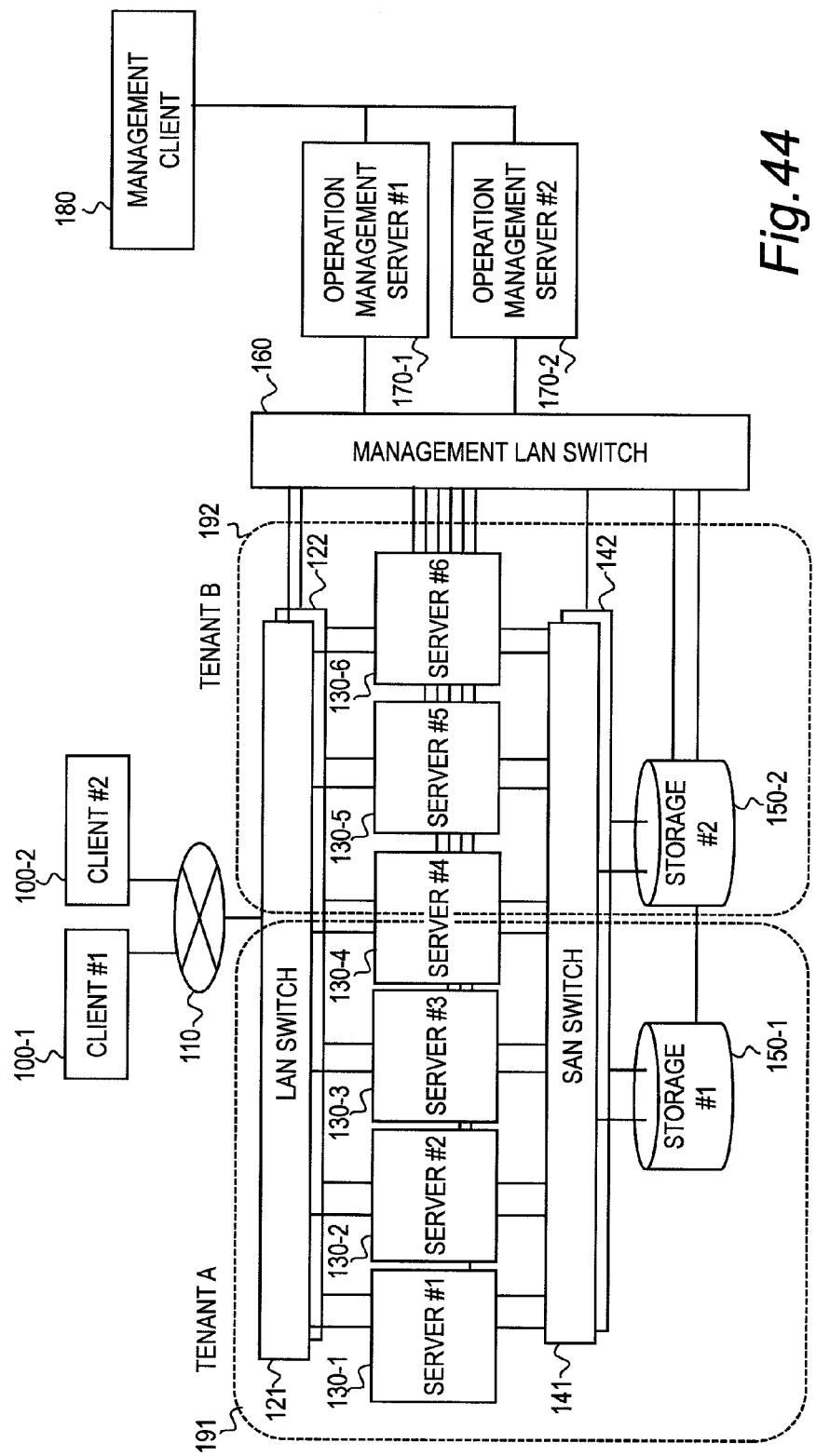
FIG. 44 is a block diagram illustrating an example of a computer system that provides virtual computers according to a second embodiment of this invention.

FIG. 44 is a block diagram illustrating an example of a computer system that provides virtual computers according to a second embodiment of this invention. The second embodiment differs from the first embodiment in that the tenant A and the tenant B shares the server 130-4, which is a physical computer. The rest of the configuration of the second embodiment is the same as that of the first embodiment, and a description thereof is omitted here.

Figure 45:
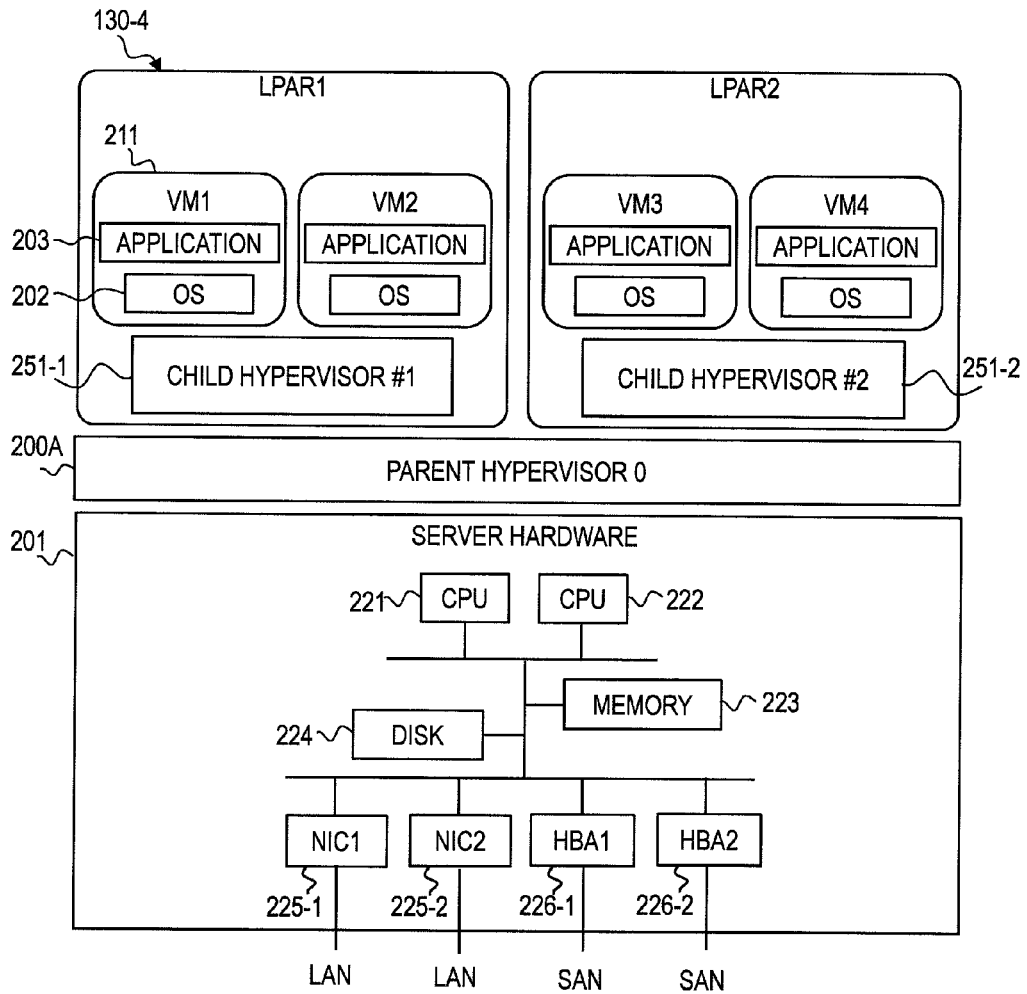
FIG. 45 is a detailed block diagram of the server (#4) shared by a plurality of tenants (the tenants A and B) according to the second embodiment of this invention.

FIG. 45 is a detailed block diagram of the server (#4) 130-4 shared by a plurality of tenants (the tenants A and B). The hardware 201 is the same as in the first embodiment, except that the virtualization module has two stages.

A hypervisor (a parent hypervisor) 200A which is a first virtualization module generates a plurality of logical partitions (LPAR 1 and LPAR 2). The parent hypervisor 200A divides the processors 221 and 222, memory 223, I/O devices 225-1, 225-2, 226-1, and 226-2 of the server (#4) 130-4 at a ratio specified by the IT systems management system 170, and allocates to the respective logical partitions.

In each logical partition, a child hypervisor 251-1 or 251-2 operates as a second virtualization module. The child hypervisor (#1) 251-1 provides two virtual computers 211 that are run as VM 1 and VM 2. The child hypervisor (#2) 251-2 provides two virtual computers 211 that are run as VM 3 and VM 4. The OS 202 and the application software 203 are executed in each of the virtual computers 211 as in the first embodiment.

The IT systems management system 170 in this example allocates the child hypervisor 251-1 to the tenant A and the child hypervisor 251-2 to the tenant B. The IT systems management system 170 stores the identifier of the child hypervisor 251-1 in the tenant-host table 580 of FIG. 14 in association with the tenant A, and stores the identifier of the child hypervisor 251-2 in the table 580 in association with the tenant B. The IT systems management system 170 stores child hypervisor IDs in the other tables in the same manner, and treats the child hypervisors 251-1 and 251-2 as the same as hypervisor 200 of the first embodiment.

The child hypervisor 251-1 constitutes a virtual switch (or a virtual network) that is associated with a VLAN of the tenant A, and the child hypervisor 251-2 constitutes a virtual switch that is associated with a VLAN of the tenant B.

Figure 46:
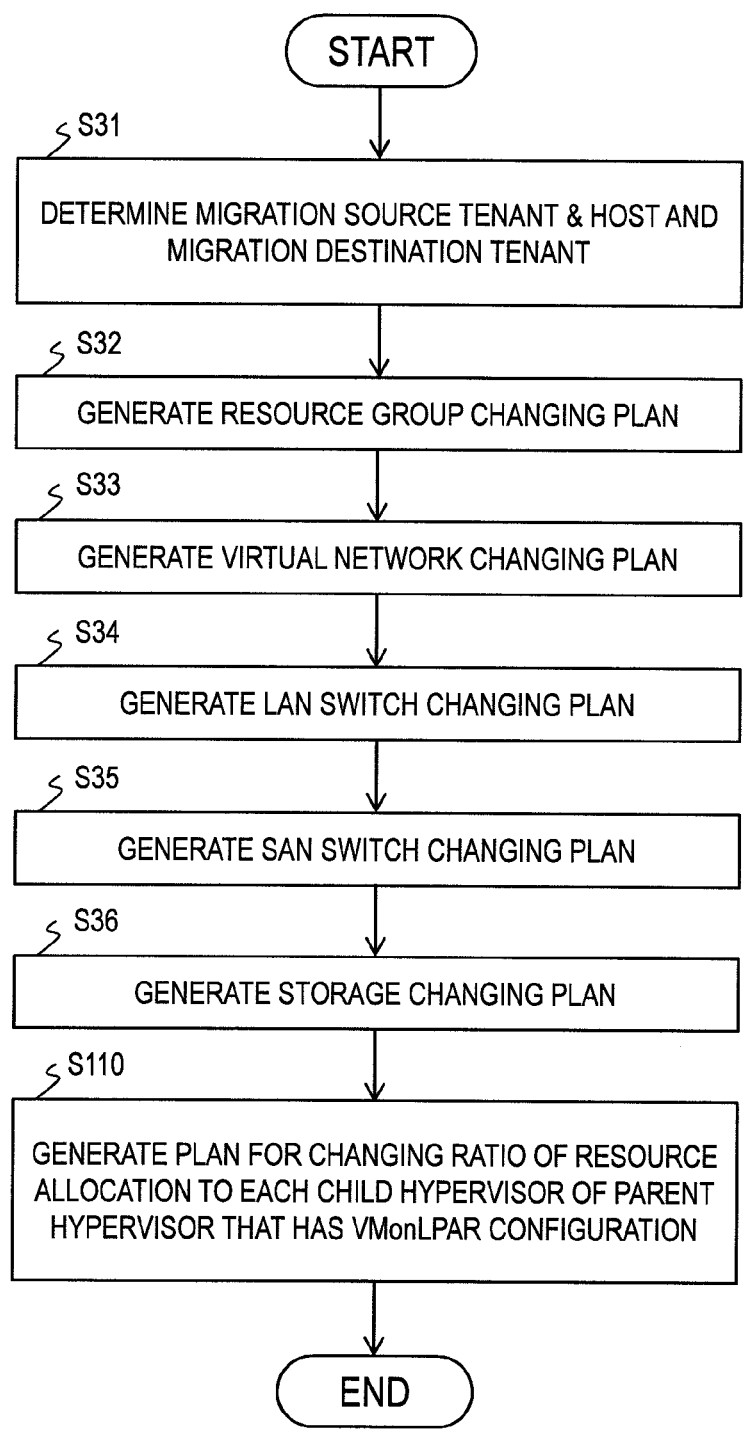
FIG. 46 is a flow chart illustrating an example of processing that is executed by the configuration plan creation module 405 in Step S18 of FIG. 25 according to the second embodiment of this invention.

FIG. 46 is a flow chart illustrating an example of processing that is executed by the configuration plan creation module 405 in Step S18 of FIG. 25. This flow chart is obtained by adding Step S110 to Steps S31 to S36 described in the first embodiment with reference to FIG. 27.

In Steps S31 to S36, the configuration plan creation module 405 determines the migration target host Hmove, the migration source tenant Tmovefrom, and the migration destination tenant Tmoveto based on the evaluation value vector WLVt as in the first embodiment. The configuration plan creation module 405 then creates respective configuration plans (a resource group configuration plan, a virtual network configuration plan, a LAN switch configuration plan, a SAN switch configuration plan, and a storage configuration plan) that are suited to the migration destination tenant Tmoveto the same way as in the first embodiment. The migration target host Hmove is a child hypervisor whose resource allocation ratio is reduced on the parent hypervisor 200A.

Thereafter, in Step S110, the configuration plan creation module 405 creates a plan for changing the ratio of resources allocated to the child hypervisors (logical partitions) 251-1 and 251-2 by the parent hypervisor 200A. The configuration plan creation module 405 determines the ratio of resources to be allocated to the respective logical partitions in accordance with, for example, the ratio of the evaluation value vectors WLVt.

In contrast to the first embodiment where computing resources are migrated between tenants on a server 130-by-server 130 basis, the second embodiment divides one server 130 at a desired ratio to adjust the amount of resources to be allocated to the respective tenants more finely than a server 130-by-sever 130 basis.

In the case where a resource allocation change between the tenant A and the tenant B involves only the server 130-4 of FIG. 45, Steps S32 to S36 of FIG. 46 can be omitted and only Steps S31 and S110 need to be executed.

Figure 47:
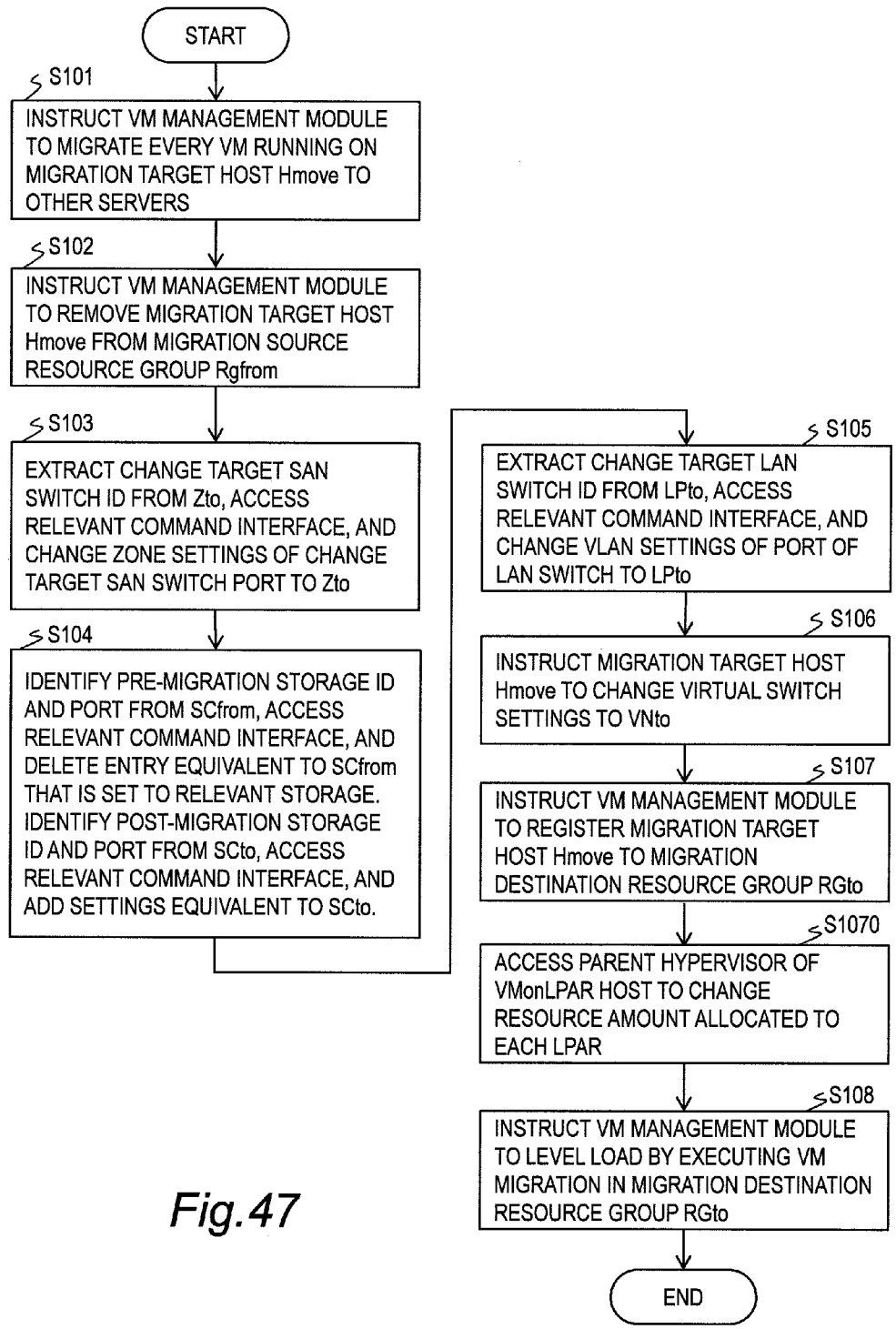
FIG. 47 is a flow chart illustrating an example of processing that is executed in the configuration change module according to the second embodiment of this invention.

FIG. 47 is a flow chart illustrating an example of processing that is executed in the configuration change module 406. This flow chart is obtained by adding Step S1070 to Steps S101 to S108 described in the first embodiment with reference to FIG. 34. Steps S101 to S107 of this embodiment are, as in the first embodiment, for changing the settings of the respective resource types in preparation for the migration of the migration target host Hmove from the migration source to the migration destination tenant.

After Step S107 in which the migration target host Hmove is registered to the migration destination resource group, the configuration change module 406 instructs the parent hypervisor 200A in Step S1070 to change the ratio of resources allocated to the respective logical partitions to the ratio determined in Step S110 of FIG. 46.

Thereafter, as in the first embodiment, the configuration change module 406 relocates virtual computers 211 to the logical partitions where the resource ratio has been changed.

Figure 48:
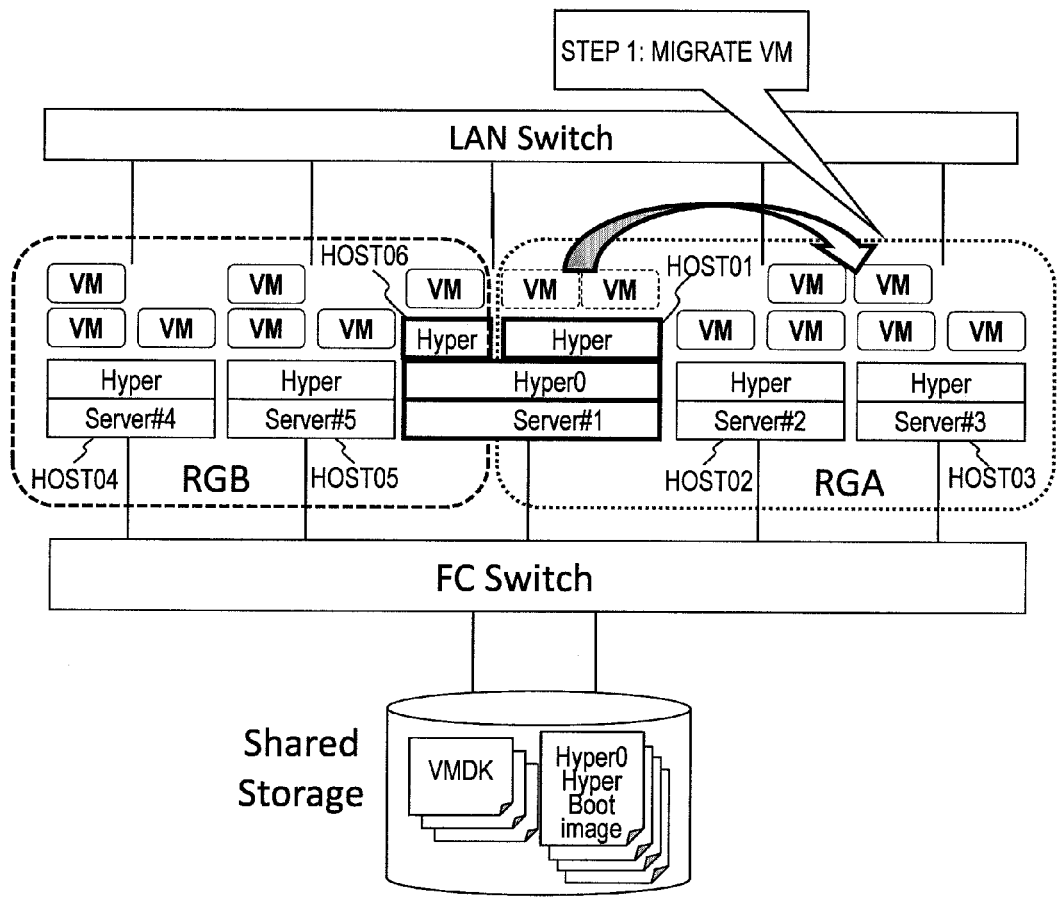
FIG. 48 is a block diagram illustrating an example of evacuating the virtual computers 211 that run on the migration target host Hmove (HOST 01) within the same tenant according to the second embodiment of this invention.
Figure 49:
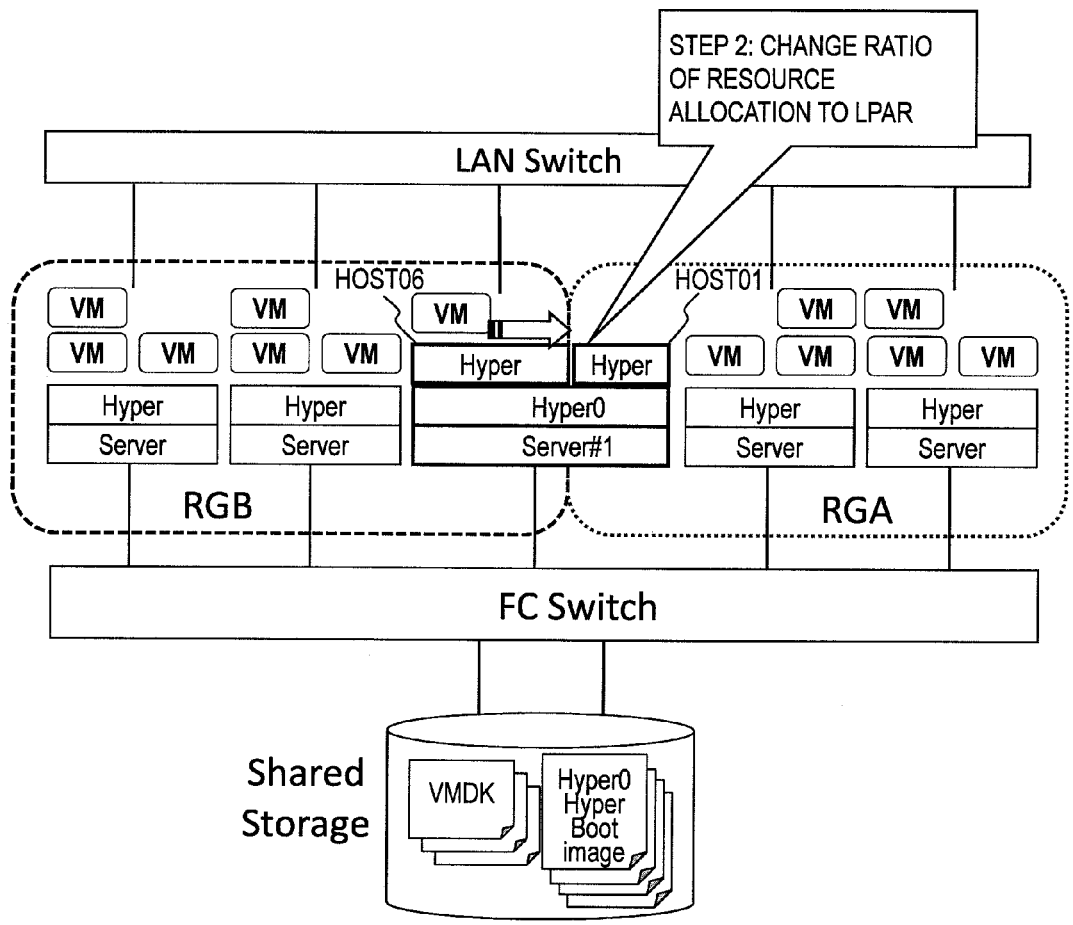
FIG. 49 is a block diagram illustrating an example in which the parent hypervisor 200A changes the ratio of resources allocated to the logical partitions according to the second embodiment of this invention.
Figure 50:
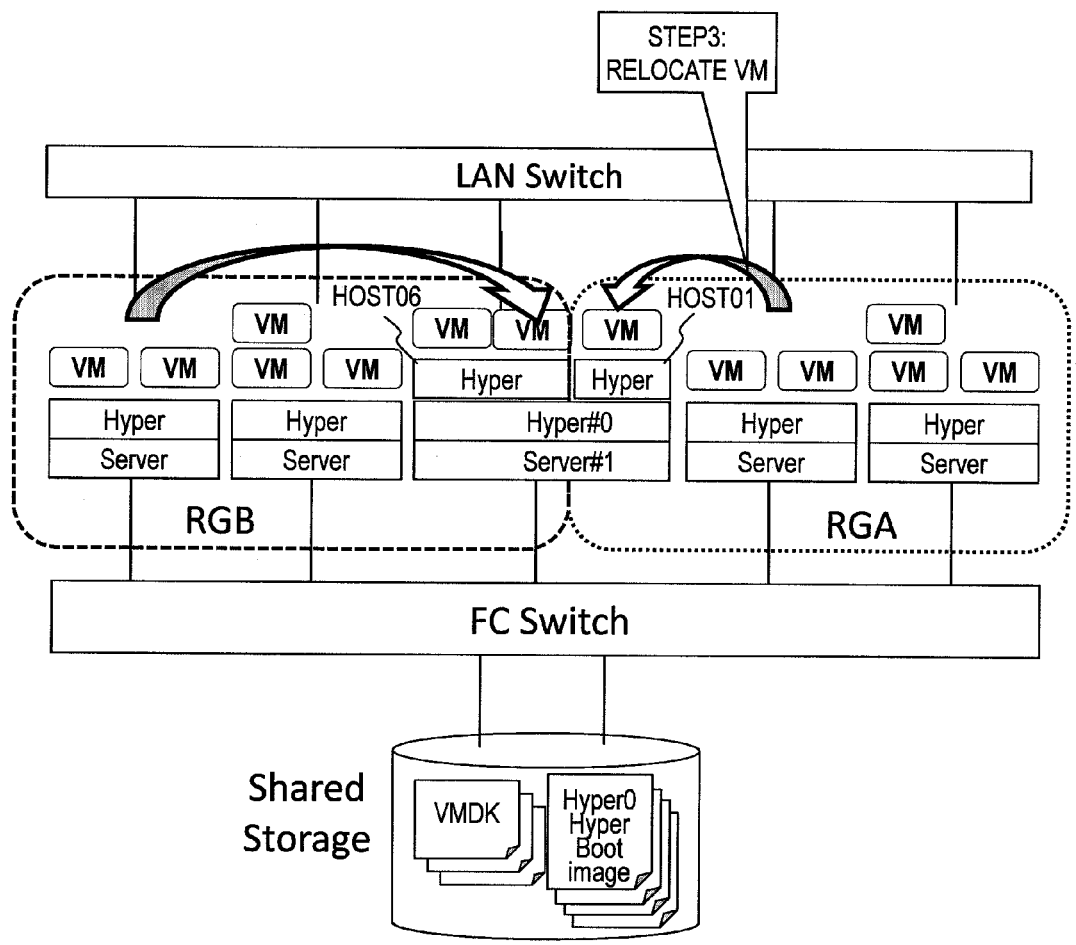
FIG. 50 is a block diagram illustrating a case in which the virtual computers 211 are relocated after the parent hypervisor 200A changes the ratio of resources allocated to the logical partitions according to the second embodiment of this invention.

FIGS. 48 to 50 are diagrams illustrating an example of the processing of FIG. 47. In the example of FIGS. 48 to 50, the host HOST 01 of the tenant A whose resource group ID is RGA is determined as the migration target host Hmove and reduced in resource allocation ratio, and resources freed up as a result of the resource reduction of the host HOST 01 are allocated to a host HOST 06 of the tenant B whose resource group ID is RGB.

FIG. 48 is a block diagram illustrating an example of evacuating the virtual computers 211 that run on the migration target host Hmove (HOST 01) within the same tenant. The configuration change module 406 sends an instruction to the VM management module 411 to migrate the virtual computers 211 of HOST 01 to other hosts in the tenant A, specifically, HOST 02 and HOST 03. The VM management module 411 migrates the virtual computers 211 to the hosts HOST 02 and HOST 03 in a manner that levels the load across the tenant A as in the first embodiment.

FIG. 49 is a block diagram illustrating an example in which the parent hypervisor 200A changes the ratio of resources allocated to the logical partitions (the child hypervisors HOST 01 and HOST 06). The parent hypervisor 200A evacuates the virtual computers 211 on the host HOST 01 whose resource allocation ratio is to be reduced, and then reduces the resources of the host HOST 01 to add the resources freed up by the reduction to the host HOST 06. In this manner, new resources are added to the tenant B whose load has increased. On the other hand, in the tenant A whose load has been light, the ratio of resources allocated to the host HOST 01 is reduced. The child hypervisors 251-1 and 251-2 may be rebooted after the resource allocation ratio is changed, depending on the type of the child hypervisors 251-1 and 251-2.

FIG. 50 is a block diagram illustrating a case in which the virtual computers 211 are relocated after the parent hypervisor 200A changes the ratio of resources allocated to the logical partitions (the child hypervisors HOST 01 and HOST 06). The configuration change module 406 sends an instruction to the VM management module 411 to relocate the virtual computers 211 to HOST 01 of the tenant A and HOST 06 of the tenant B where the resource allocation ratio has been changed. The load on hosts is thus leveled in each tenant.

As has been described, in the second embodiment, a two-stage virtualization module is used for the server 130 that is shared by a plurality of tenants to change the ratio of resources allocated to the child hypervisors 251-1 and 251-2 finely and dynamically, thereby leveling the load among the tenants.

The second embodiment may also be configured so that the ratio of resources allocated to the child hypervisors 251-1 and 251-2 is changed when a tenant whose load evaluation value exceeds a threshold shares one server 130 with another tenant.

Third Embodiment

Figure 51:
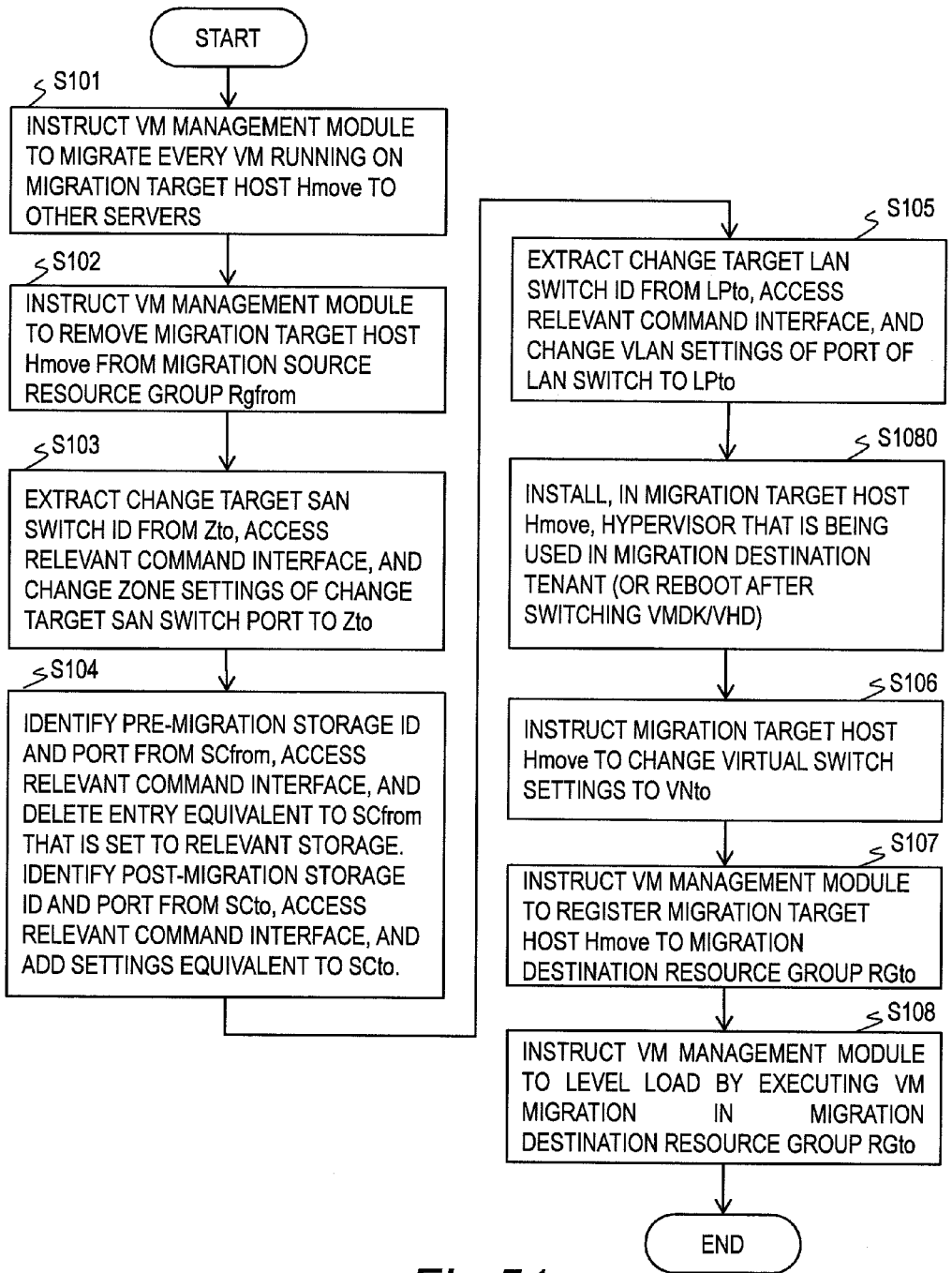
FIG. 51 is a flow chart illustrating an example of processing that is executed in the configuration change module according to a third embodiment of this invention.

FIG. 51 is a flow chart illustrating an example of processing that is executed in the configuration change module 406 according to a third embodiment of this invention. The flow chart of FIG. 51 is obtained by adding Step S1080 to Steps S101 to S108 described in the first embodiment with reference to FIG. 34. Steps S101 to S105 of the third embodiment are, as in the first embodiment, for changing the settings of the respective resource types in preparation for the migration of the migration target host Hmove from the migration source tenant to the migration destination tenant.

After changing the settings of the LAN switches 121 and 122, the configuration change module 406 installs, in Step S1080, in the migration target host Hmove, the virtualization module that is being used in the migration destination tenant Tmoveto. Alternatively, the configuration change module 406 switches the virtual disk read by the migration target host Hmove to one suitable for the type of the virtualization module.

The configuration change module 406 then executes Step S106 and subsequent steps the same way as in the first embodiment, and relocates the virtual computers 211 in the migration target host Hmove.

According to the third embodiment, when the tenant A has a Hyper-V environment and the tenant B has a VMware environment, the environment variations between the tenants can be accommodated by installing the virtualization module of the migration destination tenant Tmoveto in the migration target host Hmove, or by switching the virtual disk to one suitable for the environment of the migration destination tenant Tmoveto.

Fourth Embodiment

Figure 52:
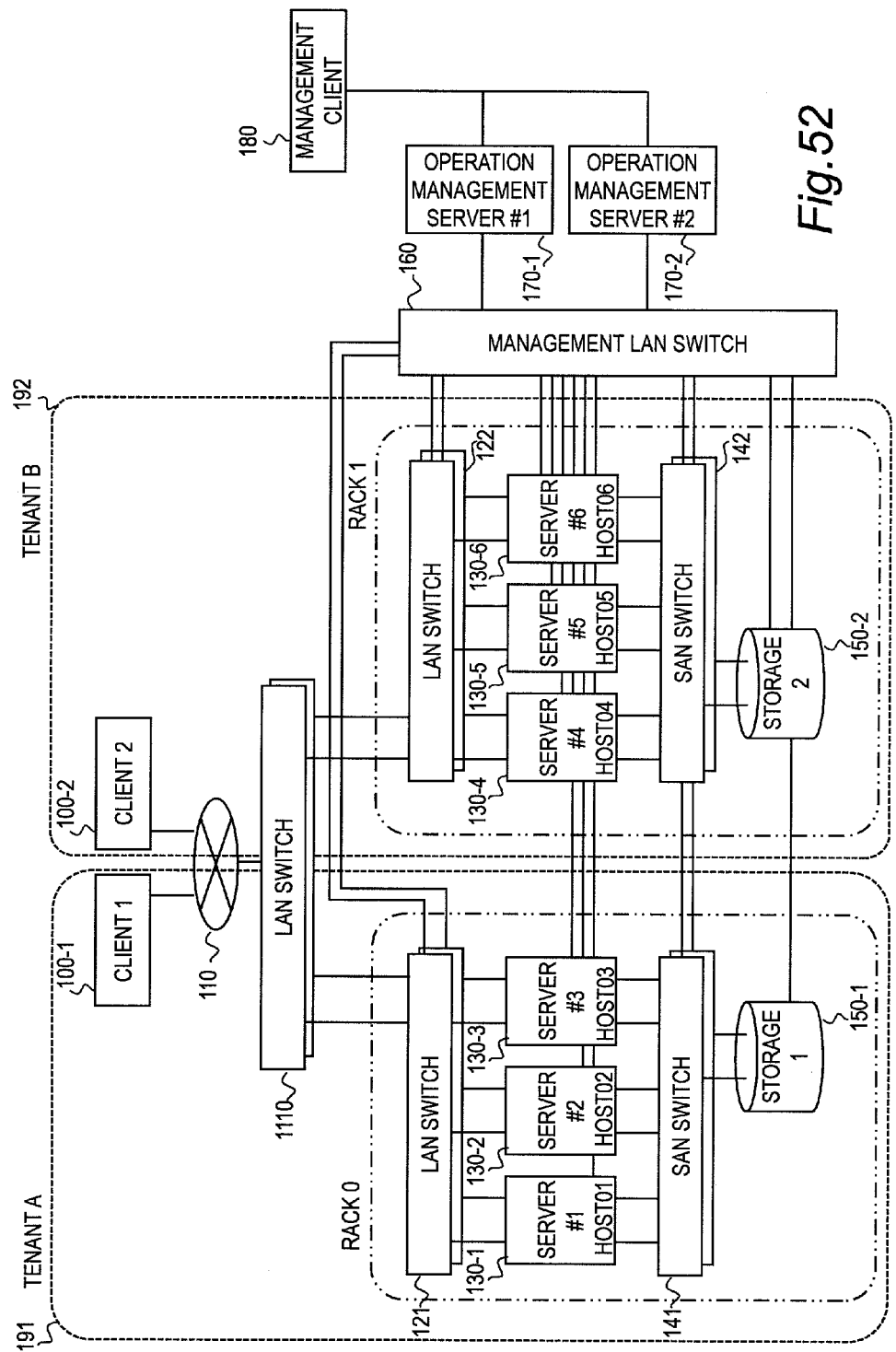
FIG. 52 is a diagram illustrating an example in which servers used by the tenants A and B of the first embodiment are housed in different racks according to a fourth embodiment of this invention.

FIG. 52 is a diagram illustrating an example in which the servers 130 used by the tenants A and B of the first embodiment are housed in different racks according to a fourth embodiment of this invention. Racks 0 and 1 are coupled by a LAN switch 1110. Devices that are the same as those in the first embodiment are denoted by the same reference symbols in order to omit a duplicate description. The tenant A (191) uses a computer system housed in the rack 0, and the tenant B (192) uses a computer system housed in the rack 1.

The rack 0 houses the servers 130-1 to 130-3, the LAN switch 121, the SAN switch 141, and the storage 150-1. The rack 1 houses the servers 130-4 to 130-6, the LAN switch 122, the SAN switch 142, and the storage 150-2. The LAN switch 121 and the LAN switch 122 are coupled to the LAN switch 1110. Each apparatus is coupled to the management LAN switch 160 to be managed by the IT systems management system 170. The configuration of the IT systems management system 170 in this embodiment is the same as in the first embodiment, and only a part of the processing of the configuration plan creation module 405 differs from the first embodiment. The SAN switch 141 and the SAN switch 142 are coupled to each other between the racks 0 and 1.

Figure 53:
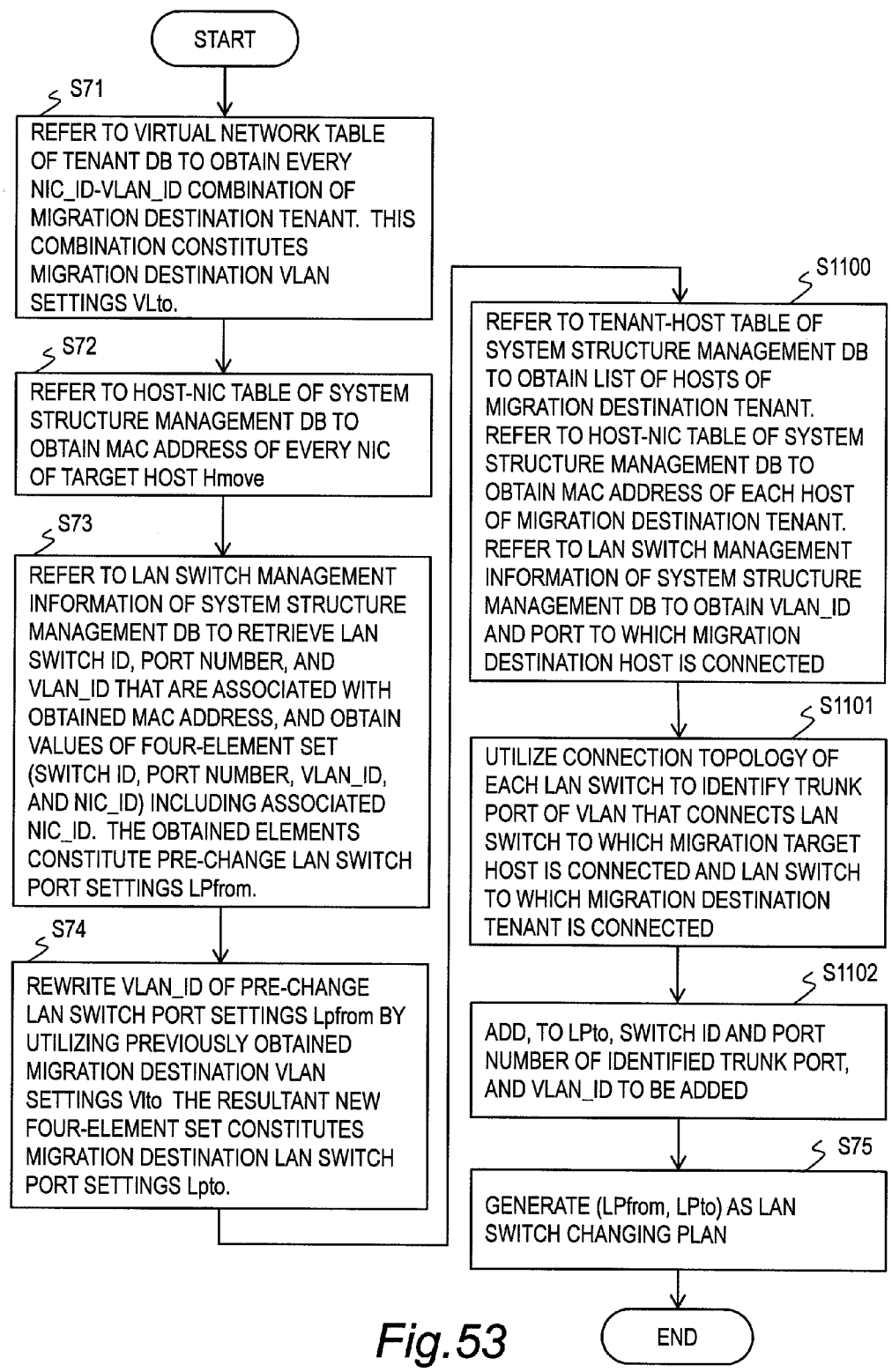
FIG. 53 is a flow chart illustrating an example of the configuration plan creating processing concerning LAN switches which is executed in Step S34 of FIG. 27 in the first embodiment according to the fourth embodiment of this invention.

FIG. 53 is a flow chart illustrating an example of the configuration plan creating processing concerning LAN switches which is executed in Step S34 of FIG. 27 in the first embodiment. This flow chart is obtained by adding new steps S1100 to S1102 between Steps S74 and S75 of FIG. 31 of the first embodiment.

In Steps S71 to S74, the configuration plan creation module 405 calculates the migration destination VLAN settings Vto, the pre-change LAN switch port settings LPfrom, and the migration destination LAN switch port settings LPto as in FIG. 31 of the first embodiment.

In Step S1100, the configuration plan creation module 405 refers to the tenant-host table 550 of the system structure management database 409 to obtain a list of hosts of the migration destination tenant. The configuration plan creation module 405 next refers to the host-NIC table 600 of the system structure management database 409 to obtain the MAC address of each host of the migration destination tenant. The configuration plan creation module 405 next refers to the LAN switch management information 620 of the system structure management database 409 to obtain VLAN_ID of a VLAN and a port to which the migration target host is coupled.

In Step S1101, the configuration plan creation module 405 utilizes the connection topology of the LAN switches 121 to identify a trunk port of a VLAN that couples the LAN switch 121 to which the migration target host is coupled and the LAN switch 122 to which the migration destination tenant is coupled.

In Step S1102, the configuration plan creation module 405 adds the switch ID and port number of the trunk port identified in Step S1101 to the migration destination LAN switch port settings LPto generated in Step S74.

In Step S75, the configuration plan creation module 405 sets the pre-change LAN switch port settings LPfrom and the migration destination LAN switch port settings LPto as a switch configuration plan.

The processing described above adds to the migration destination LAN switch port settings LPto the switch ID and port number of a trunk port through which a plurality of VLAN tags pass. A VLAN that covers a plurality of LAN switches is thus configured.

Figure 54:
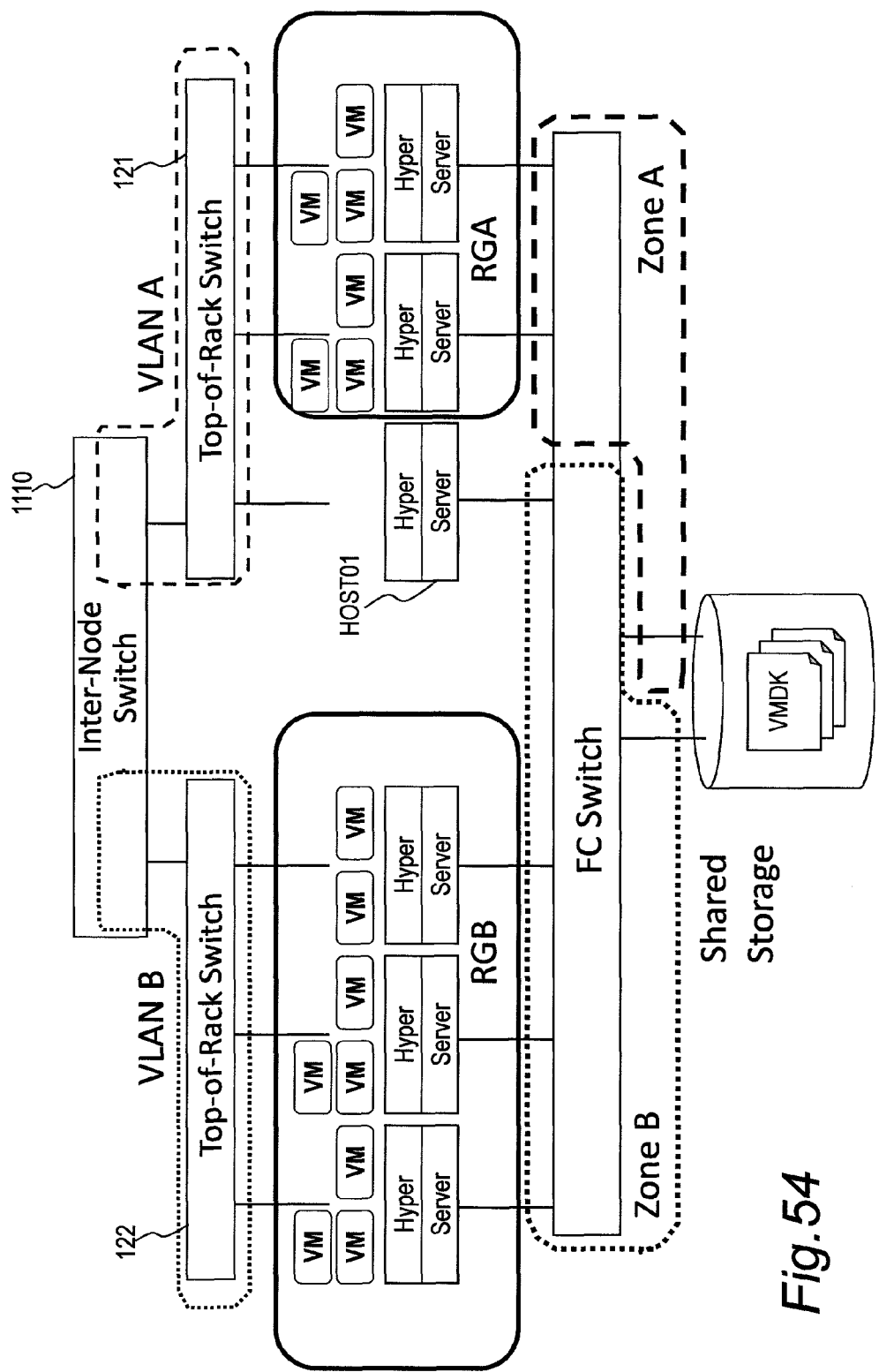
FIG. 54 is a block diagram of how the computer system looks before the host HOST 01 of the tenant A (the resource group ID=RGA) is migrated to the tenant B (the resource group ID=RGA) according to the fourth embodiment of this invention.

FIG. 54 is a block diagram of how the computer system looks before the host HOST 01 of the tenant A (the resource group ID=RGA) is migrated to the tenant B (the resource group ID=RGA). The LAN switch 121 to which a network interface of the host HOST 01 is coupled and the LAN switch 122 of the rack 1 which houses the servers 130-4 to 130-6 (HOST 03 to HOST 06) of the tenant B are coupled to each other via the LAN switch 1110. However, a VLAN A of the tenant A and a VLAN B of the tenant B are independent of each other.

Figure 55:
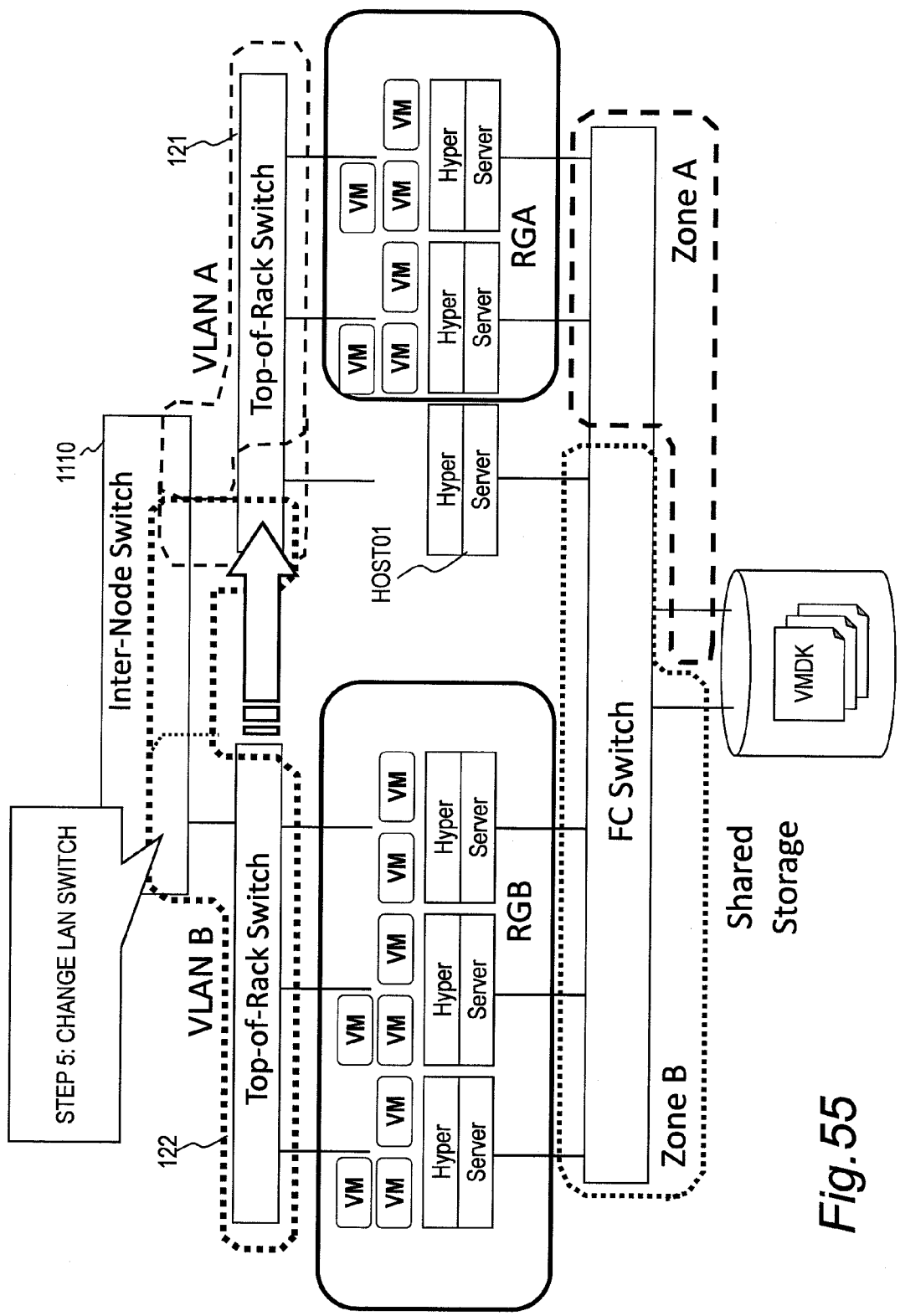
FIG. 55 is a block diagram of how the computer system looks after the host HOST 01 of the tenant A is migrated to the tenant B according to the fourth embodiment of this invention.

FIG. 55 is a block diagram of how the computer system looks after the host HOST 01 of the tenant A is migrated to the tenant B. After the processing of FIG. 53 is executed, the VLAN B of the tenant B now includes the LAN switch 122, the LAN switch 1110, and a port of the LAN switch 121 that is coupled to the host HOST 01. The port of the LAN switch 121 that is coupled to the host HOST 01 of the migration target Hmove is thus added to the migration destination VLAN B. Subsequently, the host HOST 01 is added to the resource group B of the tenant B and the virtual computers 211 are migrated the same way as in the first embodiment.

Through the processing described above, the host HOST 01 can be migrated between different racks and the load can be leveled among tenants even in a virtual management system where resources are allocated to tenants on a rack-by-rack basis.

Fifth Embodiment

FIGS. 56 to 59 illustrate a fifth embodiment of this invention. The fifth embodiment deals with a case where a data center which provides computing resources to the tenants A and B has an administrator for each computing resource type, and a change plan screen is generated for each computing resource type in the fifth embodiment. The rest of the configuration of the fifth embodiment is the same as that of the first embodiment. Administrators of the respective computing resource types include a server administrator, a network administrator, a SAN administrator, and a storage administrator.

The configuration plan creation module 405 creates configuration plans through the processing described in the first embodiment with reference to FIG. 27, and transmits the notification screen 420 to the management client 180 via the user interface module 410. At this time, the configuration plan creation module 405 generates the notification screen for each preset computing resource type and transmits the notification screens to the management client 180.

Figure 56:
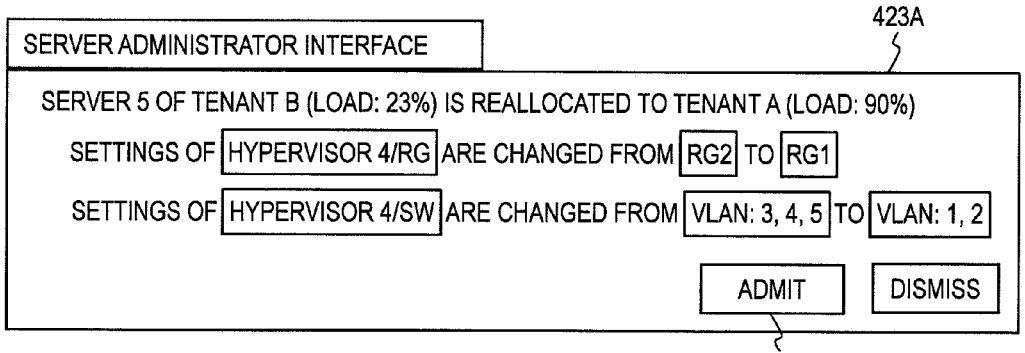
FIG. 56 is a screen image illustrating an example of a server administrator notification screen according to a fifth embodiment of this invention.
Figure 57:
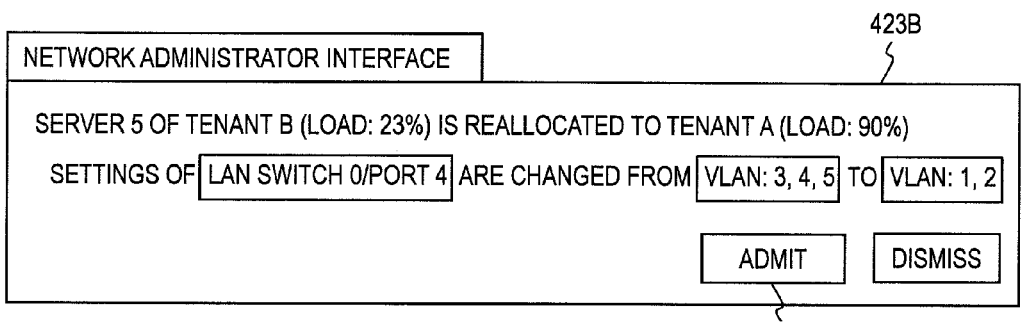
FIG. 57 illustrates the network administrator notification screen 423B, which displays a change of VLAN settings of the LAN switches 121 and 122 according to the fifth embodiment of this invention.

The configuration plan creation module 405 transmits to, for example, the server administrator, a resource change notification screen 423A as illustrated in FIG. 56. The configuration plan creation module 405 transmits to the network administrator a resource change notification screen 423B as illustrated in FIG. 57. The configuration plan creation module 405 transmits to the SAN administrator a resource change notification screen 423C illustrated in FIG. 58. The configuration plan creation module 405 transmits to the storage administrator a resource change notification screen 423D illustrated in FIG. 59. The server administrator, the network administrator, the SAN administrator, and the storage administrator may each use a dedicated management client 180.

FIG. 56 is a screen image illustrating an example of a server administrator notification screen. On the server administrator notification screen 423A of FIG. 56, a change of the resource group of one hypervisor 200 and a change of VLAN settings of the hypervisor 200 are written next to each other. The server administrator, when approving the server (hypervisor 200) configuration plan on the notification screen 423A, uses the input device (not shown) of the management client 180 to click on an "approve" button 450.

FIG. 57 illustrates the network administrator notification screen 423B, which displays a change of VLAN settings of the LAN switches 121 and 122. The network administrator, when approving the configuration plan on the notification screen 423B, uses the input device (not shown) of the management client 180 to click on the "approve" button 450.

Figure 58:
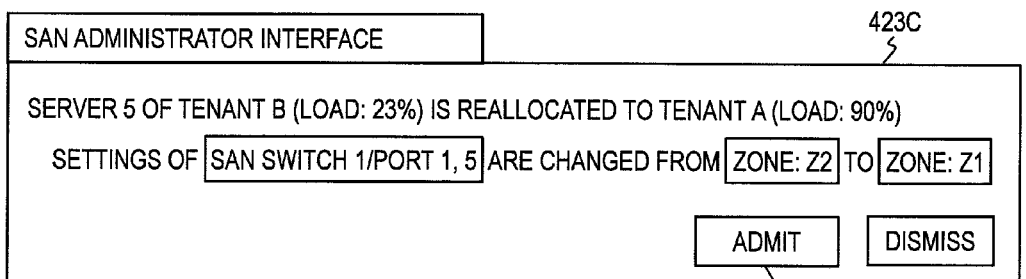
FIG. 58 illustrates the SAN administrator notification screen 423C, which displays a change of zone settings of the SAN switches 141 and 142 according to the fifth embodiment of this invention.

FIG. 58 illustrates the SAN administrator notification screen 423C, which displays a change of zone settings of the SAN switches 141 and 142. The SAN administrator, when approving the configuration plan on the notification screen 423C, uses the input device (not shown) of the management client 180 to click on the "approve" button 450.

Figure 59:
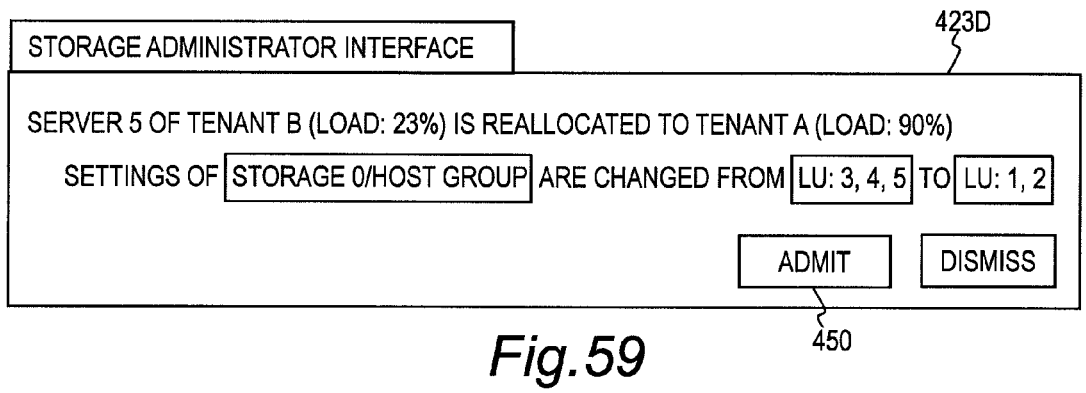
FIG. 59 illustrates the storage administrator notification screen 423D, which displays a change of settings of the storage according to the fifth embodiment of this invention.

FIG. 59 illustrates the storage administrator notification screen 423D, which displays a change of settings of the storage 150. The storage administrator, when approving the configuration plan on the notification screen 423D, uses the input device (not shown) of the management client 180 to click on the "approve" button 450.

When an approval notification is received from every administrator, the configuration plan creation module 405 activates the configuration change module 406 of FIG. 34 to execute the configuration plans. In the case where a dismiss notification is received from any one of the administrators, the configuration plan creation module 405 may terminate the processing.

<Conclusion>

The embodiments described above discuss examples in which one resource group is allocated to one tenant, but a plurality of resource groups may be allocated to one tenant.

The embodiments described above discuss examples in which computing resources are allocated to a plurality of tenants for use, but this invention is not limited to configurations that include tenants. This invention is applicable to any configuration that allocates a plurality of virtual computers and physical computers to a plurality of users of computing resources for use. For example, a plurality of clients may be regarded as a plurality of (computer) utilization groups.

The embodiments described above discuss examples in which the server 130 is migrated between two tenants, but the server 130 may be migrated among three or more tenants.

The embodiments described above discuss examples in which the IT systems management systems 170-1 and 170-2 are separate physical computers, but the IT systems management systems 170-1 and 170-2 may each be run on a virtual computer.

In the embodiments described above, the IT systems management system 170 calculates a computer load for each tenant with the use of an evaluation value vector. Instead, the IT systems management system 170 may use a measured processor load value that is measured by the hypervisor 200 allocated to each tenant.

The embodiments described above discuss examples in which the IT systems management system 170 determines, as the migration destination tenant Tmoveto, a tenant where any one of the elements of the evaluation value vector WLVt exceeds a corresponding element of the threshold vector WLTh. In the case where the corresponding element of the threshold vector WLTh is exceeded in a plurality of tenants, one of the plurality of tenants that has the largest evaluation value vector WLVt can be determined as the migration destination tenant Tmoveto.

The embodiments described above discuss examples in which the IT systems management system 170 determines, as the migration target host Hmove, the server 130 that has the lightest load of all the servers 130 belonging to the migration source tenant Tmovefrom, which has the shortest evaluation value vector WLVt. The migration target host Hmove may instead be the server 130 that has the lightest load (or the server 130 that has a load smaller than a given threshold) of all the servers 130 belonging to a tenant that is not the migration destination tenant Tmoveto. In this case, the tenant to which the lightest-load server belongs is determined as the migration source tenant Tmovefrom.

<Supplement>

A method of controlling a virtual computer system for providing a plurality of virtual computers on a plurality of physical computers, the virtual computer system including:
 the plurality of physical computers each including a processor and a memory;
 a first virtualization module for partitioning resources of the plurality of physical computers and a second virtualization module for providing the plurality of virtual computers with use of the partitioned resources;
 a network switch for coupling the plurality of physical computers; and
 a management computer coupled to the network switch, the method including:
 a first step of allocating, by the management computer, the plurality of virtual computers to a plurality of groups;
 a second step of obtaining, by the management computer, a load value for each of the plurality of groups, and comparing the load value against a preset threshold;
 a third step of identifying, by the management computer, a group whose load value exceeds the preset threshold as a first group;
 a fourth step of selecting, by the management computer, a second group which shares a physical computer with the first group from the plurality of groups;
 a fifth step of identifying, by the management computer, the second virtualization module that is run on the first virtualization module of the physical computer shared by the first group and the second group, as the second virtualization module of the first group and as the second virtualization module of the second group;
 a sixth step of migrating, by the management computer, virtual computers that are provided by the second virtualization module of the second group to other physical computers within the second group;
 a seventh step of controlling, by the management computer, the first virtualization module of the physical computer shared by the first group and the second group to change resources to be allocated to the second virtualization module of the first group and the second virtualization module of the second group;
 an eighth step of controlling, by the management computer, the second virtualization module of the first group to migrate virtual computers of the first group; and
 a ninth step of controlling, by the management computer, the second virtualization module of the second group to migrate virtual computers of the second group.

As described above, this invention is applicable to a virtual computer system in which virtual computers are used by a plurality of clients, and is particularly applicable to a management computer that manages virtual computers and a management computer program.

While the present invention has been described in detail and pictorially in the accompanying drawings, the present invention is not limited to such detail but covers various obvious modifications and equivalent arrangements, which fall within the purview of the appended claims.

What is claimed is:

1. A method of controlling a virtual computer system for providing a plurality of virtual computers on a plurality of physical computers,
 the virtual computer system comprising:
  the plurality of physical computers, with each physical computer comprising a processor and a memory;
  a virtualization module implemented via at least one processor and at least one memory, for partitioning resources of the plurality of physical computers to provide the plurality of virtual computers;
  a network switch for coupling the plurality of physical computers; and
  a management computer coupled to the network switch, the management computer including a virtual network table, a host-NIC table and LAN switch management information,
 the method comprising:
 a first step of allocating, by the management computer, the plurality of virtual computers to a plurality of groups;
 a second step of obtaining, by the management computer, a load value for each of the plurality of groups, and comparing the load value against a preset threshold;
 a third step of identifying, by the management computer, a group whose load value exceeds the preset threshold as a first group;
 a fourth step of selecting, by the management computer, a second group from the plurality of groups minus the first group;
 a fifth step of identifying, by the management computer, as a migration target computer, a given physical computer out of allocated physical computers of the plurality of physical computers, that run virtual computers allocated to the second group;
 a sixth step of migrating, by the management computer, targeted virtual computers that are provided by the migration target computer to other physical computers within the second group;
 a seventh step of removing, by the management computer, the migration target computer from the second group;
 an eighth step of instructing, by the management computer, the virtualization module of the migration target computer to change virtual network settings of this virtualization module in a manner that suits the first group, where the change is performed with reference to information in the virtual network table, and is based on processing of creating a virtual network configuration plan to change the virtual network;
 a ninth step of changing, by the management computer, settings of the network switch in a manner that enables the migration target computer to operate in the first group, where the changing is performed with reference to the virtual network table and the host-NIC table, and is based on processing of creating a LAN switch configuration plan to change the LAN switch settings;
 a tenth step of adding, by the management computer, the migration target computer to the first group; and an eleventh step of controlling, by the management computer, the migration target computer to run virtual computers of the first group.

2. The method of controlling a virtual computer system according to claim 1, wherein the eleventh step comprises migrating select virtual computers of the plurality of virtual computers, in a manner that levels load among the physical computers of the first group.

3. The method of controlling a virtual computer system according to claim 2, wherein the eleventh step comprises migrating select virtual computers of the plurality of virtual computers, in a manner that levels load among the physical computers of the second group.

4. The method of controlling a virtual computer system according to claim 1,
wherein the network switch comprises a SAN switch for coupling the plurality of physical computers to a storage, and
wherein the ninth step further comprises changing, by the management computer, settings of the SAN switch in a manner that enables the migration target computer to operate in the first group.

5. The method of controlling a virtual computer system according to claim 1, wherein the second step comprises obtaining an evaluation value for each physical computer in a single group by compiling values of different types of loads, and using the evaluation value as the load value which is obtained for each of the plurality of groups.

6. The method of controlling a virtual computer system according to claim 1, wherein the fourth step comprises selecting a group that is smallest in load value, which is obtained for each of the plurality of groups, as the second group out of the plurality of groups minus the first group.

7. The method of controlling a virtual computer system according to claim 1, wherein the fifth step comprises identifying a physical computer that has a lightest load among the physical computers that run the virtual computers allocated to the second group as the migration target computer.

8. A management computer for managing a virtual computer system,
the virtual computer system comprising:
a plurality of physical computers each comprising a processor and a memory;
a virtualization module implemented via at least one processor and at least one memory, for partitioning resources of the plurality of physical computers to provide a plurality of virtual computers; and
a network switch for coupling the plurality of physical computers and coupling the management computer thereto,
the management computer comprising:
a virtual network table, a host-NIC table and LAN switch management information;
a group management module implemented via at least one processor and at least one memory, for allocating the plurality of virtual computers to a plurality of groups;
a monitoring module implemented via at least one processor and at least one memory, for obtaining a load value for each of the plurality of groups;
a judgment module implemented via at least one processor and at least one memory, for comparing the load value, which is obtained for the each of the plurality of groups, against a preset threshold to identify a group whose load value exceeds the preset threshold as a first group;
a configuration change module implemented via at least one processor and at least one memory, for selecting a second group out of the plurality of groups minus the first group, identifying as a migration target computer a given physical computer out of allocated physical computers of the plurality of physical computers, that run virtual computers allocated to the second group, and migrating the migration target computer from the second group to the first group; and
a virtual computer management module implemented via at least one processor and at least one memory, for instructing the virtualization module of each of the plurality of physical computers to control the plurality of virtual computers,
wherein the configuration change module is configured to:
output, to the virtual computer management module, an instruction to migrate virtual computers that are provided by the migration target computer to other physical computers within the second group;
remove the migration target computer from the second group;
output an instruction to the virtual computer management module to change virtual network settings of the virtualization module of the migration target computer in a manner that suits the first group, where the change is performed with reference to information in the virtual network table, and is based on processing of creating a virtual network configuration plan to change the virtual network;
change settings of the network switch in a manner that enables the migration target computer to operate in the first group, where the change setting is performed with reference to the virtual network table and the host-NIC table, and is based on processing of creating LAN switch configuration plan to change the LAN switch settings;
add the migration target computer to the first group; and
output to the virtual computer management module an instruction to run the virtual computers of the first group on the migration target computer.

9. The management computer according to claim 8, wherein the virtual computer management module migrates the virtual computers in a manner that levels load among the physical computers of the first group.

10. The management computer according to claim 9, wherein the virtual computer management module migrates the virtual computers in a manner that levels load among the physical computers of the second group.

11. The management computer according to claim 8,
wherein the network switch comprises a SAN switch for coupling the plurality of physical computers to a storage, and
wherein the configuration change module changes settings of the SAN switch in a manner that enables the migration target computer to operate in the first group.

12. The management computer according to claim 8, wherein the monitoring module obtains an evaluation value for each physical computer in a single group by compiling values of different types of loads, and uses the evaluation value as the load value which is obtained for each of the plurality of groups.

13. The management computer according to claim 8, wherein the configuration change module selects a group that is smallest in load value, which is obtained for each of the plurality of groups, as the second group out of the plurality of groups minus the first group.

14. The management computer according to claim 8, wherein the configuration change module identifies a physical computer that has a lightest load among the physical computers that run the virtual computers allocated to the second group as the migration target computer.

15. The method of controlling a virtual computer system according to claim 1, wherein in the eighth step, the change is more specifically performed with reference to information of virtual network settings of both a migration source and a migration destination in the virtual network table, and is based on processing of creating a virtual network configuration plan using the virtual network settings of both the migration source and the migration destination to change the virtual network.

16. The management computer according to claim 8, wherein the change is more specifically performed with reference to information of virtual network settings of both a migration source and a migration destination in the virtual network table, and is based on processing of creating a virtual network configuration plan using the virtual network settings of both the migration source and the migration destination to change the virtual network.

* * * * *